(12) United States Patent
Smith et al.

(10) Patent No.: US 11,265,674 B2
(45) Date of Patent: *Mar. 1, 2022

(54) METHOD AND SYSTEM FOR ESTABLISHING MICROLOCATION ZONES

(71) Applicant: DENSO CORPORATION, Kariya (JP)

(72) Inventors: Eric John Smith, Holland, MI (US);
Raymond Michael Stitt, Ada, MI (US);
Warren Guthrie, West Olive, MI (US);
Steven Petersen, Grand Rapids, MI (US)

(73) Assignee: DENSO CORPORATION, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/724,671

(22) Filed: Dec. 23, 2019

(65) Prior Publication Data
US 2020/0128354 A1 Apr. 23, 2020

Related U.S. Application Data

(63) Continuation of application No. 16/435,662, filed on Jun. 10, 2019, now Pat. No. 11,153,708, which is a
(Continued)

(51) Int. Cl.
*H04W 4/02* (2018.01)
*H04W 12/12* (2021.01)
(Continued)

(52) U.S. Cl.
CPC ............ *H04W 4/021* (2013.01); *G01S 5/0289* (2013.01); *H04W 84/18* (2013.01); *H04B 17/318* (2015.01);
(Continued)

(58) Field of Classification Search
CPC .... H04B 17/318; H04W 4/021; H04W 12/06; H04W 24/08; H04W 4/02; H04W 4/04;
(Continued)

(56) References Cited

U.S. PATENT DOCUMENTS 6,069,411 A 5/2000 Charron
6,211,776 B1 4/2001 Röhrl et al.
(Continued)

FOREIGN PATENT DOCUMENTS

EP 1 365 613 6/2006
JP 2003-248045 9/2003
(Continued)

OTHER PUBLICATIONS

Dahlgren, Erik et al., "Evaluation of indoor positioning based on Bluetooth Smart technology", Chalmers University of Technology, Deparlmnent of Computer Science and Engineering, Jun. 10, 2014, pp. 1-94.
(Continued)

*Primary Examiner* — Khawar Iqbal
(74) *Attorney, Agent, or Firm* — Warner Norcross + Judd LLP

(57) ABSTRACT

A method and system of creating microlocation zones by defining virtual boundaries using a system of one or more transmitters and receivers with one or more spatially-correlated antennas.

30 Claims, 44 Drawing Sheets

Related U.S. Application Data continuation of application No. 15/842,479, filed on Dec. 14, 2017, now Pat. No. 10,356,550.

(60) Provisional application No. 62/434,392, filed on Dec. 14, 2016.

(51) Int. Cl.

| | | |
|---|---|---|
| *H04W 84/18* | (2009.01) | |
| *H04W 4/021* | (2018.01) | |
| *G01S 5/02* | (2010.01) | |
| H04W 4/80 | (2018.01) | |
| H04B 17/318 | (2015.01) | |
| H04L 29/06 | (2006.01) | |
| H04W 12/08 | (2021.01) | |
| H04W 12/63 | (2021.01) | |

(52) U.S. Cl.
CPC ......... *H04L 63/1433* (2013.01); *H04W 4/023* (2013.01); *H04W 4/80* (2018.02); *H04W 12/08* (2013.01); *H04W 12/12* (2013.01); *H04W 12/63* (2021.01)

(58) Field of Classification Search
CPC ....... H04W 4/80; H04W 76/02; H04W 84/18; G01S 5/02; G01S 5/06; H04M 1/68; H04M 3/16
See application file for complete search history.

(56) References Cited

U.S. PATENT DOCUMENTS

| | | | |
|---|---|---|---|
| 6,218,932 B1 | 4/2001 | Stippler | |
| 6,259,168 B1 | 7/2001 | Okada | |
| 6,522,027 B1 | 2/2003 | Morillon et al. | |
| 6,556,135 B2 | 4/2003 | Attring et al. | |
| 6,697,024 B2 | 2/2004 | Fuerst et al. | |
| 6,906,612 B2 | 6/2005 | Ghabra et al. | |
| 6,965,295 B2 | 11/2005 | Shimonomoto et al. | |
| 6,980,124 B2 | 12/2005 | Kong et al. | |
| 7,046,119 B2 | 5/2006 | Ghabra et al. | |
| 7,089,035 B2 | 8/2006 | Ando et al. | |
| 7,106,171 B1 | 9/2006 | Burgess | |
| 7,170,988 B2 | 1/2007 | McLintock et al. | |
| 7,224,980 B2 | 5/2007 | Hara | |
| 7,228,122 B2 | 6/2007 | Oyagi et al. | |
| 7,277,007 B2 | 10/2007 | John et al. | |
| 7,280,097 B2 | 10/2007 | Chen et al. | |
| 7,321,814 B2 | 1/2008 | Kanda et al. | |
| 7,333,021 B2 | 2/2008 | Ieda et al. | |
| 7,394,349 B2 | 7/2008 | Marek et al. | |
| 7,446,644 B2 | 11/2008 | Schaffzin et al. | |
| 7,530,113 B2 | 5/2009 | Braun | |
| 7,548,491 B2 | 6/2009 | Macfarlane | |
| 7,629,873 B2 | 12/2009 | Ghabra et al. | |
| 7,663,502 B2 | 2/2010 | Breed | |
| 7,710,245 B2 | 5/2010 | Pickering | |
| 7,751,957 B2 | 7/2010 | Nagaoka et al. | |
| 7,768,377 B2 | 8/2010 | Brey | |
| 7,805,169 B2 | 9/2010 | Hicks, III | |
| 7,850,078 B2 | 12/2010 | Christenson et al. | |
| 7,868,745 B2 | 1/2011 | Schmidt et al. | |
| 7,904,219 B1 | 3/2011 | Lowrey et al. | |
| 7,911,358 B2 | 3/2011 | Bos et al. | |
| 7,912,625 B2 | 3/2011 | Cahoon | |
| 7,916,021 B2 | 3/2011 | Lickfelt et al. | |
| 7,932,892 B2 | 4/2011 | Chen et al. | |
| 7,961,076 B2 | 6/2011 | Kelley et al. | |
| 7,999,655 B2 | 8/2011 | Yoshikawa | |
| 8,022,808 B2 | 9/2011 | Kurpinski et al. | |
| 8,048,174 B2 | 11/2011 | Yamamichi et al. | |
| 8,050,817 B2 | 11/2011 | Moinzadeh et al. | |
| 8,053,922 B2 | 11/2011 | Müller | |
| 8,077,011 B2 | 12/2011 | McBride et al. | |
| 8,089,339 B2 | 1/2012 | Mikan et al. | |
| 8,089,342 B2 | 1/2012 | Sugiura et al. | |
| 8,098,130 B2 | 1/2012 | Baruco et al. | |
| 8,102,239 B2 | 1/2012 | Woo | |
| 8,115,609 B2 | 2/2012 | Ketari | |
| 8,126,400 B2 | 2/2012 | Jung et al. | |
| 8,126,450 B2 | 2/2012 | Howarter et al. | |
| 8,127,984 B2 | 3/2012 | Zatloukal et al. | |
| 8,159,324 B2 | 4/2012 | Zellweger et al. | |
| 8,175,613 B2 | 5/2012 | Patil et al. | |
| 8,175,657 B2 | 5/2012 | Okayasu | |
| 8,193,903 B2 | 6/2012 | Kraimer et al. | |
| 8,224,313 B2 | 7/2012 | Howarter et al. | |
| 8,245,052 B2 | 8/2012 | Bjorn | |
| 8,248,968 B2 | 8/2012 | Handforth et al. | |
| 8,284,022 B2 | 10/2012 | Kachouh | |
| 8,299,895 B2 | 10/2012 | Harris | |
| 8,319,605 B2 | 11/2012 | Hassan et al. | |
| 8,334,758 B2 | 12/2012 | Baruco et al. | |
| 8,358,197 B2 | 1/2013 | Tran | |
| 8,421,589 B2 | 4/2013 | Sultan et al. | |
| 8,427,289 B2 | 4/2013 | Ghabra et al. | |
| 8,432,260 B2 | 4/2013 | Talty et al. | |
| 8,437,886 B1 | 5/2013 | Yang | |
| 8,437,916 B2 | 5/2013 | Fawaz et al. | |
| 8,482,382 B2 | 7/2013 | Lickfelt et al. | |
| 8,494,447 B2 | 7/2013 | Oesterling et al. | |
| 8,527,015 B2 | 9/2013 | Alrabady et al. | |
| 8,610,674 B2 | 12/2013 | Pryor | |
| 8,706,143 B1 | 4/2014 | Elias | |
| 8,744,482 B2 | 6/2014 | Margalef et al. | |
| 8,868,254 B2 | 10/2014 | Louboutin | |
| 8,947,202 B2 | 2/2015 | Tucker et al. | |
| 9,241,235 B2 | 1/2016 | Santavicca | |
| 9,536,364 B2 | 1/2017 | Talty et al. | |
| 9,736,649 B1 | 8/2017 | Do et al. | |
| 9,852,560 B2 | 12/2017 | Bauman et al. | |
| 9,886,805 B1 | 2/2018 | Bianchi, III et al. | |
| 9,894,492 B1 * | 2/2018 | Elangovan | ......... G07C 9/00309 |
| 10,070,325 B2 | 9/2018 | Logothetis | |
| 10,087,672 B2 | 10/2018 | Kalhous et al. | |
| 10,319,247 B2 * | 6/2019 | Bietz | ....................... A61B 8/08 |
| 10,328,898 B2 | 6/2019 | Golsch et al. | |
| 10,356,550 B2 | 7/2019 | Smith et al. | |
| 10,748,109 B2 * | 8/2020 | Benjamin | ................ H04W 4/70 |
| 10,904,695 B2 * | 1/2021 | Knobloch | ................ H04W 4/40 |
| 2001/0054952 A1 | 12/2001 | Desai et al. | |
| 2002/0140545 A1 | 10/2002 | Nietupski et al. | |
| 2002/0186144 A1 | 12/2002 | Meunier | |
| 2003/0117293 A1 | 6/2003 | Tang et al. | |
| 2003/0135321 A1 | 7/2003 | Kumazaki et al. | |
| 2004/0201277 A1 | 10/2004 | Hentsch et al. | |
| 2004/0257209 A1 | 12/2004 | Yang | |
| 2005/0038574 A1 | 2/2005 | Gila et al. | |
| 2005/0046554 A1 | 3/2005 | Attaprasith | |
| 2005/0099263 A1 | 5/2005 | Ikeda | |
| 2005/0225429 A1 | 10/2005 | Burzio | |
| 2005/0242923 A1 | 11/2005 | Pearson et al. | |
| 2006/0061459 A1 | 3/2006 | Kawamura et al. | |
| 2006/0135216 A1 | 6/2006 | Collavo et al. | |
| 2006/0164207 A1 | 7/2006 | Wilcox | |
| 2006/0238297 A1 | 10/2006 | Tang et al. | |
| 2007/0109093 A1 | 5/2007 | Matsubara et al. | |
| 2007/0142155 A1 | 6/2007 | Schumaher | |
| 2007/0162191 A1 | 7/2007 | Matsubara et al. | |
| 2007/0176739 A1 | 8/2007 | Raheman | |
| 2007/0197261 A1 | 8/2007 | Humbel | |
| 2007/0281735 A1 | 12/2007 | Suzuki | |
| 2008/0068128 A1 | 3/2008 | Ghabra et al. | |
| 2008/0136611 A1 | 6/2008 | Benco et al. | |
| 2008/0143499 A1 | 6/2008 | Shimomura | |
| 2008/0147268 A1 | 6/2008 | Fuller | |
| 2008/0194291 A1 | 8/2008 | Martin et al. | |
| 2008/0197970 A1 | 8/2008 | Fouts | |
| 2008/0197987 A1 | 8/2008 | King et al. | |
| 2008/0204322 A1 | 8/2008 | Oswald et al. | |
| 2008/0258868 A1 | 10/2008 | Nakajima et al. | |
| 2008/0266174 A1 | 10/2008 | Medina Herrero | |
| 2008/0309453 A1 | 12/2008 | Kim et al. | |

(56) References Cited

U.S. PATENT DOCUMENTS

| | | |
|---|---|---|
| 2009/0115585 A1 | 5/2009 | Minassian |
| 2009/0146830 A1 | 6/2009 | Ogiso |
| 2009/0156126 A1 | 6/2009 | Willis |
| 2009/0167524 A1 | 7/2009 | Chesnutt et al. |
| 2009/0195370 A1 | 8/2009 | Huffman et al. |
| 2009/0212905 A1 | 8/2009 | Batz et al. |
| 2009/0286548 A1 | 11/2009 | Coronel et al. |
| 2009/0289780 A1 | 11/2009 | Tenorio-Fox |
| 2009/0291637 A1 | 11/2009 | Alrabady et al. |
| 2009/0328189 A1 | 12/2009 | Budyta et al. |
| 2010/0017118 A1 | 1/2010 | Dougherty |
| 2010/0026578 A1 | 2/2010 | Furnanz et al. |
| 2010/0063670 A1 | 3/2010 | Brzezinski et al. |
| 2010/0076622 A1 | 3/2010 | Dickerhoof et al. |
| 2010/0087137 A1 | 4/2010 | Fischer et al. |
| 2010/0097178 A1 | 4/2010 | Pisz et al. |
| 2010/0102924 A1 | 4/2010 | King et al. |
| 2010/0109914 A1 | 5/2010 | Tieman et al. |
| 2010/0135178 A1 | 6/2010 | Aggarwal et al. |
| 2010/0136944 A1 | 6/2010 | Taylor et al. |
| 2010/0185537 A1 | 7/2010 | Bari |
| 2010/0222940 A1 | 9/2010 | Putsch |
| 2010/0238862 A1 | 9/2010 | Davidson et al. |
| 2010/0265034 A1 | 10/2010 | Cap et al. |
| 2011/0045842 A1 | 2/2011 | Rork et al. |
| 2011/0060480 A1 | 3/2011 | Mottla et al. |
| 2011/0086668 A1 | 4/2011 | Patel |
| 2011/0112969 A1 | 5/2011 | Zaid et al. |
| 2011/0142100 A1 | 6/2011 | Farmer et al. |
| 2011/0165896 A1 | 7/2011 | Stromberg et al. |
| 2011/0169604 A1 | 7/2011 | Ghabra et al. |
| 2011/0215901 A1 | 9/2011 | Van Wiemeersch et al. |
| 2011/0275321 A1 | 11/2011 | Zhou et al. |
| 2012/0105197 A1 | 5/2012 | Kobres |
| 2012/0126943 A1 | 5/2012 | Biondo et al. |
| 2012/0129493 A1 | 5/2012 | Vasudevan |
| 2012/0164989 A1 | 6/2012 | Xiao et al. |
| 2012/0208519 A1 | 8/2012 | Seaver |
| 2012/0229253 A1 | 9/2012 | Kolar |
| 2012/0268259 A1 | 10/2012 | Igel et al. |
| 2012/0281565 A1 | 11/2012 | Sauer |
| 2012/0282913 A1 | 11/2012 | Kaindl et al. |
| 2012/0309314 A1 | 12/2012 | Chen et al. |
| 2012/0310446 A1 | 12/2012 | Murphy |
| 2012/0313768 A1 | 12/2012 | Campbell et al. |
| 2012/0313796 A1 | 12/2012 | Lee et al. |
| 2012/0329445 A1 | 12/2012 | Elliott |
| 2013/0015814 A1 | 1/2013 | Kelty et al. |
| 2013/0031598 A1 | 1/2013 | Whelan et al. |
| 2013/0082076 A1 | 4/2013 | Tieman |
| 2013/0099892 A1 | 4/2013 | Tucker et al. |
| 2013/0099896 A1 | 4/2013 | Arkko et al. |
| 2013/0103200 A1 | 4/2013 | Tucker et al. |
| 2013/0106602 A1 | 5/2013 | Lickfelt |
| 2013/0109342 A1 | 5/2013 | Welch |
| 2013/0130674 A1 | 5/2013 | De Wind et al. |
| 2013/0141212 A1 | 6/2013 | Pickering |
| 2013/0154819 A1 | 6/2013 | Stefanovski et al. |
| 2013/0194068 A1 | 8/2013 | Mönig et al. |
| 2013/0211623 A1 | 8/2013 | Thompson et al. |
| 2013/0237189 A1 | 9/2013 | Nishidai |
| 2013/0257604 A1 | 10/2013 | Mirle et al. |
| 2013/0259232 A1 | 10/2013 | Petel |
| 2013/0271273 A1 | 10/2013 | Oesterling |
| 2013/0332007 A1 | 12/2013 | Louboutin |
| 2014/0025950 A1 | 1/2014 | Peeters et al. |
| 2014/0169564 A1 | 6/2014 | Gautama et al. |
| 2014/0185520 A1 | 7/2014 | Gao et al. |
| 2014/0188309 A1 | 7/2014 | Caratto et al. |
| 2014/0188348 A1 | 7/2014 | Gautama et al. |
| 2014/0232566 A1 | 8/2014 | Mimeault et al. |
| 2014/0248898 A1 | 9/2014 | O'Brien et al. |
| 2014/0253288 A1 | 9/2014 | O'Brien et al. |
| 2014/0308971 A1 | 10/2014 | O'Brien et al. |
| 2015/0050923 A1 | 2/2015 | Tu et al. |
| 2015/0071310 A1 | 3/2015 | Kim et al. |
| 2015/0092685 A1 | 4/2015 | Lee et al. |
| 2015/0105944 A1 | 4/2015 | Louboutin |
| 2015/0138036 A1 | 5/2015 | Harper |
| 2015/0147974 A1 | 5/2015 | Tucker et al. |
| 2015/0235486 A1 | 8/2015 | Ellis et al. |
| 2015/0287257 A1 | 10/2015 | Thompson |
| 2015/0327022 A1 | 11/2015 | Linn et al. |
| 2015/0334534 A1 | 11/2015 | Babu et al. |
| 2015/0373482 A1 | 12/2015 | Barnard et al. |
| 2016/0019734 A1 | 1/2016 | Bauman et al. |
| 2016/0063786 A1 | 3/2016 | Lewis et al. |
| 2016/0135013 A1 | 5/2016 | Bietz et al. |
| 2016/0320469 A1 | 11/2016 | Laifenfeld et al. |
| 2017/0023659 A1 | 1/2017 | Bruemmer et al. |
| 2017/0106834 A1 | 4/2017 | Williams et al. |
| 2017/0236351 A1* | 8/2017 | Menard ............... H04W 4/80 340/5.61 |
| 2017/0303090 A1* | 10/2017 | Stitt ................ H04W 4/021 |
| 2017/0315215 A1 | 11/2017 | Berezin et al. |
| 2017/0342750 A1* | 11/2017 | Hiramine ............. B60R 25/245 |
| 2018/0029560 A1* | 2/2018 | Mohaupt ............. B60R 25/255 |
| 2018/0056936 A1* | 3/2018 | Parasurama ......... B60R 25/245 |
| 2018/0056989 A1 | 3/2018 | Donald et al. |
| 2018/0115065 A1 | 4/2018 | Valdes Garcia et al. |
| 2018/0123804 A1 | 5/2018 | Smith et al. |
| 2018/0126952 A1* | 5/2018 | Niemiec ............. G07C 9/00571 |
| 2018/0143298 A1 | 5/2018 | Newman |
| 2018/0148015 A1 | 5/2018 | Weghaus |
| 2018/0154865 A1* | 6/2018 | Bianchi, III ........... B60R 25/24 |
| 2018/0184268 A1 | 6/2018 | Stitt et al. |
| 2018/0186309 A1 | 7/2018 | Batten et al. |
| 2018/0213355 A1 | 7/2018 | Smith et al. |
| 2018/0350240 A1* | 12/2018 | Sivashankar ........... B60Q 3/70 |
| 2019/0054842 A1 | 2/2019 | Raffa et al. |
| 2019/0130682 A1* | 5/2019 | Farges ............... G07C 9/00309 |
| 2019/0141478 A1 | 5/2019 | Vallampatti Ekambaram et al. |
| 2019/0297454 A1 | 9/2019 | Smith et al. |
| 2020/0092925 A1* | 3/2020 | Foster ................... H04W 76/14 |
| 2020/0228919 A1* | 7/2020 | Stitt ...................... H04W 12/06 |
| 2020/0341137 A1* | 10/2020 | Mindell ................ G01S 5/0247 |

FOREIGN PATENT DOCUMENTS

| | | |
|---|---|---|
| JP | 2008-224489 | 9/2008 |
| JP | 2008-266955 | 11/2008 |
| JP | 2012-108141 | 6/2012 |
| JP | 2012-172334 | 9/2012 |
| JP | 2016-510401 | 4/2016 |
| JP | 2016-148590 | 8/2016 |

OTHER PUBLICATIONS

Faragher, R. et al., "An Analysis of the Accuracy of Bluetooth Low Energy for Indoor Positioning Applications", Proceedings of the 27th International Technical Meeting of The Satellite Division of the Institute of Navigation (ION GNSS+ 2014), Tampa, Florida, Sep. 2014, pp. 201-210.

Faragher, R., et al., "Location Fingerprinting With Bluetooth Low Energy Beacons", IEEE Journal on Selected Areas in Communications, vol. 33, No. 11, Nov. 2015, pp. 2418-2428.

Hereman, Willy et al., "Determination of a Position in Three Dimensions Using Trilateration and Approximate Distances", Department of Mathematical and Computer Sciences, Colorado School of Mines, Sep. 17, 1995, submitted to Decision Sciences, Oct. 1995, pp. 1-22.

Ryan, Mike, "Bluetooth: With Low Energy comes Low Security", iSEC Partners, presented at Proceedings of the 7th USENIX conference on Offensive Technologies, Aug. 13, 2013, pp. 1-7.

Halder, S.J. et al., "Advanced Smoothing Approach of RSSI and LQI for Indoor Localization System", International Journal of Distributed Sensor Networks, received Jul. 25, 2014; accepted Nov. 3, 2014, pp. 1-13.

Lindh, J., "Bluetooth Low Energy Beacons", Texas Instruments Corporation Application Report, Jan. 2015, pp. 1-13.

(56) References Cited

OTHER PUBLICATIONS

"Real-time locating system", available at https://en.wikipedia.org/wiki/Real-time_locating_system as of Feb. 6, 2014.
http://www.onyxbeacon.com/ available as of Jun. 25, 2014.
http://developer.estimote.com/ available as of Aug. 13, 2015.
https://getpixie.com available as of Aug. 23, 2014.
http://www.slideshare.net/localzco/whats-bestmicrolocationtechnologyibeaconblenfcqrgps available as of Apr. 5, 2014.
International Search Report and the Written Opinion of the International Searching Authority for International Application No. PCT/US2017/027686 dated Aug. 14, 2017.
Invitation to Pay Additional Fees for International Application PCT/US2017/027686 dated Jun. 7, 2017.

\* cited by examiner

ANTENNAS ON NON-MOVABLE PARTS OF EQUIPMENT
(DIFFERENT THRESHOLDS)

ANTENNAS ON NON-MOVABLE MOVABLE PARTS OF EQUIPMENT

5 ANTENNAS, LIMITED FOV, WHEEL WELLS + REAR
(NO FRONT ZONE) (EXTERNAL SHOWN)

2 ANTENNAS, TOP + BOTTOM OF VEHICLE
360° FIELD OF VIEW
(ONLY EXTERNAL SHOWN)

POTENTIAL INTERIOR ANTENNA CONFIGURATION
4, CENTERS (INTERNAL SHOWN)

POTENTIAL INTERIOR ANTENNA CONFIGURATION
4, CORNERS (INTERNAL SHOWN)

POTENTIAL INTERIOR ANTENNA CONFIGURATION
1, CENTER, 360° FOV (DOES NOT BOUND INTERIOR)

POTENTIAL INTERIOR ANTENNA CONFIGURATION
2, CENTERS (DOES NOT BOUND INTERIOR FRONT/REAR)

POTENTIAL INTERIOR ANTENNA CONFIGURATION
2, CENTERS (LIMITED FOV, MAY BOUND FRONT/REAR)

POTENTIAL INTERIOR ANTENNA CONFIGURATION
4, CENTERS + VEHICLE CENTER
(DOES NOT BOUND FRONT/REAR)

TRIANGLUATION (1-2) MULTIANGULATION (4-8)

METHOD AND SYSTEM FOR ESTABLISHING MICROLOCATION ZONES

TECHNICAL FIELD

The present disclosure is directed to a system and method of creating microlocation zones by defining virtual boundaries using a system of one or more transmitters and one or more receivers with one or more spatially-correlated antennas.

BACKGROUND

Significant efforts have been made toward enabling the utilization of smartphones as keys to access or command the operation of an equipment device, such as a door or a vehicle. Conventional systems may rely on signal strength of communications to determine relative distance and/or position between a transmitter and a receiver. For instance, many conventional systems measure signal strength with a directional antenna to determine the relative distance and/or position between a transmitter and a receiver. This conventional arrangement has several limitations, but the principal limitation is location accuracy. Several factors can affect location accuracy. Examples of such factors include physical boundaries, external objects, and moving objects, and moving aspects of the equipment device. Conventional systems may fail to achieve or maintain location accuracy in view of these or other factors.

SUMMARY OF THE DESCRIPTION

The present disclosure is directed to a method and system of creating microlocation zones by defining virtual boundaries using a system of one or more transmitters and one or more receivers with one or more spatially-correlated antennas.

In one embodiment, a system is provided for establishing location information with respect to a portable device and an object. The system may include a master device and a plurality of antennas. The master device may be disposed in a fixed position relative to the object, and may be capable of communicating with at least one of the portable device and one or more sensor devices. Each of the plurality of antennas may be configured to receive wireless communications, where a signal characteristic of the wireless communications is detected via an antenna signal output from each of said plurality of antennas.

In one embodiment, the signal characteristic is a measurement (or a derivation of a measurement, such as a computed distance or time of flight) of the antenna signal output. A plurality of time-spaced measurements of the signal characteristic may be conducted to form a measured characteristic signal. The measurements may be conducted with respect to wireless communications that occur at two or more of a plurality of different frequencies. For instance, the portable device may transmit communications at a frequency within a set of different frequencies. The frequency of transmission may vary over time among the set of different frequencies. The measurements of the antenna signal output may be correlated in time and frequency with measurements from another antenna signal output.

In one embodiment, the measurements of the antenna signal output may be smoothed according to a smoothing function with the smoothed output forming the basis for a location determination with respect to the portable device.

In one embodiment, one or more a combined signals may be determined as a function of at least two characteristic signals from a single antenna and/or at least two characteristic signals from two or more separate antennas. For instance, the function may be a difference function and the combined signal may be a differential signal with respect to the at least two characteristic signals. The combined signal may be correlated in time with the at least two characteristic signals, and the at least two characteristic signals may be correlated in time and frequency, as noted above. A location of the portable device may be determined relative to the object based on the combined signal. The function may mitigate fading and other environmental effects present in the at least two of said detected signal characteristics. The function applied to at least two characteristic signals may be different from another function applied to at least two characteristic signals. In one embodiment, a combined signal may be determined as a function of at least two aspects of a single characteristic signal that occur at different times.

In one embodiment, the master device is configured to determine the combined signal and the location of the portable device based on the combined signal. In one embodiment, the at least one sensor device may communicate one or more signal characteristics of the combined signal to the master device via a communication channel separate from a communication channel used for reception of the wireless communications.

In one embodiment, the characteristic signals are correlated in time and frequency with respect to wireless communications received by the plurality of antennas. In one embodiment, a first antenna and a second antenna of said plurality of antennas are spatially correlated such that the first and second antennas are separated by a ground plane or other object that may divide the RF path between two or more antennas (e.g., an attenuator or a reflector).

In one embodiment, the plurality of antennas are arranged and the signal output from the plurality of antennas is analyzed to define a plurality of zones that define at least one virtual boundary. In one embodiment, the at least two of the measurements are conducted with respect to different communication frequencies.

In one embodiment, one or more signal characteristics of the wireless communications are detected via antenna signal output from said plurality of antennas. The one or more signal characteristics may include at least one of a time of flight characteristic, a signal strength characteristic, and an angle of arrival/departure characteristic, where a location of the portable device is determined relative to the object based on the one or more signal characteristics of the wireless communications. In one embodiment, the one or more signal characteristics of the wireless communications may include a plurality of one type of signal characteristic (e.g., two signal strength readings, two angle of arrival measurements).

In one embodiment, the plurality of antennas may include first and second antennas arranged to define a first virtual boundary between first and second zones, where a position of the portable device relative to the first virtual boundary is determined based on a difference between a first signal characteristic determined from antenna signal output from the first antenna and a second signal characteristic determined from antenna signal output from the second antenna. The plurality of antennas may include third and fourth antennas arranged to define a second virtual boundary between third and fourth zones, where a position of the portable device relative to the second virtual boundary is determined based on a difference between a third signal characteristic determined from antenna signal output from the third antenna and a fourth signal characteristic determined from antenna signal output from the fourth antenna. In one embodiment, a virtual boundary may be defined between a) a zone based on an arrangement of the first and second antennas and b) a zone corresponding to the third antenna, and likewise between a) a zone based on the arrangement of the first and second antennas and b) the fourth antenna.

Figure 1:
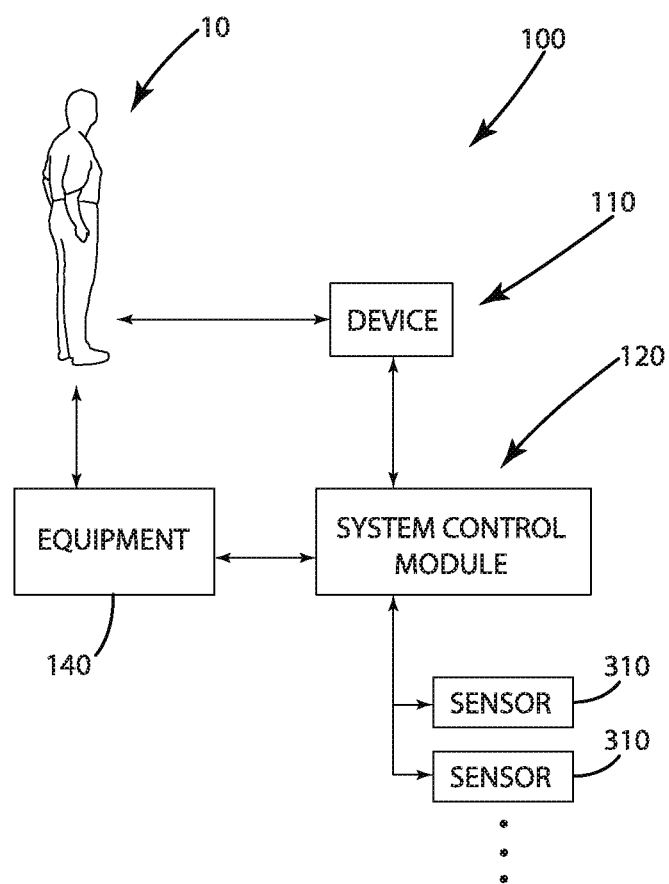
FIG. 1 shows a representative view of a system in accordance with one embodiment.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

A. System Overview

A.1 System Architecture

The present disclosure is directed to a method and system of creating microlocation zones by defining virtual boundaries using a system of one or more transmitters and one or more receivers with one or more spatially-correlated antennas. Such a system is designated 100 in the illustrated embodiment of FIG. 1.

The present disclosure addresses several failings of conventional systems, and provides system component (sensor) designs, that may use signal processing methods and techniques. The system and method for combining sensors is also described, such that they may be assembled and processed using the described methods to produce variable, user-defined configurations in a variety of applications/embodiments, including, but not limited to, microlocation systems that operate using Bluetooth Low Energy (BLE).

The system and method may use directional and/or omnidirectional antennas to determine relative distance and/or position using received signal strength indicators (RSSIs) (e.g., possibly employing trilateration, fingerprinting, etc.), time-of-flight measurements, angle-of-arrival/departure (AoA, e.g., possibly employing triangulation, etc.), or any number of other established distance measuring and/or positioning techniques.

One embodiment according to the present disclosure uses a differential technique based upon measured RSSIs to determine in which zone a device is located, but the system is not limited to using RSSI nor is the use of any one or more particular positioning techniques to create or determine microlocation zones precluded (e.g., the zone of a device may be determined using the differential of the most likely AoA, earliest arrival time, triangulated position, trilaterated position, and so on, instead of, or in addition to, measured RSSI).

While the embodiments described herein describe the use of radio frequency signaling, other types of signaling may be used, contingent upon the suitability and limitations present using those other types of signaling. For example, it may be possible to use light or sound as an alternative to radio frequency signals.

Figure 4:
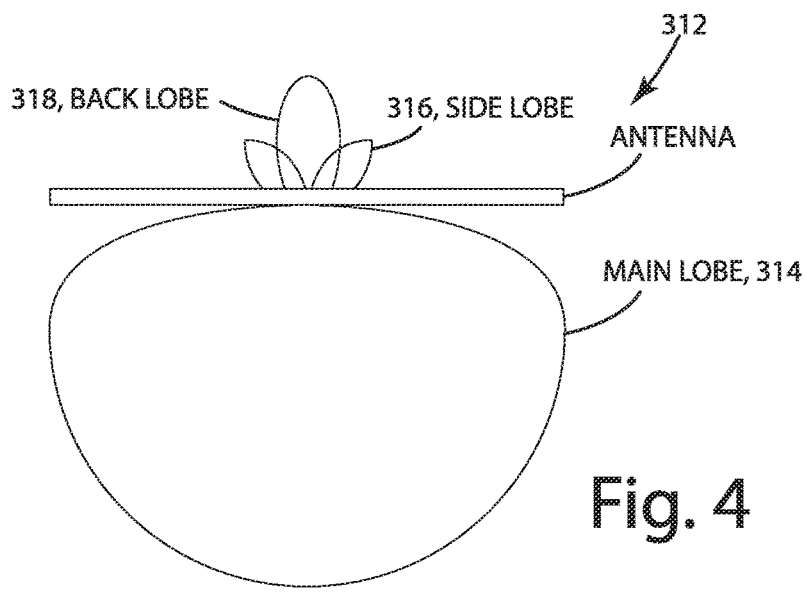
FIG. 4 depicts directional antenna radiation pattern features in accordance with one embodiment.

In one embodiment, an antenna is provided similar to the one shown in FIG. 4 and designated 312. The illustrated embodiment of FIG. 4 shows an antenna 312 that is directional, but the present disclosure is not so limited—the antenna 312 may be configured differently, including configured as an omnidirectional antenna. The antenna configuration of the directional antenna in one embodiment may be such that the characteristic radiation pattern is sufficient for the application of one or more embodiments described herein. In one embodiment, the antenna 312 is configured to include an emphasized main lobe 314 and minimized (or reduced size) side and back lobes 316, 318. Note that in the illustrations provided, the radiation patterns shown are meant to show typical patterns, but are not restricted to the shape or shapes shown; the actual radiation pattern may vary and may be impacted by the construction of the sensor (including the antenna) and the materials surrounding the sensor (to the possible advantage or detriment of the system). Subsequent illustrated embodiments may use a simplified antenna radiation pattern to illustrate the radiation pattern (ellipse or similar).

A.2 Antenna Reciprocity

In the following method and system described, the directional antenna may be connected to a transmitter or receiver. For instance, the antenna 312 may be incorporated into or coupled to a sensor 310 (also described as a remote device). As another example, the antenna 312 may be incorporated into or coupled to one or more of the following: system control module 120, equipment components 140, and a portable device 110. Any one of these example devices may be configured to transmit or receive, or both, using the antenna 312. There are a variety of antenna embodiments described herein, some of which include more than one antenna 312. In this way, an antenna 312 may itself be comprised of more than one type of antenna 312 in accordance with one or more embodiments of the antenna 312 described herein. For instance, an antenna 312 may include first and second antennas 312 arranged to focus on first and second zones 400. Any of the embodiments described herein may use any one or more of the antennas 312 described herein.

A.3 Definition of Sensor

For the subsequent explanations, the part of the transmitter/receiver system connected to the antenna will be referred to as the sensor 310.

A.4 Definition of Device

For the subsequent explanations, the part of the transmitter/receiver system opposite from the sensor will be referred to as the device 110. The device 110 may or not be portable, but in several of the embodiments shown, it is portable. This portability may be associated with the device 110 being carried by a human. In one embodiment, the device 110 is the object whose position is of interest relative to sensors 310; however, the reverse may also be true, wherein the device 110 is configured to determine the location of sensors 310 relative to itself.

Described herein is a system 100 in one embodiment in which sensors 310 may be used in conjunction with each other to create application-specific microlocation systems; that is, sensors 310 may be used in conjunction with each other to create microlocation zones that may be used to determine the relative position of a device 110. One or more aspects of the system 100 may be implemented in conjunction with one or more aspects of the microlocation systems described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE, U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosures of which are incorporated herein by reference in their entirety. The system 100 may include sensors 310 equipped with the subsequently described antenna configurations 312.

A.5 System Components

A system according to one embodiment is shown in FIG. 1 and generally designated 100. The system 100 may include one or more of the following system components: a) one or more users 10 (e.g., people); b) one or more devices 110, such as portable devices (e.g., smartphones, cards or fobs, or a combination thereof) and/or fixed devices (e.g., computers/servers, or wall-mounted panels/displays, or a combination thereof; c) one or more system control modules (SCM) 120, also described as hardware; d) one or more sensors 310 (which may be optional); and e) one or more equipment components 140, which may be configured for controlling equipment operations, activating services thereon, relaying information to another aspect of the system 100, or retrieving information from another aspect of the system 100, or a combination thereof.

The system 100 may allow the one or more users 10 to interact with or access the equipment 140 using the device 110. The device 110 may communicate with the equipment 140 (such as a vehicle, a lock, or a table) by communicating with the SCM 120. The SCM 120 in one embodiment may authenticate the device 110, provide or receive configuration data, authorize actions (e.g., to connect or to send and/or receive a request, a command, an update, or a response, or a combination thereof), or communicate with the equipment component 140 to achieve a desired action, or a combination thereof. The device 110 may communicate with a cloud (not shown) to obtain, change, or distribute, or a combination thereof, authorizations (described herein), and other configuration data, amongst relevant devices and users. An example of such a system is shown and described in U.S. patent application Ser. No. 15/796,180 to Smith et al., filed Oct. 27, 2017, entitled SYSTEM AND METHOD FOR AUTHENTICATING AND AUTHORIZING DEVICES— the disclosure of which is hereby incorporated by reference in its entirety.

A.5.a Communications and Interaction Overview

The communication links between the one or more system components depicted in the illustrated embodiment of FIG. 1 may be wireless or wired, or both. One system component, such as the device 110, may be local or remote relative to another system component, such the SCM 120. The system 100 may include any number of each system component, including embodiments in which the number is zero such as where no equipment is present.

In one embodiment, the roles of a system component in the system 100 are not necessarily fixed as one type of component. For instance, a system component may change roles dynamically during operation, or a system component may take on the role of two or more components of the system 100. For instance, the SCM 120 may be the equipment component 140 for another SCM 120. In a more specific form of this example, the SCM 120 may be the equipment component 140 communicating with the other SCM 120. For purposes of disclosure, the remaining discussion focuses upon a system 100 wherein the one or more equipment components 140 exist—although it should be understood that one or more of these system components may be absent. Optionally, the system 100 may be configured to communicate with another system, such as a cloud system of devices.

A.5.b Component Overview

The system 100 in the illustrated embodiment may include one or more system components as outlined herein. A system component may be a user or an electronic system component, which may be the device 110, the SCM 120, the equipment component 140, or the cloud, or a combination thereof. The electronic system component, as discussed herein, may be configured to operate as any one or more of these devices. In this sense, in one embodiment, there may be several aspects or features common among the device 110, the SCM 120, the equipment component 140, and the cloud. For purposes of disclosure, these features are described in connection with the electronic component depicted in FIG. 2 and generally designated 200.

The electronic system component 200 (e.g., all system components, except users) may include one or more processors 210 that execute one or more applications 232 (software and/or includes firmware), one or more memory units 212 (e.g., RAM and/or ROM), and one or more communications units 214, amongst other electronic hardware. The electronic system component 200 may or may not have an operating system 230 that controls access to lower-level devices/electronics via a communication unit 214. The electronic system component 200 may or may not have hardware-based cryptography units 222—in their absence, cryptographic functions may be performed in software. The electronic system component 200 may or may not have (or have access to) secure memory units 220 (e.g., a secure element or a hardware security module (HSM)). Optional components and communication paths are shown in phantom lines in the illustrated embodiment.

The system 100 in the illustrated embodiment is not dependent upon the presence of a secure memory unit 220 in any component. In the optional absence of a secure memory unit 220, data that may be stored in the secure memory unit 220 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 214 may be any type of communication link, including any of the types of communication links describe herein, including wired or wireless. The communication interface 214 may facilitate external or internal, or both, communications. For instance, the communication interface 214 may be coupled to or incorporate an antenna 312.

As another example, the communication interface 214 may provide a wireless communication link with another system electronic device 200 in the form of the device 110, such as wireless communications according to the Bluetooth LE standard, or the cloud 130 via WiFi Ethernet communication link. In another example, the communication interface 214 may be configured to communicate with the equipment component 140 (e.g., a vehicle component) via a wired link such as a CAN-based wired network that facilitates communication between a plurality of devices. The communication interface 214 in one embodiment may include a display and/or input interface for communicating information to and/or receiving information from the user 10.

Figure 2:
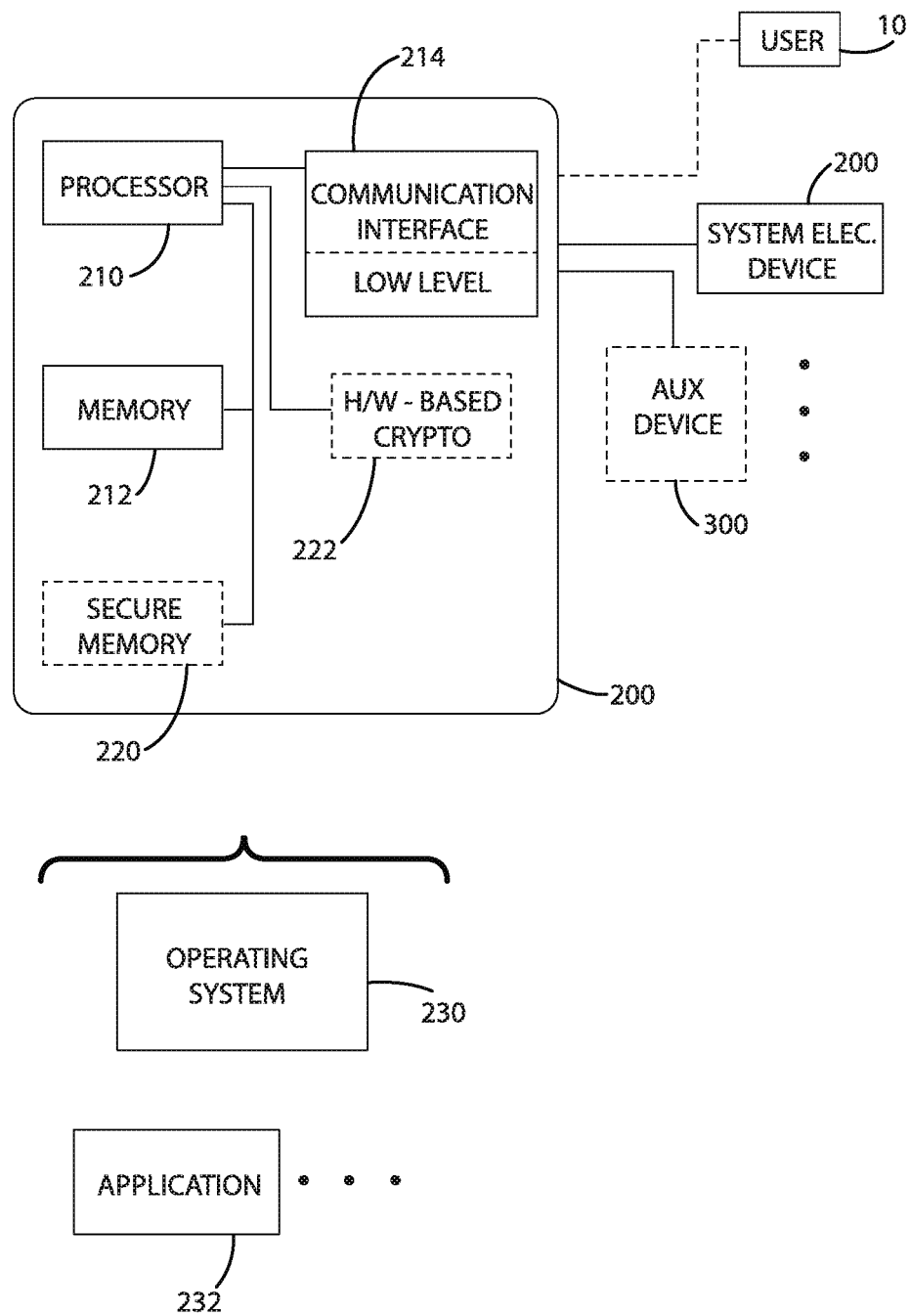
FIG. 2 shows a representative view of an electronic component in accordance with one embodiment.

In one embodiment, shown in FIG. 2, the electronic system component 200 may be configured to communicate with one or more auxiliary devices 300 other than another electronic system component 200 or a user. The auxiliary device 300 may be configured differently from the electronic system component 200—e.g., the auxiliary device 300 may not include a processor 210, and instead, may include at least one direct connection and/or a communication interface for transmission or receipt, or both, of information with the electronic system component 200. For instance, the auxiliary device 300 may be a solenoid that accepts an input from the electronic system component 200, or the auxiliary device 300 may be a sensor (e.g., a proximity sensor) that provides analog and/or digital feedback to the electronic system component 200.

A.5.c Micro-Location

The system 100 in the illustrated embodiment may be configured to determine location information in real-time with respect to the device 110. In the illustrated embodiment of FIG. 1, the user 10 may carry the device 110 (e.g., a smartphone). The system 100 may facilitate locating the device 110 with respect to the equipment 140 (e.g., a vehicle) in real-time with sufficient precision to determine whether the user is located at a position at which access to the equipment or permission for an equipment command should be granted.

For instance, in the realm of vehicles where the equipment 140 is a vehicle, the system 100 may facilitate determining whether the device 110 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the device 110 is outside the vehicle and not in close proximity to the driver-side door (e.g., outside the range of 2 feet, 3 feet, or 5 feet), the system 100 may determine to lock the driver-side door. As another example, if the system 100 determines the device 110 is in close proximity to the driver-side seat but not in proximity to the passenger seat or the rear seat, the system 100 may determine to enable mobilization of the vehicle. Conversely, if the device 110 is determined to be outside close proximity to the driver-side seat, the system 100 may determine to immobilize or maintain immobilization of the vehicle.

The vehicle in this context may also include other types of equipment 140, such as one or more sensors 310 described in connection with the illustrated embodiment of FIG. 3. The one or more sensors 310 may be constructed in a manner similar to an embodiment described in connection with the electronic system component 200.

Micro-location of the equipment 140 may be determined in a variety of ways, such as using information obtained from a global positioning system, one or more signal characteristics of communications from a device 110, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

Figure 3:
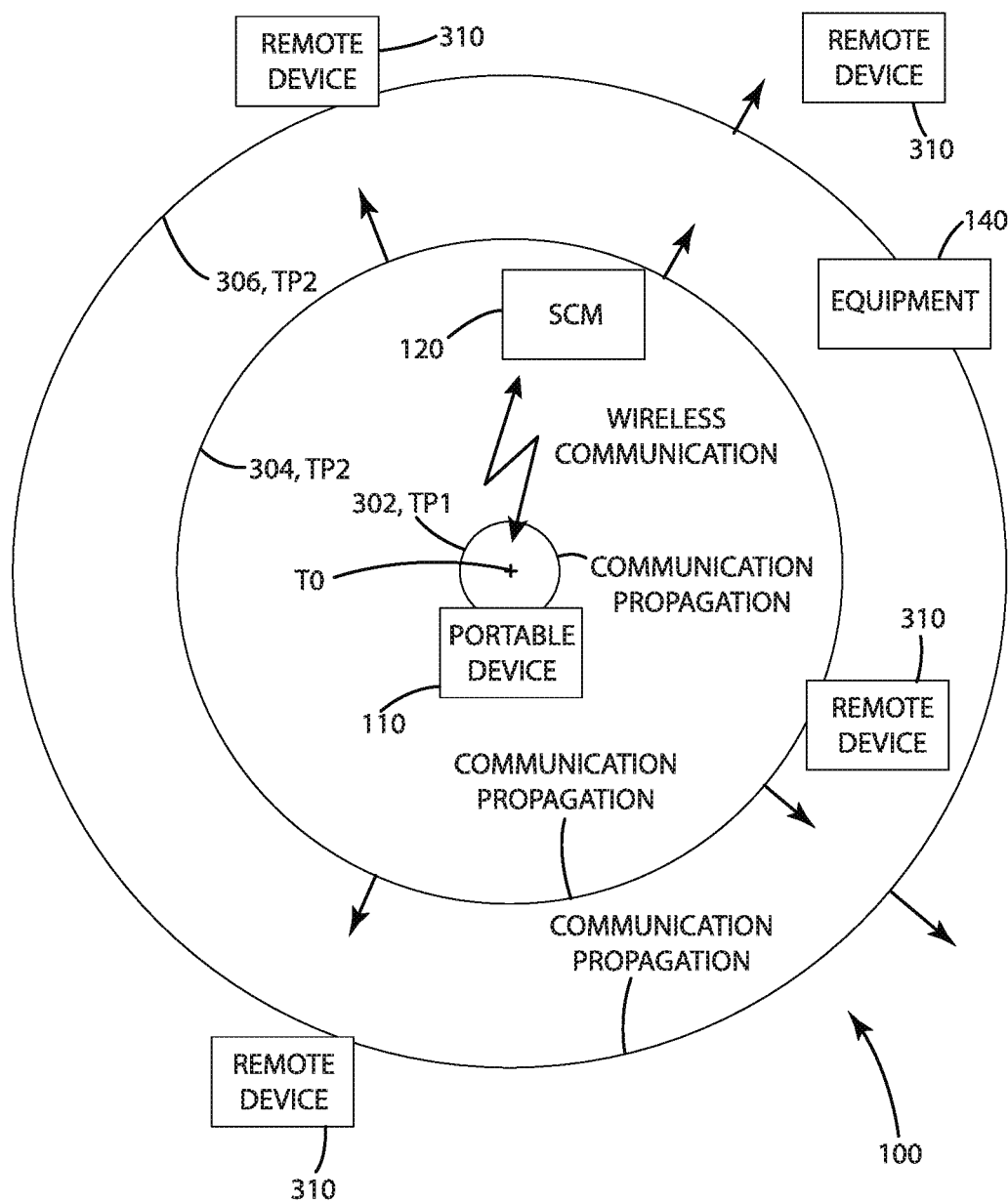
FIG. 3 shows system in accordance with one embodiment.

In one embodiment, in the illustrated embodiment of FIG. 3, the SCM 120 and a plurality of sensors 310 may be disposed on or in a fixed position relative to the equipment component 140. Example use cases of the equipment component 140 include the vehicle identified in the prior example, or a building for which access is controlled by the equipment component 140. The sensors 310 in the illustrated embodiment may include one or more antennas 312 as described herein. The arrangement or position of the sensors 310 may be in accordance with one or more embodiments described herein. Signal processing of the SCM 120 may be in accordance with one or more embodiments described herein.

The device 110 may communicate wirelessly (e.g., via Bluetooth LE) with the SCM 120 via a communication link. The plurality of sensors 310 may be configured to sniff the communications between the device 110 and the SCM 120 to determine one or more signal characteristics of the communications, such as signal strength. The determined signal characteristics may be communicated or analyzed and then communicated to the SCM 120 via a communication link separate from the communication link between the device 110 and the SCM 120. Additionally, or alternatively, the device 110 may establish a direct communication link with one or more of the sensors 310, and the one or more signal characteristics may be determined based on this direct communication link.

As an example, as shown in the illustrated embodiment, the propagation waves of communications from the device 110 to the SCM 120 are shown and designated 302, 304, 306. The greater the distance from the device 110 (the source), the lesser the strength of the wireless communications. The strength of the communications about the propagation wave 306 is less than the strength of the propagation wave 302. Further, in the case of a communication being transmitted at time t0, the travel time (tp1-t0) for the communication at the propagation wave 302 is less than the travel time (tp3-t0) for the communication at propagation wave 306. As a result, if a sensor 310 receives the communication at the propagation wave 302, the time stamp for arrival of the communication may be earlier than if the communication were received at the propagation wave 306.

As described herein, one or more signal characteristics, such as signal strength and time of arrival, may be analyzed to determine location information about the device 110 relative to the SCM 120. For instance, time difference of arrival among the sensors 310 and the SCM 120 may be processed to determine a relative position of the device 110. The positions of the one or more sensors 310 relative to the SCM 120 may be known so that the relative position of the device 110 can be translated to an absolute position with respect to the sensors 310 and the SCM 120. Additional or alternative examples of signal characteristics may be obtained to facilitate determining position according to one or more algorithms, including a distance function, trilateration function, a triangulation function, a multilateration function, a fingerprinting function, a differential function, a time of flight function, a time of arrival function, a time difference of arrival function, an angle of arrival function, an angle of departure function, a geometric function, etc., or any combination thereof.

It should be noted that for purposes of illustration, the propagation waves 302, 304, 306 are depicted as uniformly circular—however, the propagation waves may vary in shape depending on other factors such as interference or use of a directional antenna.

In one embodiment, information relating to the communications between the device 110 and the SCM 120 may be provided to the plurality of sensors 310. For instance, connection parameters relating to a Bluetooth LE channel may be provided to the sensors 310 so that the plurality of sensors 310 can monitor the communications. For instance, the communication channel may vary one or more parameters during communications, such as the frequency of transmissions from packet to packet or among bits transmitted in the packet. These one or more variable parameters may be communicated to the sensors 310 to enable receipt of packets or communications.

Figure 5:
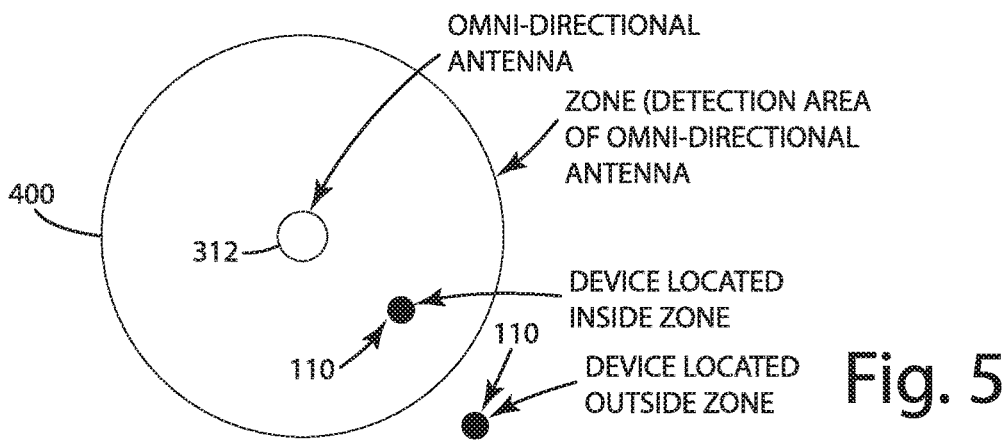
FIG. 5 shows an omni directional antenna with one zone in accordance with one embodiment.

B. One or More Example Antenna Configurations Adopted in One or More Embodiments B.1 Omni-Directional Antenna An antenna 312 in accordance with one embodiment is shown in the illustrated embodiment of FIG. 5. The antenna 312 in the illustrated embodiment is a single omni-directional antenna configured to produce a roughly circular zone of reception, also described as a zone 400. A device 110 location can be in one of two states, either in the zone 400, or not. An example of such an antenna configuration is shown in the illustrated embodiment of FIG. 3. The zone radius or radius of the zone 400 may be defined either by a threshold (RSSI, computed distance from origin, etc.) or it may be defined by the receive range of the antenna 312.

Figure 6:
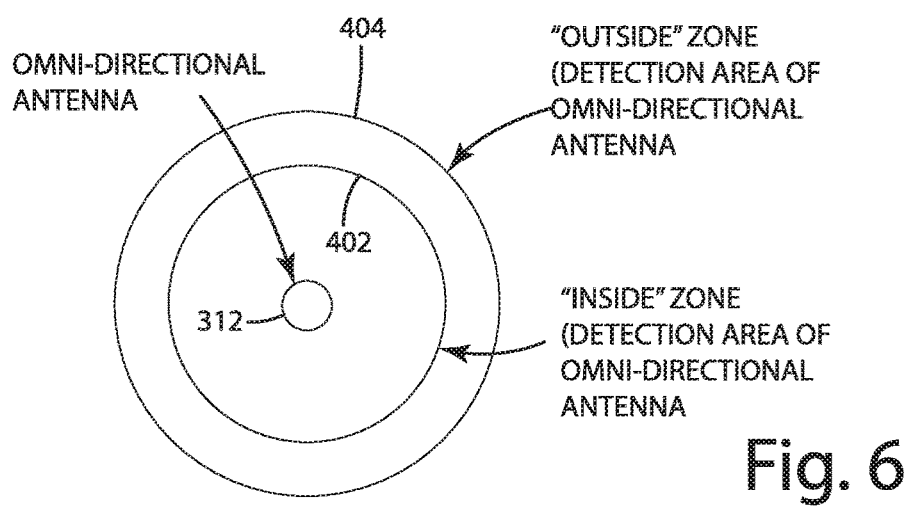
FIG. 6 depicts an omni directional antenna with two zones in accordance with one embodiment.

Additionally, multiple thresholds may be defined, such that there are multiple zones 400 within the receive range of the antenna 312. An example of such an antenna configuration is shown in FIG. 6, and includes an outside zone 404 and an inside zone 402.

B.2 Directional Antenna with One Zone

Figure 7:
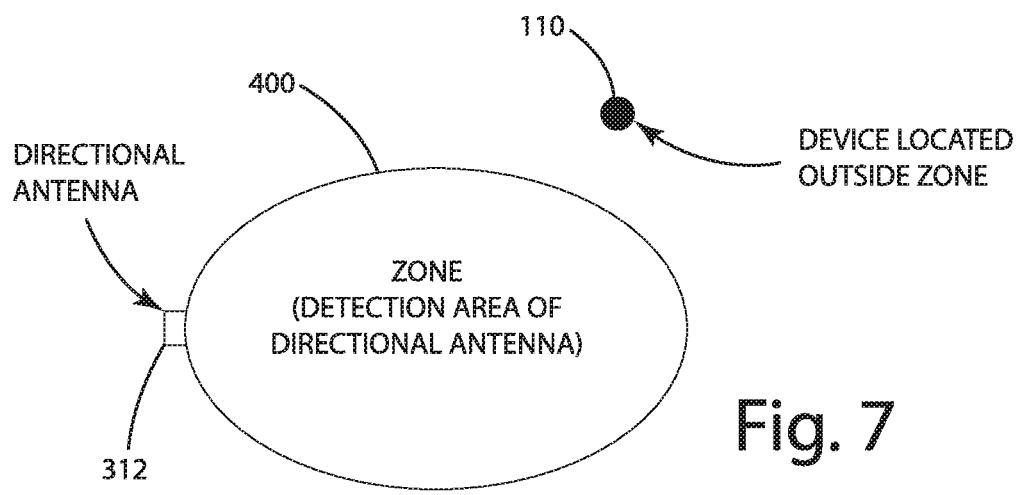
FIG. 7 shows one directional antenna creating one zone, with device outside of the zone of reception in accordance with one embodiment.
Figure 8:
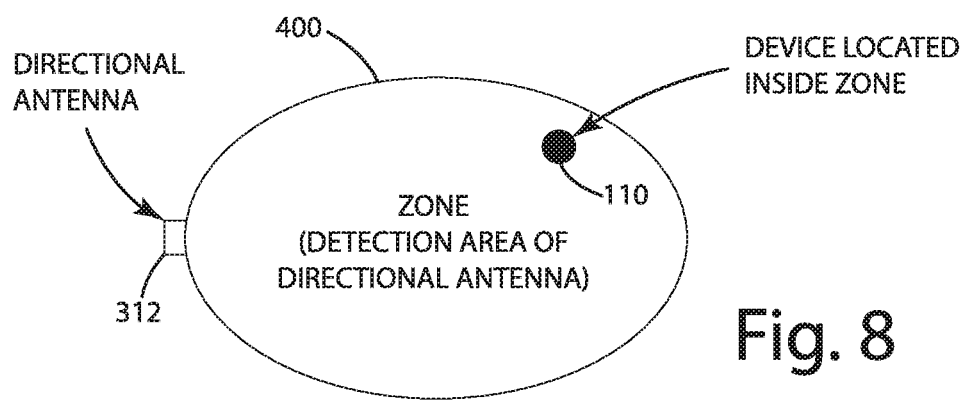
FIG. 8 shows one directional antenna creating one zone, with device inside of zone of reception in accordance with one embodiment.

A single directional antenna 312 is shown in the illustrated embodiments of FIGS. 7 and 8. The directional antenna 312 in the illustrated embodiment is configured to produce one zone 400 of reception. A device location can be in one of two states, either in the zone 400, or not. The zone field 400 (or zone area 400) may be defined either by a threshold (RSSI, computed distance from origin, etc.) or it may be defined by the receive range of the antenna 312. Additionally, multiple thresholds may be defined, such that there are multiple zones 400 within the receive range of the antenna 312.

B.3 One Directional Antenna Pair with Two Zones and One Virtual Boundary

Figure 9:
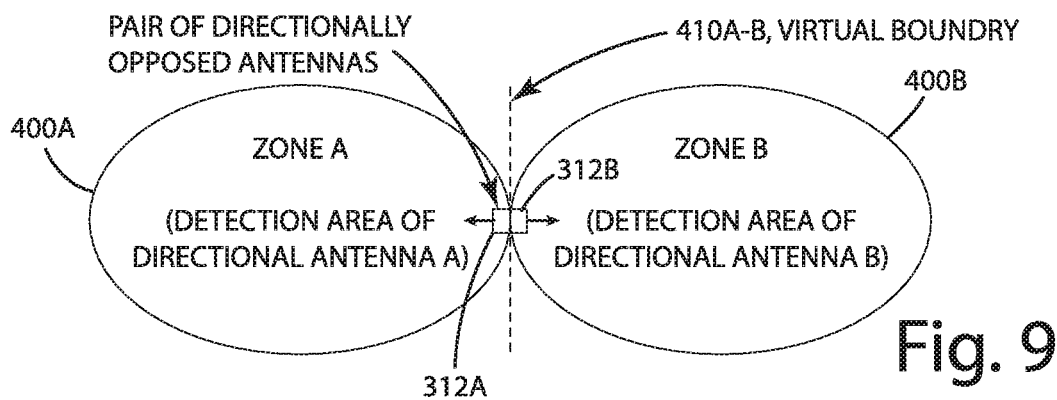
FIG. 9 depicts two back-to-back directional antennas producing two zones and one boundary in accordance with one embodiment.
Figure 10:
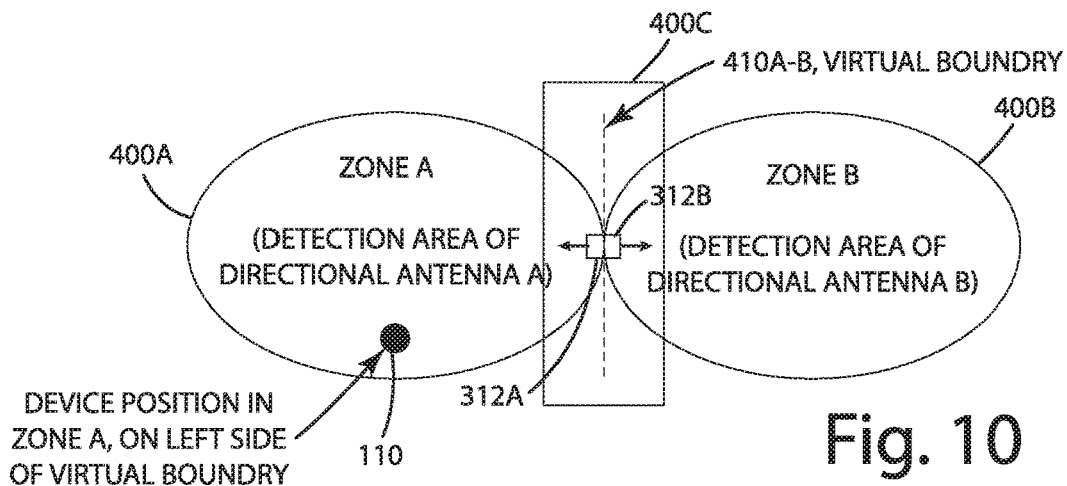
FIG. 10 shows device located on "left" side of virtual boundary, in Zone A in accordance with one embodiment.
Figure 11:
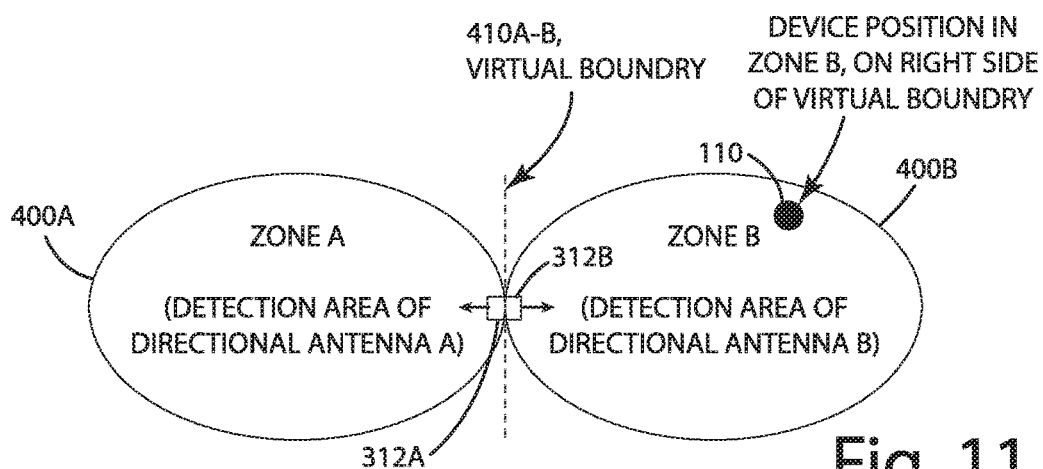
FIG. 11 shows device located on "right" side of virtual boundary, in Zone B in accordance with one embodiment.

One embodiment of an antenna 312 in a paired configuration with one virtual boundary 410 is shown in FIGS. 9-11. In the illustrated embodiments, two spatially correlated directional antennas, designated 312A, 312B, (i.e., a pair), whose antenna boresights are oriented opposite to each other, yield two zones 400A, 400B, as well as one virtual boundary 410A-B between the two zones 400A, 400B. Alternatively, one embodiment of the antenna 312 may be configured with a first antenna 312 and a second antenna 312 with boresights not oriented opposite, but separated by a ground plane, or other object that may divide the RF path between two or more antennas (e.g., an attenuator or a reflector), to yield two zones 400. The ground plane or other object that divides the RF path (e.g., an attenuator or a reflector) may yield a similar effect as the oppositely oriented boresights.

In one embodiment, such an antenna 312 pair, each antenna 312 may be coupled to a sensor 310 (e.g., two sensors 310 each with one antenna 312), wherein each sensor 310 may communicate measurements substantially simultaneously to a master device 120. In another embodiment of such an antenna 312 pair, both antennas 312 may be coupled to one sensor 310 (i.e., one sensor 310 with two antennas 312), wherein the sensor 310 may switch antennas 312 between messages, or between individual elements of a message, to communicate measurements from both antennas 312 substantially simultaneously to a master device 120; for example, in an embodiment using BLE, the sensor 310 may switch antennas 312 between the individual data packets of a connection event. In yet another embodiment wherein a sensor 310 is connected to multiple antennas 312, instead of switching between each antenna 312, two or more antenna 312 outputs may be fed in parallel to the sensor 310, allowing the sensor 310 to obtain measurements from antennas 312 substantially simultaneously (e.g., as described herein in Section C.9.e).

In a variation of the illustrated embodiment, 312A and/or 312B may be directional and/or omnidirectional antennas wherein any divider is present that attenuates or reflects signals between antennas 312A and 312B (e.g., such as a ground plane, sheet metal, wood, water, etc.). Additionally, multiple thresholds may be defined, such that there are multiple zones 400 within the receive range of the antennas. For purposes of disclosure, the antennas 312, the zones 400 and the virtual boundary 410 are provided with letter designations to aid correlation among the zones 400 and virtual boundaries 410 to one or more antennas 312. It should be understood that the zones 400, virtual boundaries 410 and the one or more antennas 312 provided with letter designations are not limited to any one type of configuration—for instance, for an antenna designated 312A in an illustrated embodiment, any embodiment of antenna 312 may be implemented in conjunction with the antenna 312, including the embodiment shown in the illustration. For instance, rather the antenna 312A being a directional antenna configuration, the antenna 312A may be an omnidirectional antenna configuration.

In the illustrated embodiments of FIGS. 10 and 11, with the antennas 312A, 312B and the device 110 being within reception range of each other, the relative position between the antenna 312 and device 110 can be in Zone 400A or in Zone 400B. If the antennas 312A, 312B and the device 110 are not within reception range of each other (outside of Zone 400A and outside of Zone 400B), the relative position between the antennas 312A, 312B and device 110 is unknown. In the two directional antenna example, assuming the device 110 is in range, it may be possible to determine which side of the virtual boundary 410A-B a device 110 is located. Depending upon the selected thresholds used to determine Zone 400A or Zone 400B, it may be possible for the device 110 to be determined to be in both zones simultaneously (e.g., along or close to the virtual boundary), in which case, the position of device 110 may be considered to be unknown, in both zones, in a prior determined zone, or in a new "inbetween" zone (designated 400C in the illustrated embodiment of FIG. 10). Similar inbetween zones may be detected with respect to boundaries between zones in one or more embodiments described herein.

B.4 Three Directional Antennas with Three Zones and Three Virtual Boundaries

Figure 12:
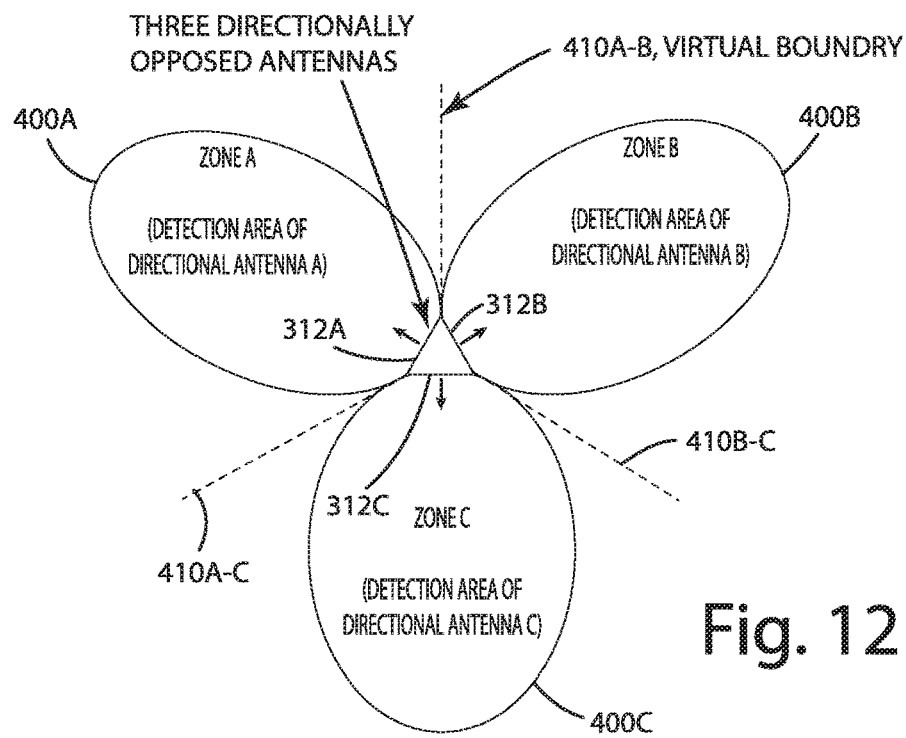
FIG. 12 depicts three back-to-back directional antennas, producing three zones and three boundaries in accordance with one embodiment.

One embodiment with three antennas 312 forming a triplet with three virtual boundaries 410 is shown in FIG. 12. In the illustrated embodiment, three spatially correlated directional antennas 312A, 312B, 312C are provided. The directional antennas 312A, 312B, 312C are configured with antenna boresights oriented opposite to each other, yielding three zones 400A, 400B, 400C, as well as three virtual boundaries 410A-B, 410B-C, 410A-C, between the three zones 400A, 400B, 400C. In one embodiment of such an antenna 312 triplet, each antenna 312 may be coupled to a sensor 310 (i.e., three sensors 310 each with one antenna 312), wherein each sensor 310 may communicate measurements substantially simultaneously to a master device 120. In another embodiment of such an antenna 312 triplet, both antennas 312 may be coupled to one sensor 310 (i.e., one sensor 310 with three antennas 312), wherein the sensor 310 may switch antennas 312 between messages, or between individual elements of a message, to communicate measurements from both antennas 312 substantially simultaneously to a master device 120; for example, in an embodiment using BLE, the sensor 310 may switch antennas 312 between the individual data packets of a connection event. In yet another embodiment wherein a sensor 310 is connected to multiple antennas 312, instead of switching between each antenna 312, two or more antenna 312 outputs may be fed in parallel to the sensor 310, allowing the sensor 310 to obtain measurements from antennas 312 substantially simultaneously (e.g., as described herein in Section C.9.e).

In a variation of the illustrated embodiment, 312A, 312B and/or 312C may be directional and/or omnidirectional antennas wherein any divider is present that attenuates or reflects signals between antennas 312A, 312B, and 312C (e.g., such as a ground plane, sheet metal, wood, water, etc.). Additionally, multiple thresholds may be defined, such that there are multiple zones within the receive range of the antennas 312A, 312B, 312C.

In one embodiment, with the antennas 312A, 312B, 312C and the device 110 within reception range of each other, the relative position between the antennas 312A, 312B, 312C and device 110 can be in in Zone 400A, Zone 400B or in Zone 400C. If the antennas 312A, 312B, 312C and the device 110 are not within reception range of each other (outside of Zone 400A, Zone 400B and outside of Zone 400C), the relative position between the antenna and device 110 is considered unknown with respect to antennas 312A, 312B, 312C.

B.5 TWO Directional Antenna Pairs with Four Zones and Two Virtual Boundaries

Figure 13:
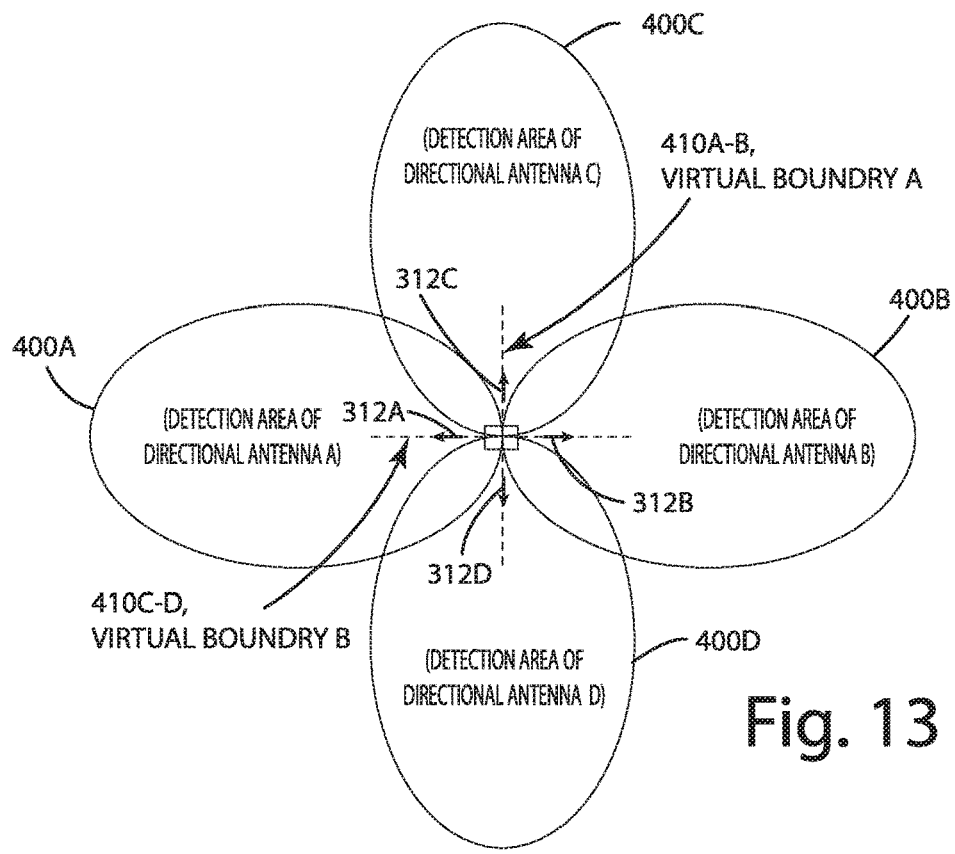
FIG. 13 shows four back-to-back directional antennas with antenna boresight in opposite orientation in accordance with one embodiment.
Figure 14:
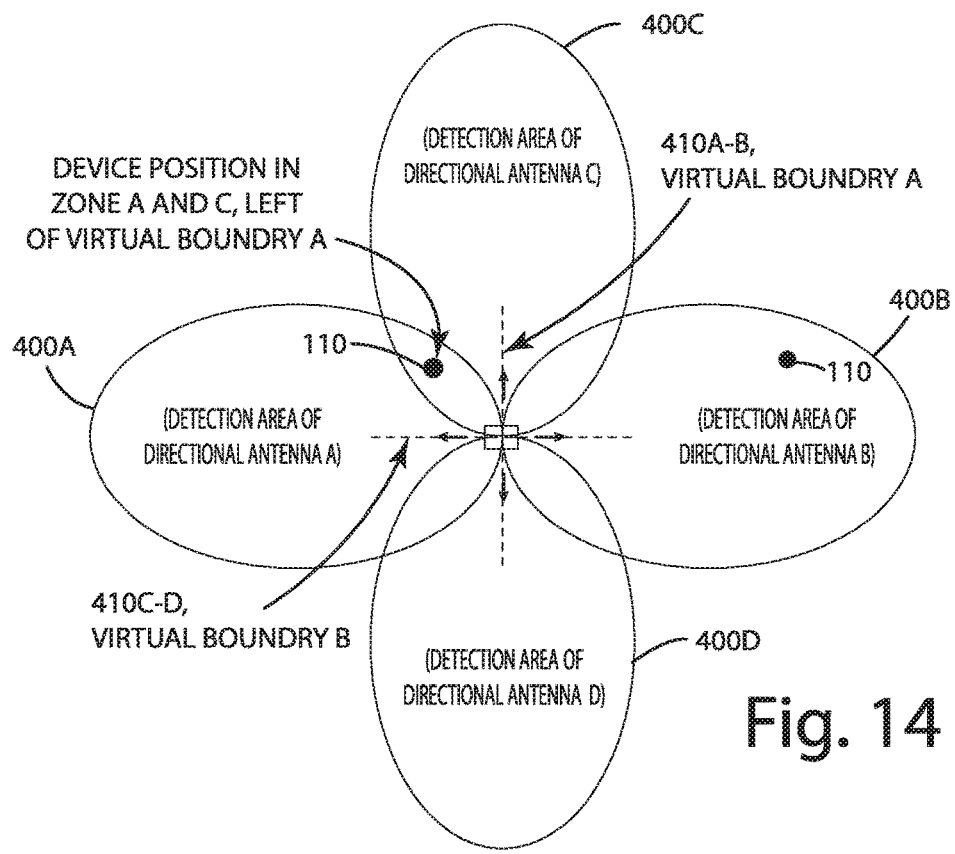
FIG. 14 shows four back-to-back directional antennas with two example device locations in accordance with one embodiment.

One embodiment with two pairs of antennas 312 with two virtual boundaries 410 is shown in FIGS. 13-14. In the illustrated embodiment, four spatially correlated directional antennas, designated 312A, 312B, 312C, 312D, are provided. The antennas 312A, 312B, 312C, 312D are located at a right angle to each other, yielding four zones 400A, 400B, 400C, 400D, as well as two virtual boundaries 410A-B, 410C-D. In one embodiment of such a pairing of antenna 312 pairs, each antenna 312 may be coupled to a sensor 310 (i.e., four sensors 310 each with one antenna 312), wherein each sensor 310 may communicate measurements substantially simultaneously to a master device 120. In another embodiment of such a pairing of antenna 312 to form a pair, antennas 312 may be coupled to one sensor 310 (e.g., one sensor 310 with four antennas 312), wherein the sensor 310 may switch antennas 312 between messages, or between individual elements of a message, to communicate measurements from both antennas 312 substantially simultaneously to a master device 120; for example, in an embodiment using BLE, the sensor 310 may switch antennas 312 between the individual data packets of a connection event. In yet another embodiment wherein a sensor 310 is connected to multiple antennas 312, instead of switching between each antenna 312, two or more antenna 312 outputs may be fed in parallel to the sensor 310, allowing the sensor 310 to obtain measurements from antennas 312 substantially simultaneously (e.g., as described herein in Section C.9.e). In yet another embodiment of such a pairing of antenna 312 pairs, a combination of the prior two embodiments may be used, consisting of a pair of sensors 310 that each are coupled with two antennas 312.

In a variation of the illustrated embodiment, 312A, 312B, 312C, and/or 312D may be directional and/or omnidirectional antennas wherein any divider is present that attenuates or reflects signals between pairings of antennas 312A, 312B, 312C, and 312D (e.g., such as a ground plane, sheet metal, wood, water, etc.). Additionally, multiple thresholds may be defined, such that there are multiple zones within the receive range of the antennas 312A, 312B, 312C, 312D.

In the illustrated embodiments of FIGS. 13-14, with the antennas 312A, 312B, 312C, 312D and the device 110 being within reception range of each other, the relative position between the antennas 312A, 312B, 312C, 312D and device 110 can be in Zone 400A, Zone 400B, Zone 400C, or Zone 400D. If the antennas 312A, 312B, 312C, 312D and the device 110 are not within range of each other (outside of Zone 400A through 400D), the relative position between the antennas 312A, 312B, 312C, 312D and device 110 is considered unknown with respect to antennas 312A, 312B, 312C, 312D. In the two directional antenna example, assuming the device 110 is in range, it may be possible to determine which side of the virtual boundaries 410A-B, 410C-D a device 110 is located, as depicted in the illustrated embodiment of FIG. 14.

B.6 Three Directional Antenna Pair with Six Zones and Three Virtual Boundaries

Figure 15:
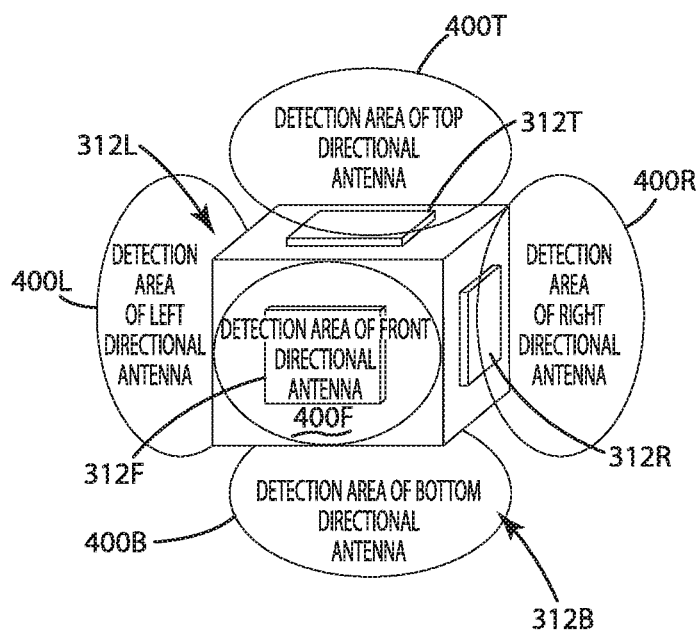
FIG. 15 depicts six back-to-back directional antennas with six zones (virtual boundaries not shown) in accordance with one embodiment.

One embodiment with a triplet of pairs of antennas 312 is shown in FIG. 15. In the illustrated embodiment, six directional antennas are provided and designated 312L, 312R, 312T, 312B, and 312F with 312A (aft not shown) that are located at a right angle to each other, yielding six zones 400L, 400R, 400T, 400B, and 400F with 400A (aft not shown), as well as three virtual boundaries (not shown). Embodiments of such a triplet of antenna 312 pairs may be constructed using any of the previously described sensor 310 and antenna 312 combinations and/or methods previously disclosed. In a variation of the illustrated embodiment, 312L, 312R, 312T, 312B, 312F, and/or 312A may be directional and/or omnidirectional antennas wherein any divider is present that attenuates or reflects signals between pairings of antennas 312L, 312R, 312T, 312B, 312F, and 312A (e.g., such as a ground plane, sheet metal, wood, water, etc.). Additionally, multiple thresholds may be defined, such that there are multiple zones within the receive range of the antennas 312L, 312R, 312T, 312B, 312F, and 312A.

B.7 N Pairs of Directional Antennas

Additionally, N pairs of directional antennas 312 may be combined to create N virtual boundaries 410 along with 2N zones 400. These virtual boundaries 410 may be configured in any orientation to create an array of zones 400, such that it may be detected in which zone 400 (partitioned by the virtual boundaries 410) a device 110 is located. Additionally, multiple thresholds can be defined, such that there are multiple zones 400 within the receive range of the antennas 312.

It should further be understood that although pairs of antennas 312 or N antenna 312 are described as separate antennas 312, an antenna 312 in accordance with one embodiment may itself be comprised of two or more antennas 312. As an example, the antennas 312A, 312B, 312C, 312D in the illustrated embodiments of FIGS. 13-14 may be considered a single antenna 312 with multiple zones 400 and multiple virtual boundaries 410.

B.8 3D Space Acknowledgment

Realizing that the virtual boundaries 410 are actually similar to planes in 3D space, in one embodiment, a 3D space may be divided into zones 400 by placing directional antennas 312 in appropriate locations and orientations.

C. Example Systems

Several techniques and configurations may be utilized, individually or together, to enhance the likelihood that the actual relative location of a device 110 can be correctly identified within a system 100 in accordance with one embodiment. For instance, one or more aspects of an embodiment described herein may be implemented in conjunction with another embodiment described herein. It should also be understood that one or more aspects described in conjunction with the other embodiment may be absent in some configurations. In this way, a system 100 in accordance with one embodiment may include both any aspect or feature from a first embodiment of the present disclosure and any aspect or feature of another embodiment.

C.1 Distributed Antenna Connection/Processing

When using multiple antennas 312, they may be connected to one or multiple transmitters or receivers (e.g., an electronic system component 200). The distribution, or not, of electronics may facilitate a functional or economic advantage. For example, multiplexing more than one antenna 312 to a single set of electronics may reduce overall complexity and cost associated with the electronics. Alternately, under certain circumstances, it may be beneficial for the electronics connected to the antennas 312 to be distributed, for instance since the connection between the antenna 312 and associated electronics may be prohibitively lengthy.

C.2 Outside Known Zones is Useful

Useful information may be obtained when a device 110 is located outside all detected zones 400 of a system 100. For example, if a device 100 is not physically located close enough to a piece of equipment 140 to be in any of the zones 400, then the device 110 may not be authorized to perform certain activities or access certain features.

Additionally, useful information may be obtained when a device 110 is located in multiple detected zones 400 of a system 100. For example, if a device 110 is located on or near a virtual boundary, the system 100 may determine that the position of device 110 is unknown, in more than one zone, in a prior determined zone, or in another zone that represents presence in multiple zones (e.g., "in-between"), or any combination thereof, each of which may result in different authorization to perform certain activities or access certain features.

C.3 Compound Zones

Figure 16:
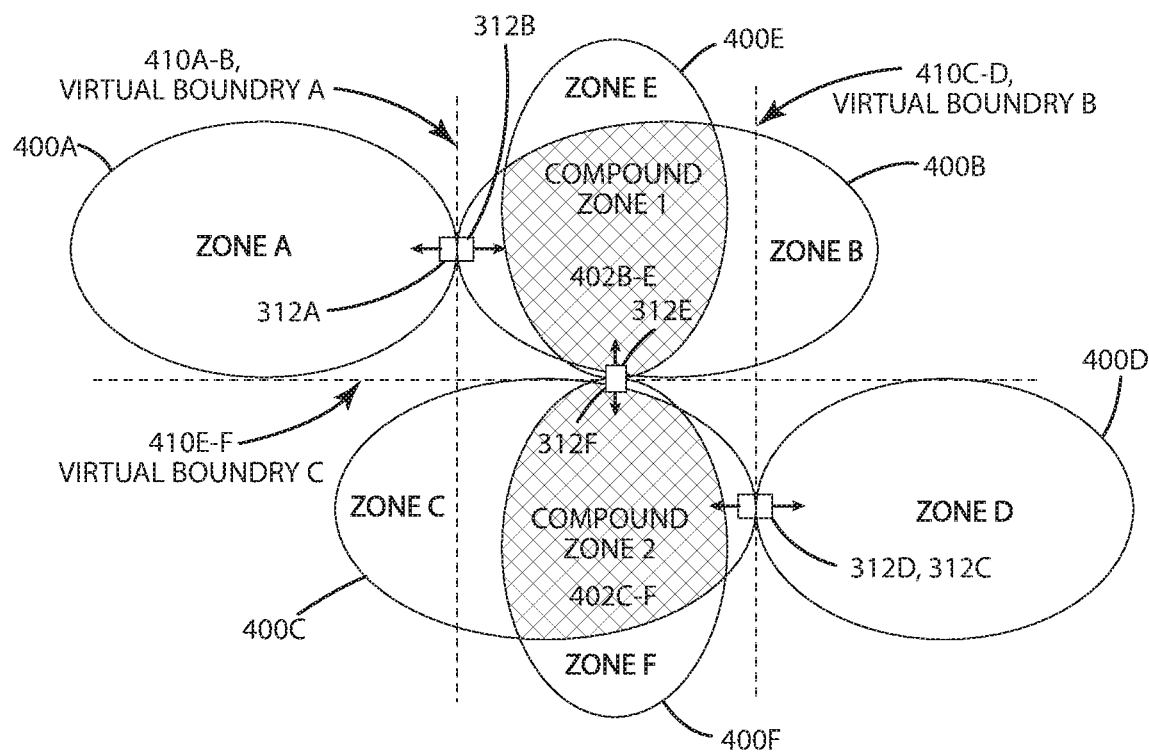
FIG. 16 shows compound zones created from overlapping zones in accordance with one embodiment.

In one embodiment, one or more zones 400 may be overlapped, creating a compound zone 402. The compound zone is designated as zone 402 in the illustrated embodiment of FIG. 16—but it should be understood that the compound zone 402 may be considered a zone 400 in other embodiments to facilitate discussion. In the illustrated embodiment of FIG. 16, two compound zones 402BE, 402CF are shown—although more or fewer compound zones may be realized.

Obtaining confirmation that a device 110 is detected within the compound zone 402, (within all of the zones 400 which make up a compound zone 402) increases the likelihood that the device 110 is actually located there. In the illustrated embodiment, compound zone 402BE is created by the overlap of zone 400B and zone 400E. Compound zone 402CR is created by the overlap of zone 400C and zone 400F.

C.4 Additional Zones by Combining Adjacent Antennas

Figure 17:
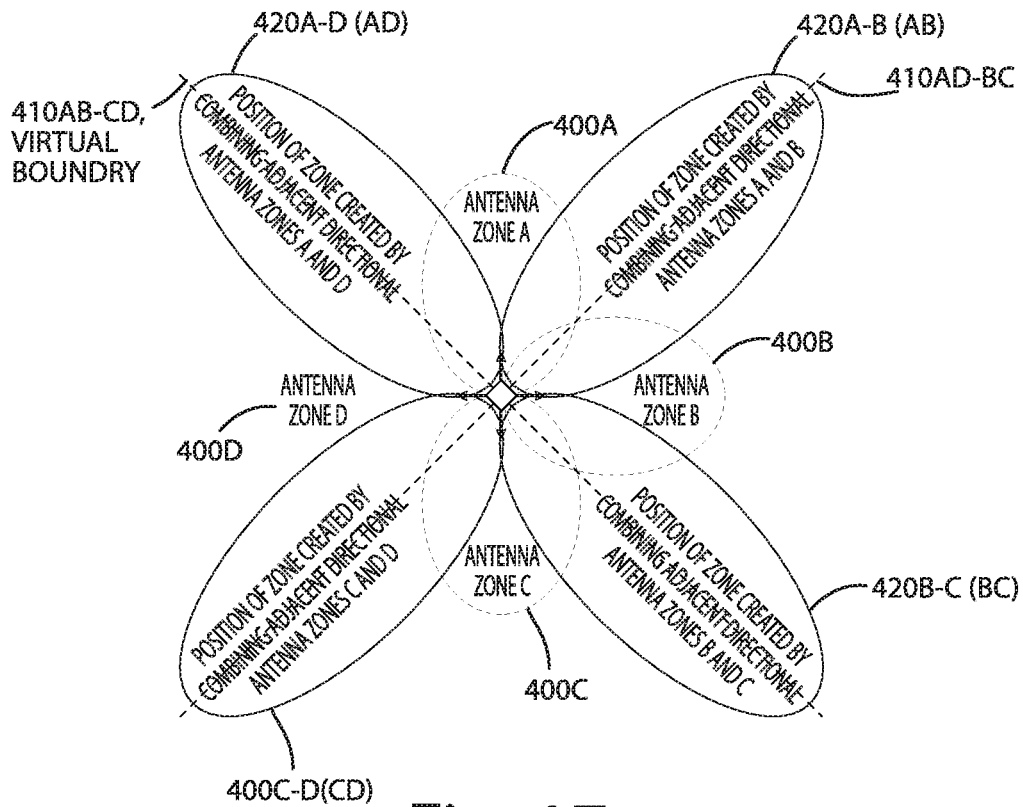
FIG. 17 shows zones created by adjacent directional antennas in accordance with one embodiment.
Figure 18:
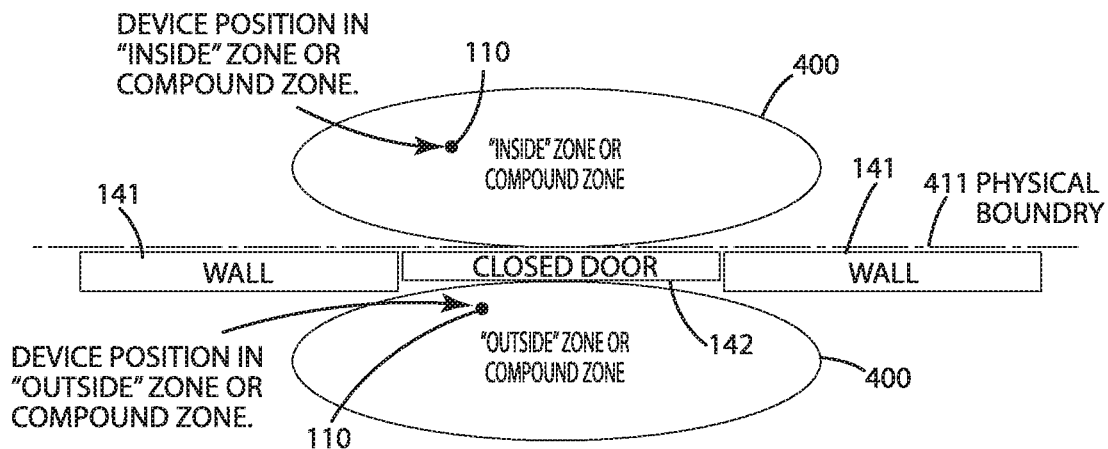
FIG. 18 shows a zone or compound zone on both sides of a door in accordance with one embodiment.

In one embodiment, depicted in FIG. 17, rather than using a configuration of two spatially correlated directional antennas 312, a pair whose antenna boresights are oriented opposite to each other, an antenna configuration may be implemented where adjacent antennas are combined as one. This can create zone shapes 420AD, 420AB, 420BC, 420CD that can be used for additional functionality. Converting between these configurations may be accomplished by using switching of signals to the antennas. The zone shapes 420, similar to the compound zone 402, may be considered a zone 400 in other embodiments to facilitate discussion.

In the illustrated embodiment of FIG. 17, for example, the 4-zone (400A, 400B, 400C, 400D) two-directional antenna pair sensor 312A, 312B, 312C, 312D described in conjunction with FIG. 4, may be expanded to an 8-zone two-directional antenna pair sensor by switching between configurations, as shown above. In this way, the sensor 310 may include eight zones 400A, 400B, 400C, 400D, 420AD, 420AB, 420BC, 420CD. Virtual boundaries 410 may be defined by the zone shapes 420AD, 420AB, 420BC, 420CD, as shown in the illustrated embodiment of FIG. 17 with virtual boundaries 410AD-BC, 410AB-CD.

In one embodiment, the illustrated embodiment may be extended to three dimensions by combining additional antennas 312 pointing on the up or down directions, and then pointing the beam into any sector of the sphere surrounding the sensor 312 (by selecting one, two, or three antennas).

C.5 Combining Zones

Combining/switching antennas 312 using analog circuitry may result in behavior described in conjunction with FIG. 17. Combining two or more antennas 312 digitally (e.g., by using the maximum, average, transformed, etc., measured RSSI) may result in the consolidation (combination) of their corresponding zones 400 into one larger zone 400.

C.6 Virtual Boundary Creation and Zone Determination

Virtual boundaries 410 may be created via the differential of a given signal received from multiple spatially correlated and/or co-located antennas 312 (with appropriate orientations, as described above). In one embodiment, the differential is taken using opposing antennas 312; however, the differential may be taken from one or more physical antennas 312 (e.g. adjacent or opposing) or virtual antennas 312 (e.g., antennas that are created by combining multiple physical antennas 312). For example, using the RSSI as measured from opposing antennas 312A and 312B, a device 110 may be detected in either zone 400A or zone 400B, with the device 110 being present in zone 400A, if the RSSI is higher in 400A and lower in 400B (i.e., 400A-400B>0), and vice versa, in zone 400B, if the RSSI is higher in 400B and lower in 400A (i.e., B-A>0). Additionally, for any given antenna 312, a minimum and/or maximum threshold may be utilized to overcome the back/side lobe 316, 318 versus main lobe 314, to provide confidence that the device 110 is present within the zone 400 (since it may be unclear whether the device 110 is in the zone 400, but far away, or nearby, but outside the zone 400). Similarly, for any given antenna pair 312, a minimum difference may be utilized to provide confidence that a device 110 is in one zone 400 or the other zone 400 (e.g., the zone 400 may be reported as unknown, if not satisfied). If the device 110 is not present in any zone 400, then the device 110 is either outside the range of the zones 400, or is between zones 400 (e.g., within the boundaries). Additional techniques may be employed to more precisely locate devices 110 (and/or provide more accuracy/confidence) that are indicated as being present in a particular zone 400, including fingerprinting, trilateration, triangulation (coarse or fine), hysteresis, and so on. Alternative to RSSI, as indicated elsewhere, other techniques may be used to determine the zone 400 in which a device 110 is located (e.g., computing the probability that a device 110 is in a particular zone 400, etc.) using the virtual boundary (differential) approach. RSSI and alternatives may be combined (e.g., RSSI+probability) to enhance accuracy.

In addition to the above, techniques may be employed to remove or reduce the probability of illegal zone transitions from the set of possible zones 400 when tracking a device 110 as it moves through the system 100, such as time- or value-based hysteresis, maximum-change-over-time, accelerometer/velocity/step counting, adjacency matrices, and so on.

As described elsewhere, multiple sensors 310 may be combined to isolate devices 110 to a particular zone 400 (even with sensors 310 that do not create a virtual boundary 410). With the use of additional techniques, devices 110 may be positioned more precisely within particular zones 400.

C.7 Subtracting Background Power

In one embodiment, there are many transmitters beyond just those that may be part of a particular microlocation system 100 (e.g., there are many Wi-Fi-enabled laptops in a particular area, many BLE devices in a room, etc.). Those transmitters may transmit (or leak) signals while the RSSI for a particular device 110 is being measured, resulting in variations in the measured RSSI due to other transmitters. To reduce this variability (and thus, increase measurement accuracy and precision), the measured background power may be subtracted from the measured RSSI. The background power may be measured in any appropriate unit (e.g., watts) and converted to/from RSSI units (e.g., dB) using standard mathematical relationships (e.g., power=10^[db/10], db=log 10(power)*10, etc.). RSSI is converted to power, and then the background power is added, subtracted, averaged, transformed (e.g., probability distribution or estimation, etc.), and/or filtered (including time/value based hysteresis), or any combination of these, or other techniques, as appropriate, prior to returning to RSSI units. Alternatively, the background power may be converted to RSSI units and then added, subtracted, averaged, transformed (e.g., probability distribution or estimation, etc.), and/or filtered (including time/value based hysteresis), or any combination of these, or other techniques, as appropriate. The background power may be measured one or more times before, during, and/or after a signal is received; those measurements may then be averaged (e.g., for all time/since power-up, moving [linear, exponential, etc.], etc.), min'd, max'd (e.g., peak hold), filtered to remove outliers/inconsistencies (including time/value based hysteresis), transformed (e.g., probability distribution or estimation, etc.), or any combination of these, or other techniques, to obtain the background power.

Background power measurements/estimations may be shared or distributed across antennas/sensors to determine a sensor- or system-wide background power measurement (using any combination of the above or other methods), which is then used in conjunction with, or instead of, individual antenna or sensor background power measurements.

C.8 Using Background Power to Identify Unreliable RSSI Measurement

Upon receipt of a signal, with a measured RSSI and observed background power, if the background power is outside of a predefined threshold or range, in absolute terms (e.g., if background RSSI is greater than X, less than Y, outside X . . . Y, or inside X . . . Y, etc.) or in relative terms (e.g., the measured RSSI and background RSSI are too close or too far apart, etc.), the measured RSSI may be ignored, considered more relevant, or considered less relevant. For example, relevancy may be reflected in a zone determination or location/positioning algorithm by increasing or decreasing one or more weights associated with one or more measurements.

C.9 Use of Multiple Measurements to Mitigate Multipath Variability

Figure 44:
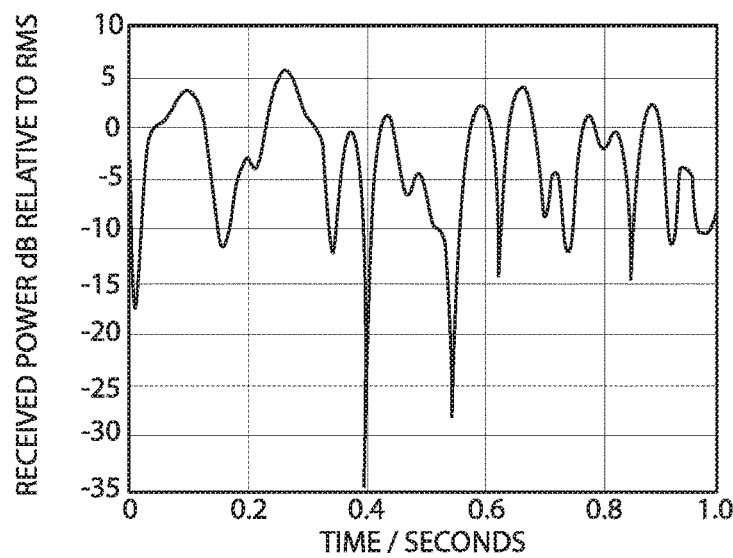
FIG. 44 shows fading in a small region in accordance with one embodiment.

RSSI, and AoA based on comparing the signal strength from multiple antennas, may be naturally compromised by multipath interference (also referred to as fading). Fading is the result of the signal from the source taking more than one path, due to the presence of reflecting and/or blocking surfaces. FIG. 44 shows a characteristic of fading in a small region where the aperture is moved over a range significant to the size of the wavelength (perhaps 10 wavelengths). Fading may cause signal strength to vary in a way that is uncorrelated with the antenna pattern, so that RSSI and AoA techniques may exhibit errors as the actual signal deviates from ideal received signal strength. One embodiment according to the present disclosure may use two methods, alone or in conjunction with each other, to mitigate fading and other environmental effects that may affect signal characteristics (e.g., received power, angle, time of flight, etc.). For example, some characteristics of the environment that may cause receive power to vary from the transmitter to receiver include, but are not limited to: a) heading in attitude coordinates (heading, pitch, roll), measured at the transmitter, of the line going towards the receiver (i.e., due to antenna gain pattern and polarization pattern); b) heading in heading coordinates (heading, pitch, roll), measured at the receiver, going towards the transmitter (i.e., due to antenna gain pattern and polarization pattern); c) frequency variation in antenna gain at the transmitter and at the receiver; d) attenuation due to objects that are in the path between the devices; e) attenuation due to objects that are in the near field of the antenna (e.g. hands, purses, etc.) that detune the antenna; f) objects that reflect and channel power (e.g. nearby walls, ceilings, cars, etc.). Some of these objects move (e.g., car doors, garage doors, etc.); g) fast fading, or spikes, at specific frequencies at specific narrow locations due to reflections off objects causing destructive, or constructive, interference, respectively; h) diffraction as RF bends around objects.

Figure 45:
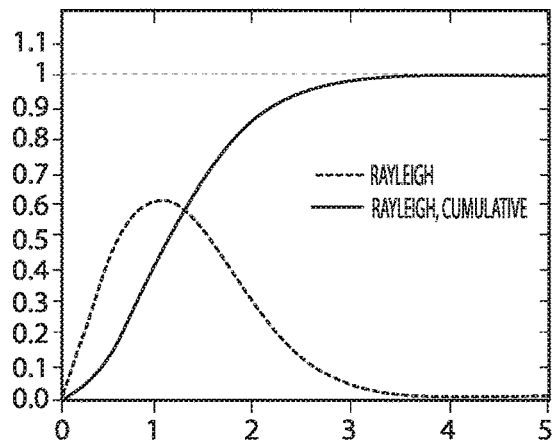
FIG. 45 depicts Rayleigh probability functions in accordance with one embodiment.

The characteristic of many faded signals approximately follows Rayleigh probability functions, as shown in FIG. 45.

C.9.a Multipath Mitigation by Combining the Results of Low-Correlated Channels

Multipath can be mitigated by combining the results from signals that have low correlation. The present disclosure provides ways of combining the results of signal strength comparisons from transmitted signals that have a frequency separation wide enough to de-correlate the fading between radio channels. This is referred to as having channel separation wider than the correlation bandwidth. For example, with BLE, the results of the measurements obtained across the various channels may be combined.

C.9.b Multipath Mitigation by Combining the Results of Low-Correlated Polarization Channels Similar to mitigation by combining the results of low-correlated channels, correlation can be reduced by using antennas 312 that are co-located, but have low polarization correlation. One way to combine multiple polarizations is to use circular polarization for either receive or transmit aperture with linear polarization on the opposing end (transmit or receive).

C.9.c Method of Combining the Results from Low-Correlation Channels

Multipath fading follows a probability distribution referred to as a Rayleigh (shown in FIG. 45). As can be appreciated, the probability of a single signal strength measurement being very low is small compared to the probability of measuring a typical signal strength. Yet, there is a very large potential variation in signal strengths due to fading, so a single measurement can result in large errors. As such, one aspect of this disclosure is to use a series of low-correlation measurements to improve the accuracy. Low correlation can be achieved with frequency or polarization. Combining can be done with each of the below methods, either alone, or in combination.

Method 1—Peak Hold

In this method, the peak received signal is held over some range of time. The underlying theory is that the peak of the faded signal is a single value. This method is not considered computationally complex, but it does depend on intercepting a signal that happens to have the peak amplitude, which has a low probability of occurrence.

Method 2—Weighted-Time (Moving) Average

Combing measurements may involve taking measurements over a period of time. As such, more recent measurements are generally more relevant. So, use of a weighted average of signals with higher weight placed on more recent measurements may facilitate mitigating multipath fading. This may be done either as a preferably exponential de-weighting or potentially linear de-weighting. In one embodiment using BLE, measurements across all channels are combined using an exponential moving average, where the weighting may be fixed, a function of the number of valid measurements that have been received over a number of measurement intervals (e.g., the last N valid measurements) or period of time, a function of the variability or consistency relative to one another or to the current average of measurements over a number of measurement intervals or period of time, a function of the current average, or any combination thereof.

Method 3—Probability Function Estimation

By taking a series of measurements, the Rayleigh function may be estimated. This method may overcome a potential weakness of Method 1, but may utilize more measurements. Increasing the number of measurements increases the accuracy of the estimation.

A combined method, for example, may more heavily weight more recent measurements used for the estimation or peak hold.

Method 4—Other Methods

Other methods may be used, separately or in combination with, the above and below methods to combine measurements. For example, the measurements may be combined as part of simpler approaches (instantaneous or methods described in conjunction with the discussion of virtual boundary creation and zone determination) or more advanced approaches, such as fingerprinting, particle filter, kalman filter, time- and/or value-based hysteresis, maximum-change-over-time, or other algorithms.

Additionally, the above may be used in conjunction with other system-level combinatorial approaches to further provide confidence in the correctness of a particular measurement, such as acceleration/velocity/step counting, ultrasonic, and known proximity (i.e., measurement at UI interaction [e.g., button push] is X, therefore it can't be Y, etc.).

Due to environmental effects, it is possible that signal characteristics from one or more antennas 312 may not be determined, because the output from the antenna 312 is invalid or missing; however, signal characteristics from other antennas 312 may be determined. In cases where one or more signal characteristics are missing/invalid from one or more antennas 312, the system 100 may choose to, for each missing/invalid signal characteristic that is not derived from other signal characteristics: (a) not update the corresponding output signal (e.g., average, moving average, exponential moving average, max, min, etc.); (b) not update the output signal, but increment a missing readings indicator, and when the missing readings indicator reaches a threshold (e.g., more than 20 missing measurements), mark the output signal as invalid; (c) update the output signal with a default value; (d) update the output signal with a default value, but increment a missing readings indicator, and when the missing readings indicator reaches a threshold (e.g., more than 20 missing measurements), mark the output signal as invalid, immediately with a default value, or ramp the output signal to a default value over a number of measurement intervals; and/or (e) mark the corresponding output signal as invalid. In cases where one or more signal characteristics are missing/invalid from one or more antennas 312, the system 100 may choose to, for each missing/invalid signal characteristic that is derived from one or more other signal characteristics (e.g., a differential, a distance, a time of flight, etc.): (a) use current output signals corresponding to missing/invalid signal characteristics to determine the derived signal characteristic; (b) use last known signal characteristic values corresponding to missing/invalid signal characteristics to determine the derived signal characteristic; and/or (c) do not update the output signals of derived signal characteristics corresponding to missing/invalid signal characteristics (in any of the ways described above for output signals for non-derived signal characteristics, e.g., after some number of intervals in which an output signal update did not occur, the output signal may be marked invalid). Given combinations of the above, the output signals may additionally allow the system 100 to continue to determine the position of the portable device 110, or to properly indicate that a portable device 110 position may not be determined, during periods of time in which signal characteristics are missing or invalid.

C.9.d Multipath Mitigation by Using Spatially Low-Correlation Channels

This method may use separate apertures (antennas 312) that are separated widely enough to have low correlation in their received signal strength. This is also referred to as spatial diversity. This embodiment of this disclosure may use a combination of multiple signal strengths for apertures that substantially cover the same region. In other words, the coverage overlaps. The redundancy of this method may naturally reduce errors by building an estimate of the position based on weighting results that are estimated to be more reliable—for example, using Method 2 or 3, above.

C.9.e Use of a Single Aperture with One or More Propagation Directions.

Figure 46:
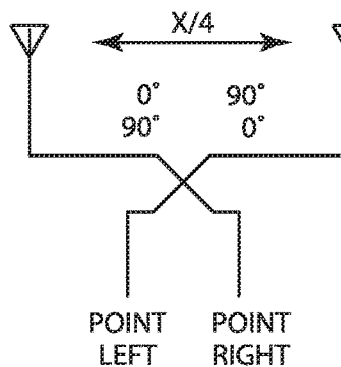
FIG. 46 illustrates a two-antenna configuration in accordance with one embodiment.
Figure 47:
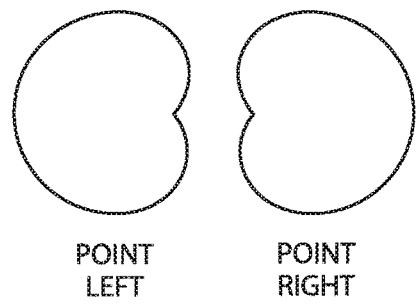
FIG. 47 shows a pattern of the antenna configuration in FIG. 46 in accordance with one embodiment.

One aspect of this disclosure is to determine RSSI measurements, or direction of arrival of a signal by comparing the signal amplitude received, from different apertures. The signal strength from two different apertures may become de-correlated as the apertures become spatially separated. With that basis, if two apertures can occupy the same space, then spatial de-correlation can be minimized or reduced. One way of achieving this is to use a set of individual radiators (such as dipole antennas) and to simultaneously electrically combine them using different phases. For example, two antennas can be separated by a ¼ wavelength and fed simultaneously with 0/90 degrees and 90/0 degrees, as shown in the illustrated embodiment of FIG. 46. This may result in two distinct patterns, as shown in the illustrated embodiment of FIG. 47.

This embodiment can be extended to achieve steering in four quadrants or more by adding more antennas 312 and more phase controls.

C.9.f Distance Measurement/Rangefinding

RSSI may be used to approximate a distance from a particular receiver (rangefind); because the distance estimate becomes less accurate as the distance increases, the range (distance) may be communicated along with computed error bounds (e.g., −50%/+100%). Secure ranging approaches may be used, such as distance bounding untrusted (unauthenticated) devices (using traditional time-of-flight, adapted for use with RSSI, adapted for use with AoA, or any combination of these, or other approaches). Additionally, zone distance (e.g., from center, an edge, etc.) to a known point may also be used to approximate distance. Additional techniques may be used for rangefinding as well, and may be combined to achieve greater robustness, accuracy, and/or precision (e.g., trilateration, triangulation, time-of-flight, etc.).

To deliver secure microlocation and/or ranging, one or more aspects of the system may be implemented in conjunction with one or more aspects of the security model described in U.S. Provisional Patent Application No. 62/413,966, entitled SYSTEM AND METHOD FOR AUTHENTICATING AND AUTHORIZING DEVICES AND/OR FOR DISTRIBUTING KEYS, filed Oct. 27, 2016, to Smith et al. and U.S. patent application Ser. No. 15/796,180, entitled SYSTEM AND METHOD FOR AUTHENTICATING AND AUTHORIZING DEVICES, filed Oct. 27, 2017, to Smith et al.—the disclosures of which are incorporated herein by reference in their entirety.

C.10 Angle-of-Arrival (AoA)

Angle of arrival (AoA) measurement is a method for determining the direction of propagation of a radio-frequency wave incident on an antenna array 312. AoA may determine the direction by measuring the Time Difference of Arrival (TDOA) at individual elements of the array 312; from these delays, the AoA can be calculated. Using phased or multi-element antennas 312 (omni-directional or directional) capable of determining the angle of arrival of the transmitted signal, techniques such as triangulation can be used to supplement device location information. With a fine-grained angle of arrival measurement (as measured across multiple sensors 310), more precise positioning may be determined.

Many RF environments are very noisy (e.g., the 2.4 GHz spectrum) and thus, the received AoA may also be very noisy. Combined with zone information (or not), additional confidence in the accuracy of the triangulated position may be gained with agreement; the additional positioning information may enable the system 100 to determine the position of a device 110 within a zone 400 with more precision.

Additionally, it may be possible for the transmitter to adjust the directionality of its antenna 312 using beam steering; this may be done to vary the AoA in a particular pattern at the receiver, so as to enable more accurate positioning. Additionally, the receiver may adjust the directionality of its antenna(s) 312 in a similar way, for similar purposes.

C.11 Coarse Angle-of-Arrival (AoA)

A coarse Angle of Arrival scheme may be implemented by utilizing the inherent positioning of the sensor antennas 312. For example, a one directional antenna 312 pair (two zone) may provide a 180-degree angle-of-arrival measurement precision. A two directional antenna 312 pair (four zone) may provide a 90-degree angle-of-arrival measurement precision and a four directional antenna 312 pair (eight zone) may provide a 45 degree angle of arrival measurement precision. Treating this as a coarse AoA approach allows the system to determine in which zone a particular device resides; similar to fine-grained AoA, wherein for example triangulation may be used to position a device 110, with this system 100, coarse AoA, using a process similar to triangulation, determines in which zone 400 (overlapping fields) a device 110 resides.

C.12 Circular Polarization

In one embodiment, the system 100 may use linearly polarized antennas 312. Such antennas 312 are considered small. In real world circumstances, signals reflect off all sorts of things, allowing an antenna 312 to eventually receive signals at reduced strength (theoretically, a linear horizontally polarized transmission may not be received by a linear vertically polarized antenna). As a result, linearly polarized receiver antennas 312 may perform vastly different depending upon the orientation of the transmitter, which can affect the ability of the system 100 to accurately and consistently measure RSSI, AoA, and/or other attributes (as people or devices move around or change orientations in someone's hand).

Circular polarized antennas 312 do not depend as much upon the orientation of the transmitter, enabling more accurate and consistent measurement of RSSI, AoA, and/or other attributes.

The system 100 in accordance with one embodiment described herein may utilize circular polarized antennas 312; however, they may also use linear polarized antennas 312. Additionally, other polarizations may be utilized, depending upon established system goals.

C.13 Environment Geometry and Materials

The physical geometry of the environment in which antennas 312 are placed affects their radiation pattern, and thus influences the zones 400 they generate. In many cases, this is a possible advantage, allowing complex zone shapes 400 to be formed due to the materials and shape of the thing in which the antennas 312 are located (e.g. using the metal shell of a vehicle, or the dense material of a desk surface, etc.).

C.14 Environment and Obstruction Determination

Measured RSSI and background power patterns detected at various antennas 312 and/or sensors 310 in the system 100 may allow the system 100 to detect its environment or obstructions in the environment and alter its positioning approach. For example, the system 100, given knowledge that a device 110 is present at a known location (such as a vehicle door handle), and given RSSI measurements from antennas 312A, 312B, 312 C, and 312D, determine that because 312A, 312B, and 312C are high, and 312D is low, when 312C is expected to be low, there is another vehicle nearby. For example, the background noise may be very high, and thus, the system 100 may switch to an alternate positioning algorithm optimized for high-noise environments.

D. Additional Embodiments

In the following embodiments, any one or more of the transmitter, the receiver, the antenna 312 and the device 110 may be in a fixed or portable location.

The method and system described above and shown in the following embodiments may be each implemented using multiple methods, including, but not limited to:
  An embodiment using BLE.
  An embodiment using BLE and RSSI.
  An embodiment using BLE, RSSI, and trilateration.
  An embodiment using BLE, RSSI, trilateration, and triangulation.
  An embodiment using BLE, RSSI, trilateration, triangulation, and time-of-arrival.
  An embodiment using UWB.
  An embodiment using BLE and UWB.
  An embodiment using BLE and NFC (near field communication).
  An embodiment using BLE and LF (low frequency).
  An embodiment using BLE and LF and NFC.
  All of the above, and all variations, in the context of a microlocation system.

Further a sniffing microlocation system may be implemented in accordance with one or more embodiments described herein and as described in the disclosures of U.S. Provisional Patent Application No. 62/323,262 entitled SYSTEM AND METHOD FOR ESTABLISHING REAL-TIME LOCATION, filed Apr. 15, 2016, to Stitt et al. and U.S. patent application Ser. No. 15/488,136 entitled SYSTEM AND METHOD FOR ESTABLISHING REAL-TIME LOCATION, filed Apr. 14, 2017, to Stitt et al.—the disclosures of which are incorporated herein by reference in their entirety.

Further examples, possibly employing secure microlocaiton, may be based on one or more embodiments described in as described U.S. Provisional Patent Application No. 62/413,966, entitled SYSTEM AND METHOD FOR AUTHENTICATING AND AUTHORIZING DEVICES AND/OR FOR DISTRIBUTING KEYS, filed Oct. 27, 2016, to Smith et al., U.S. patent application Ser. No. 15/796,180, entitled SYSTEM AND METHOD FOR AUTHENTICATING AND AUTHORIZING DEVICES, filed Oct. 27, 2017, to Smith et al. and U.S. Provisional Patent Application No. 62/323,262 entitled SYSTEM AND METHOD FOR ESTABLISHING REAL-TIME LOCATION, filed Apr. 15, 2016, to Stitt et al.—the disclosures of which are incorporated herein by reference in their entirety.

D.1 Energy Access Embodiment

One embodiment may allow for detection of a device 110 in proximity to an energy access point. The energy access point may be mobile or in a fixed location. An electric car charging station, for example, may incorporate an energy access point. A user of an energy access point may transport a device 110 within a zone 400 or compound zone 402 created by a sensor 312 or sensors 312 with antennas located in or near the energy access point. Recognition of the presence of a device 110 by the sensor or sensors 312 may, for example, possibly authorize the user to perform certain functions associated with an energy access point, such as physical access to connection points, adjustment of energy dispensing, enabling or disabling electrical circuits or outlets, targeted marketing, and so on. Additional utilities or amenities associated with the energy access point can be enabled or disabled in a similar manner.

D.2 Data Access Embodiment

One embodiment may allow for detection of a device 110 in proximity to a data access point. The data access point may be mobile or in a fixed location. An electric car charging station, for example, incorporates a data access point. A user of a data access point may transport a device 110 within a zone 400 or compound zone 402 created by a sensor or sensors 312 with antennas located in or near the data access point. Recognition of the presence of a device 110 by the sensor or sensors 312 may, for example, possibly authorize the user to perform certain functions associated with a data access point, such as physical access to connection points, adjustment of access to data/information, targeted marketing, and so on. Additional utilities or amenities associated with the data access point can be enabled or disabled in a similar manner.

D.3 Door Microlocation Embodiment

One or more zones 400, compound zones 402, or virtual boundaries 410 can be used to determine on which side of a door (if either) a device 110 is located. A door is meant to include manual or automatic operation, single panel, sectional or roller constructions, and hinged, sliding or moving on tracks. The antennas 312 creating the zones 400, or compound zones 402, may be embedded within the door lock, affixed to the door itself, or to the related structures near the door, such as the ceiling and walls in proximity to or the trim around the door. Device location information may be used to control the locking, unlocking, opening, closing, or non-movement, of a door, as well as noting the relative movement of a device 110 through the doorway targeted marketing, and so on. An example of such a configuration is depicted in the illustrated embodiment of FIG. 15, including a wall 141 and a door 142 in a closed position, forming a physical boundary 411 relative to two zones 400.

One embodiment for an automatic garage door may trigger the opening of the garage door if the car (device) and mobile phone (device) is determined to be in proximity to the door, or some combination thereof.

D.4 Work Surface Microlocation Embodiment

One embodiment may allow for detection of a device 110 in proximity to a work surface. The work surface may be mobile or in a fixed location, may be any shape, and may be horizontal or at any angle from horizontal (e.g., desks, drafting tables, whiteboards, etc.). A desk, for example, often incorporates a work surface. A user 10 of the work surface may transport a device 110 within a zone 400 or compound zone 402 created by a sensor or sensors 310 with antennas 312 located in or near the work surface (e.g., left, right, above, below, in front, behind, on, inside, near, far, etc.). Recognition of the presence of a device 110 by the sensor or sensors 312 may, for example, possibly authorize the user to perform certain functions associated with the work surface, such as physical adjustment of the work surface position (e.g., height, tilt, etc.), record work surface usage (presence and/or duration), assist in the location of devices 110 (and their users 10), targeted marketing, and so on. Additional utilities (power or data access) or amenities (e.g., lighting, displays, sounds, or access to controls, etc.) associated with the work surface may be enabled or disabled in a similar manner.

D.5 Furniture Microlocation Embodiment

One embodiment may allow for detection of a device 110 in proximity to a piece of furniture. The furniture may be mobile or in a fixed location. In one embodiment, one or more zones 400, compound zones 402, or virtual boundaries 410 can be used to determine if a device 110 is located in proximity to a piece of furniture (e.g., left, right, above, below, in front, behind, on, inside, near, far, etc.). A user 10 of the furniture may transport a device 110 within a zone 400 or compound zone 402 created by a sensor or sensors 310 with antennas 312 located in or near the furniture. Recognition of the presence of a device 110 by the sensor or sensors 310 may, for example, possibly authorize the user 10 to perform certain functions associated with the furniture, such as physical access to, or adjustment of, the furniture, record furniture usage (presence and/or duration), assist in the location of devices 110 (and their users 10), targeted marketing, and so on. Additional utilities (power or data access) or amenities (e.g., lighting, displays, sounds, or access to controls, etc.) associated with the furniture may be enabled or disabled in a similar manner.

Some additional examples of use in furniture include applications to stadium/theater/conference/event/restaurant/hospital/etc. seating for the purposes of seat determination (am I in the right seat and/or where is my seat), admissions (as opposed to scanning a tag—including theme parks), where a particular device is located (order fulfillment, user location, e.g., in a hospital for consultation, sporting event for food delivery, or restaurant for order delivery, retail for customer location for use in queuing systems, etc.).

D.6 Carrel, Cubicle, Stall, Shelter, Kiosk, etc.—Microlocation Embodiment

In one embodiment, one or more zones 400, compound zones 402, or virtual boundaries 410 can be used to determine if a device 110 is located inside, outside, or within a particular zone 400 of a carrel, cubicle, stall, shelter, kiosk, etc. A user 10 of the carrel, cubicle, stall, shelter, kiosk, etc., may transport a device 110 within a zone 400 or compound zone 402 created by a sensor or sensors 310 with antennas 312 located in or near the carrel, cubicle, stall, shelter, kiosk, etc. Recognition of the presence of a device 110 by the sensor or sensors 312 may, for example, possibly authorize the user 10 to perform certain functions associated with the carrel, cubicle, stall, shelter, kiosk, etc., such as physical access to, or adjustment of, the carrel, cubicle, stall, shelter, kiosk, etc., targeted marketing, and so on. Additional utilities (power or data access) or amenities (e.g., lighting, displays, sounds, or access to controls, etc.) associated with the carrel, cubicle, stall, shelter, kiosk, etc., may be enabled or disabled in a similar manner.

Some additional examples of use in carrel, cubicle, stall, shelter, kiosk, etc., include applications to stadium/theater/conference/event/restaurant/hospital/theme parks/etc. for the purposes of admissions (as opposed to scanning a tag—including theme parks).

D.7 Room Microlocation Embodiment

In one embodiment, one or more zones 400, compound zones 402, or virtual boundaries 410 can be used to determine if a device 110 is located inside, outside, or within a particular area inside or outside of a room (e.g., a movie theater viewing room, access to certain facilities/rooms at an airport, hotel, or resort, a particular conference room or office, etc.). A user 10 of the room may transport a device 110 within a zone 400 or compound zone 402 created by a sensor or sensors 310 with antennas 312 located in or near the room. Recognition of the presence of a device 110 by the sensor or sensors 312 may, for example, possibly authorize the user 10 to access the room and perform certain functions associated with the room, such as physical access to, or adjustment of the room, automatic customization of equipment within the room based upon the users that are present, targeted marketing, and so on. Additional utilities (power or data access) or amenities (e.g., lighting, displays, sounds, or access to controls, etc.) associated with the room may be enabled or disabled in a similar manner.

D.8 Building Microlocation Embodiment

In one embodiment, one or more zones 400, compound zones 402, or virtual boundaries 410 can be used to determine if a device 110 is located inside, outside, or within a particular area inside or outside of a building. A user 10 of the building may transport a device within a zone 400 or compound zone 402 created by a sensor or sensors 310 with antennas 312 located in or near the building. Recognition of the presence of a device 110 by the sensor or sensors 310 may, for example, possibly authorize the user to access the building and perform certain functions associated with the building, such as physical access to building control panels or adjustments, targeted marketing, and so on. Additional utilities (power or data access) or amenities (e.g., lighting, displays, sounds, or access to controls, etc.) associated with the building may be enabled or disabled in a similar manner.

D.9 Equipment Microlocation Embodiment

One embodiment may allow for detection of a device 110 in proximity to a piece of equipment. Equipment is meant to include manual, semi-automatic, or automatic equipment of mechanical, electro-mechanical, or electrical type (e.g., consumer electronics [toaster, blender, outlet, light switch, fixtures, etc.], appliances [microwave, oven, dishwasher, washing machine, dryer, exercise equipment, etc.], industrial/farm/heavy equipment [tractor, combine, conveyor, etc.], secure storage boxes and lockers, tools [chainsaw, backhoe, radio, etc.], and much more—including anything to authorize access to or control with a device) The equipment includes any controls (buttons, switches, knobs, levers, etc.) used in conjunction with the equipment. The equipment includes any sensors providing information to the equipment. The equipment includes any actuators controlled by the equipment. The equipment may be mobile or in a fixed location.

In one embodiment, one or more zones 400, compound zones 402, or virtual boundaries 410 can be used to determine if a device 110 is located in proximity to a piece of equipment. A user of the equipment may transport a device 110 within a zone 400 or compound zone 402 created by a sensor or sensors 310 with antennas 312 located in or near the equipment. Recognition of the presence of a device 110 by the sensor or sensors 312 may, for example, possibly authorize the user to perform certain functions associated with the equipment, such as physical access to, activation, operation or adjustment of the equipment.

D.10 Interior Vehicle Microlocation Embodiment

Figure 19:
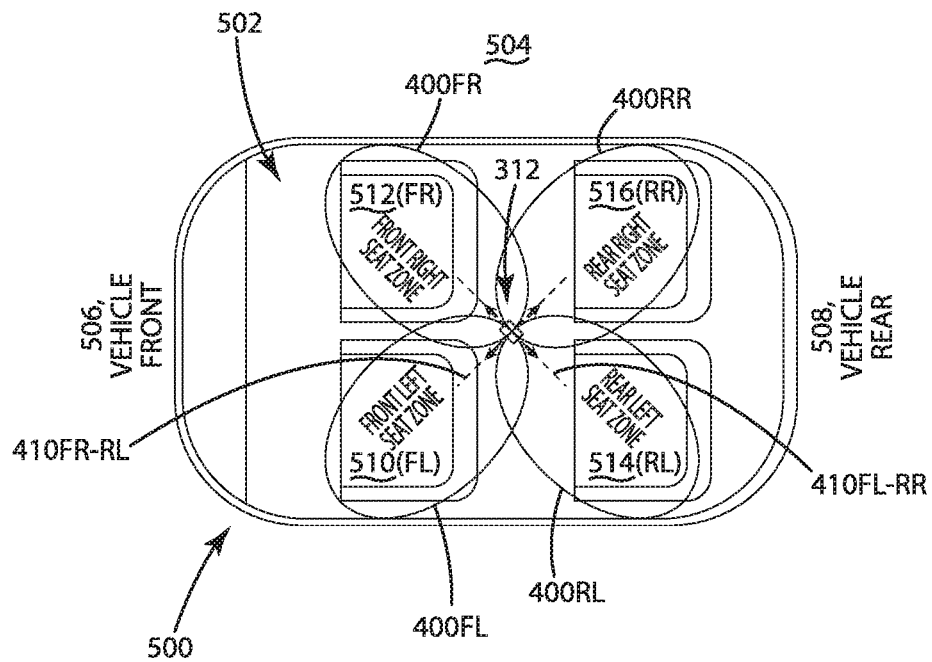
FIG. 19 depicts vehicle interior with four zones in accordance with one embodiment.

In one embodiment, as depicted in the illustrated embodiment of FIG. 19, the system 100 may be implemented in conjunction with a vehicle 500. The vehicle 500 may include an interior space 502 or cabin, a forward section 506, and a rear section 508. In the illustrated embodiment, the interior space 502 of the vehicle 500 may be conceptualized as four areas or zones 400: a front left seat zone 510FL, a front right seat zone 512FR, a rear right seat zone 516RR, and a rear left seat zone 514RL. The interior space 502 may be conceptualized differently, or may not be present, depending on the application. The interior space may include a steering wheel 520.

By use of the vehicle, it should be understood that the present disclosure contemplates mobile machines which transport people or cargo, including but not limited to wagons, bicycles, motorcycles, automobiles, cars, trucks, trains, trams, ships, boats, aircraft, and spacecraft.

In one embodiment, the placement of two or more perpendicular directional antenna 312 pairs in the interior 502 of a vehicle 500 may create zones 400FL, 400FR, 400RR, 400RL between seating quads that correspond to passenger seating locations (510FL, 512FR, 516RR, 514RL). These zones 400FL, 400FR, 400RR, 400RL may be used to detect the presence of mobile phones located in the seating locations using Bluetooth Low Energy. Additional zones may also exist in other systems, such as zones associated with additional seating rows, or seats per row (e.g., in larger vehicles, such as vans or busses), rear trunk, rear cargo-area, front trunk, front cargo-area, luggage storage compartments (overhead or below), and so on.

In an alternate embodiment, in which three or more directional antenna pairs 312 are used—one to divide the vehicle 500 in half and one between each pair of seats.

Figure 23:
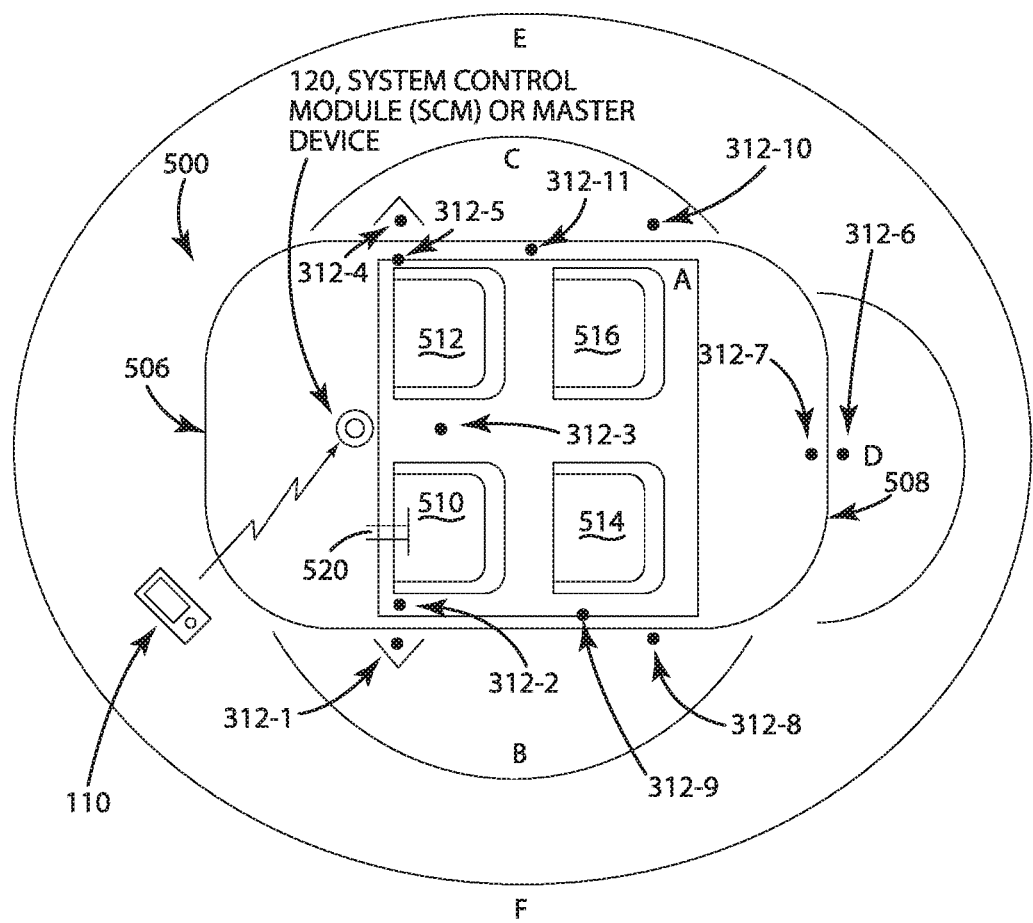
FIG. 23 depicts an eleven antenna vehicle microlocation system using RSSI in accordance with one embodiment.
Figure 24:
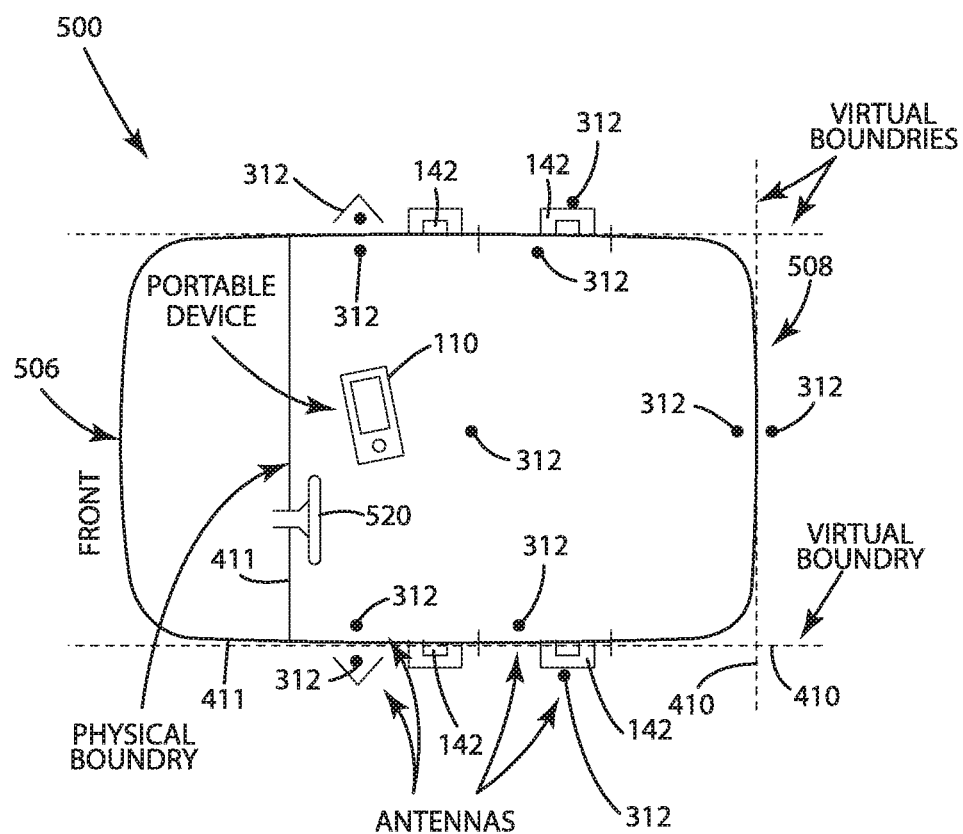
FIG. 24 shows antennas on movable parts of equipment using RSSI in accordance with one embodiment.
Figure 25:
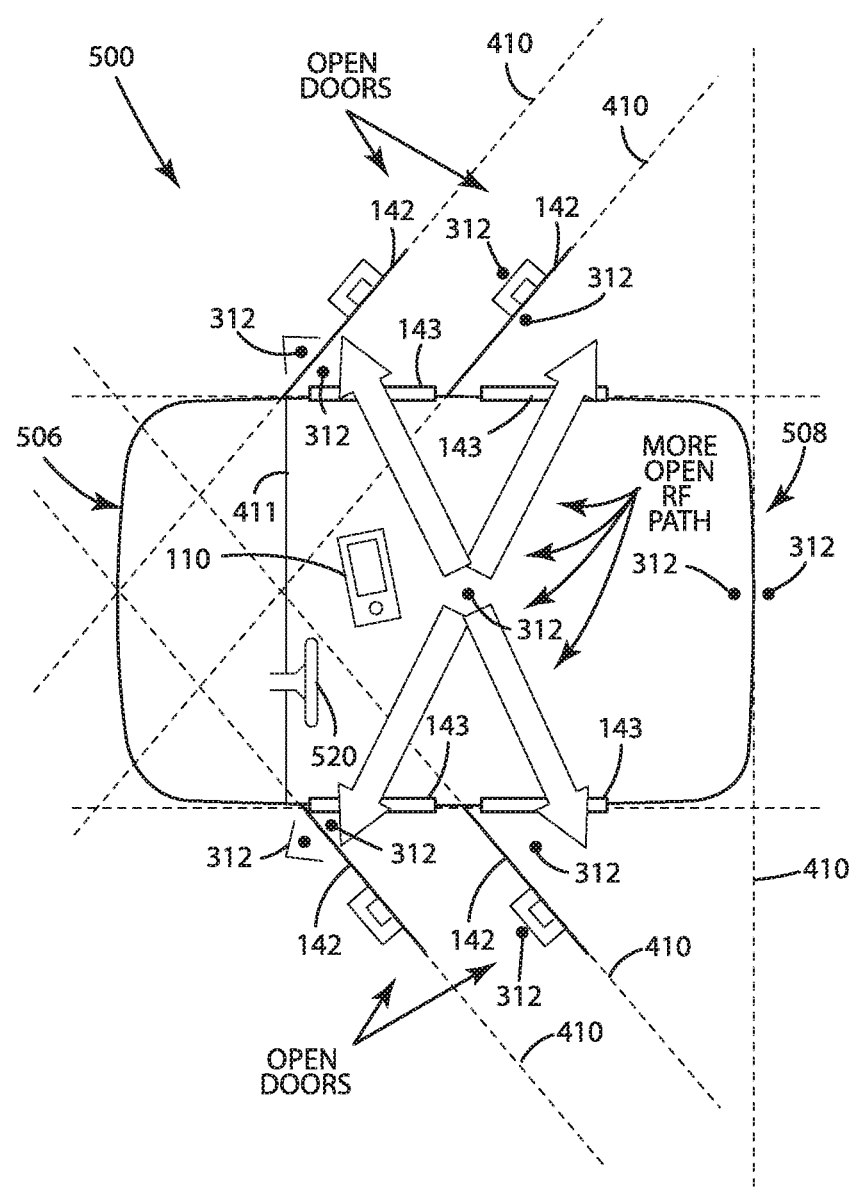
FIG. 25 shows antennas on movable parts of equipment using RSSI in accordance with one embodiment.
Figure 26:
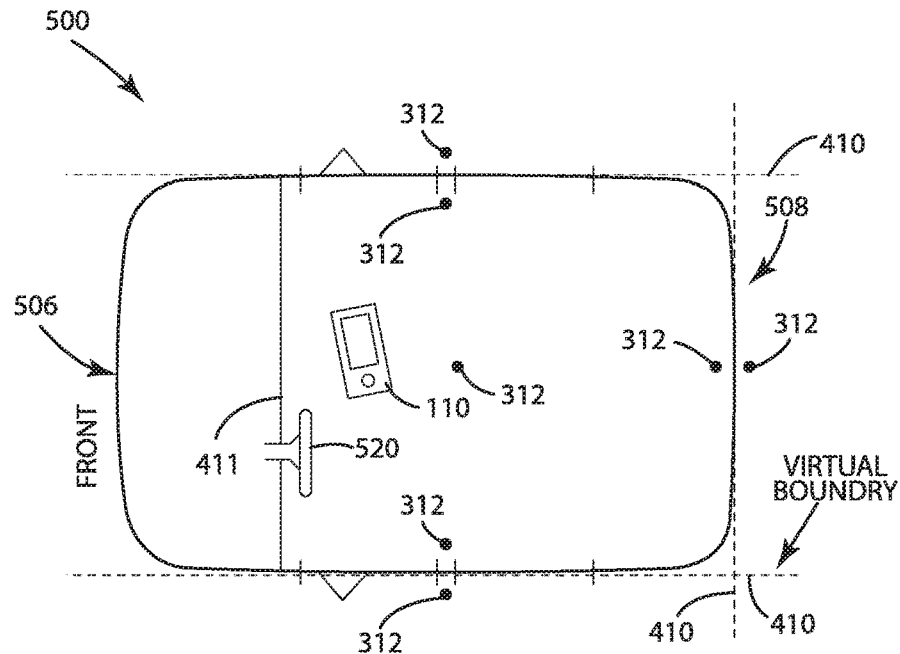
FIG. 26 shows antennas on movable parts of equipment using RSSI in accordance with one embodiment.
Figure 27:
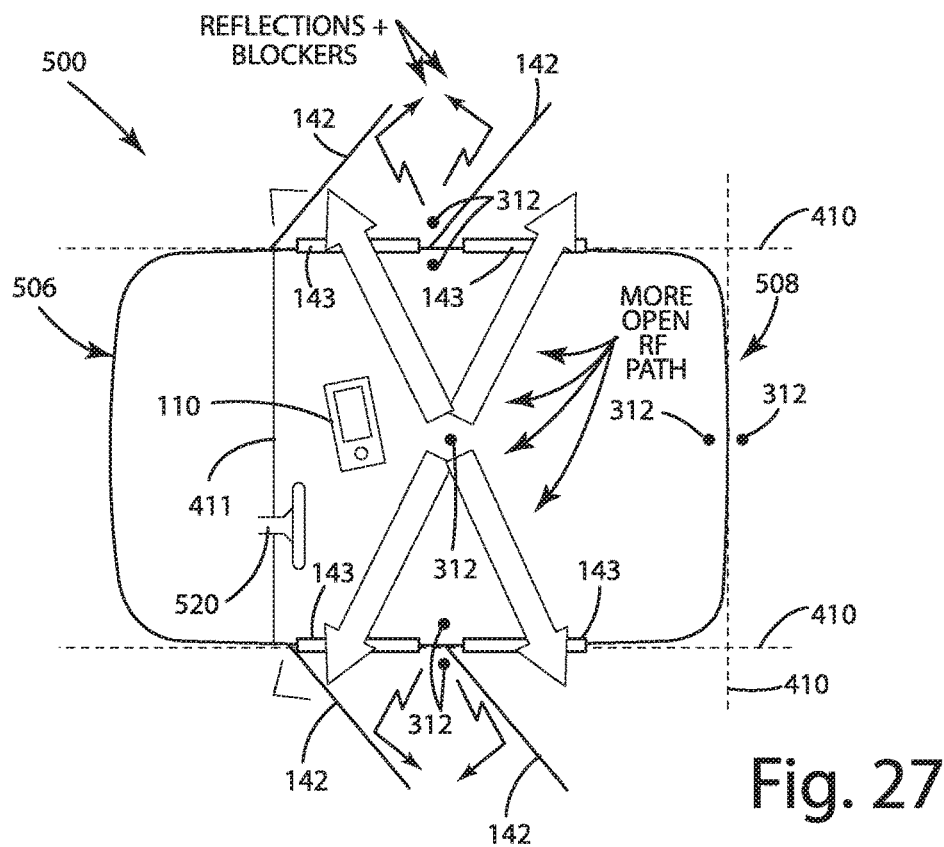
FIG. 27 shows antennas on movable parts of equipment using RSSI in accordance with one embodiment.
Figure 28:
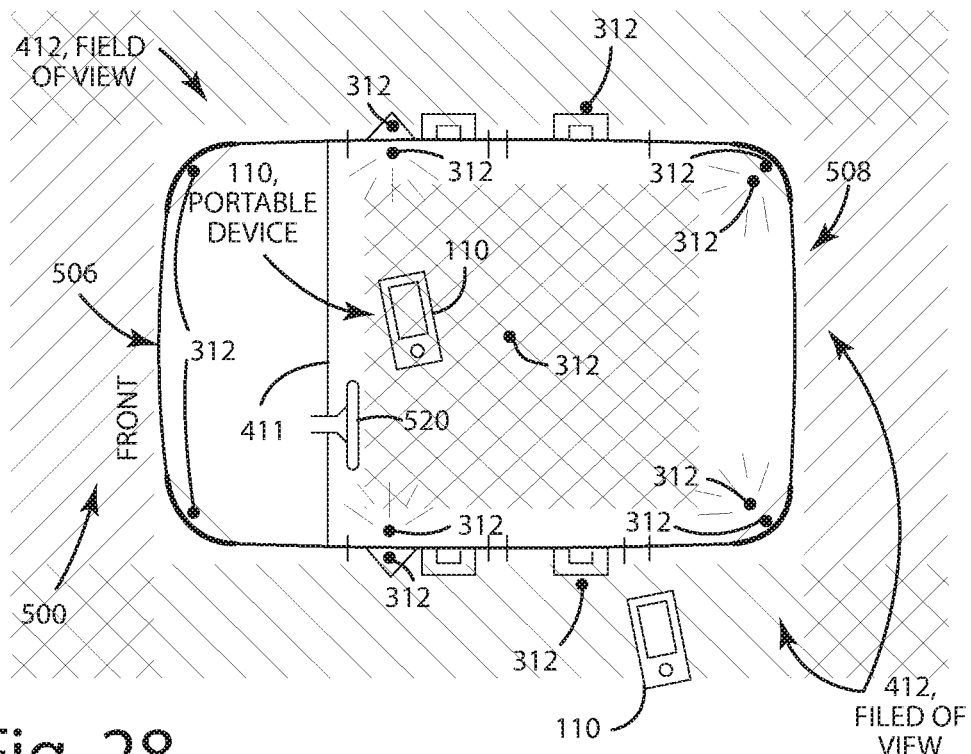
FIG. 28 depicts antennas on movable parts of equipment using angle of arrival in accordance with one embodiment.
Figure 29:
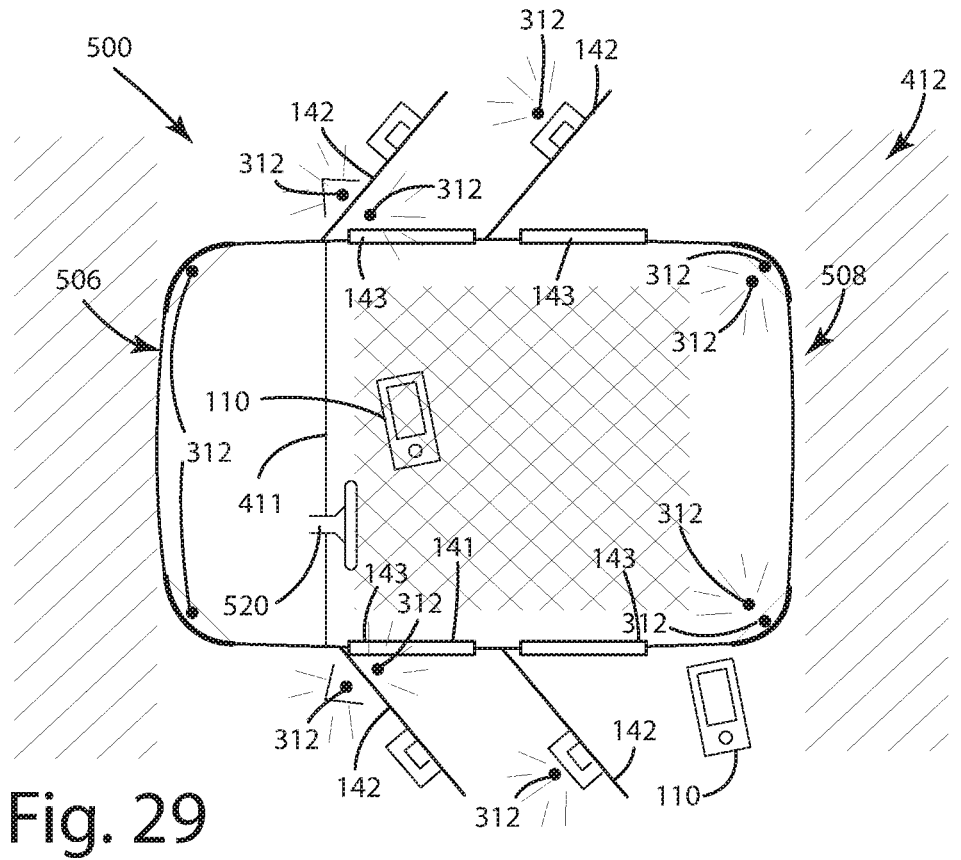
FIG. 29 depicts antennas on movable parts of equipment using angle of arrival in accordance with one embodiment.
Figure 30:
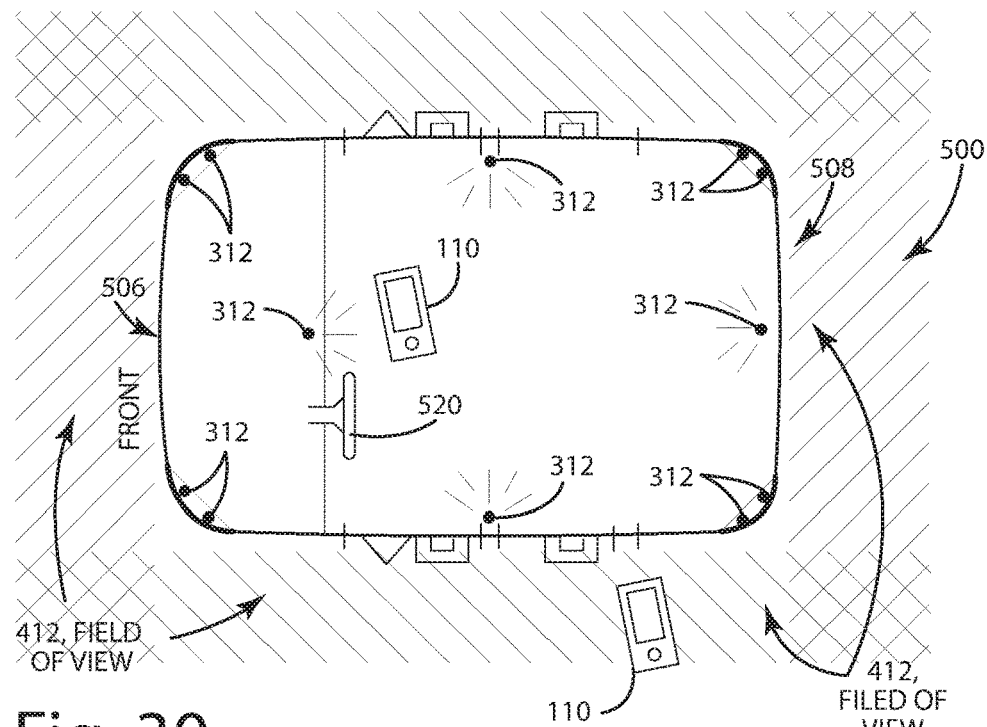
FIG. 30 depicts antennas on movable parts of equipment using angle of arrival in accordance with one embodiment.
Figure 31:
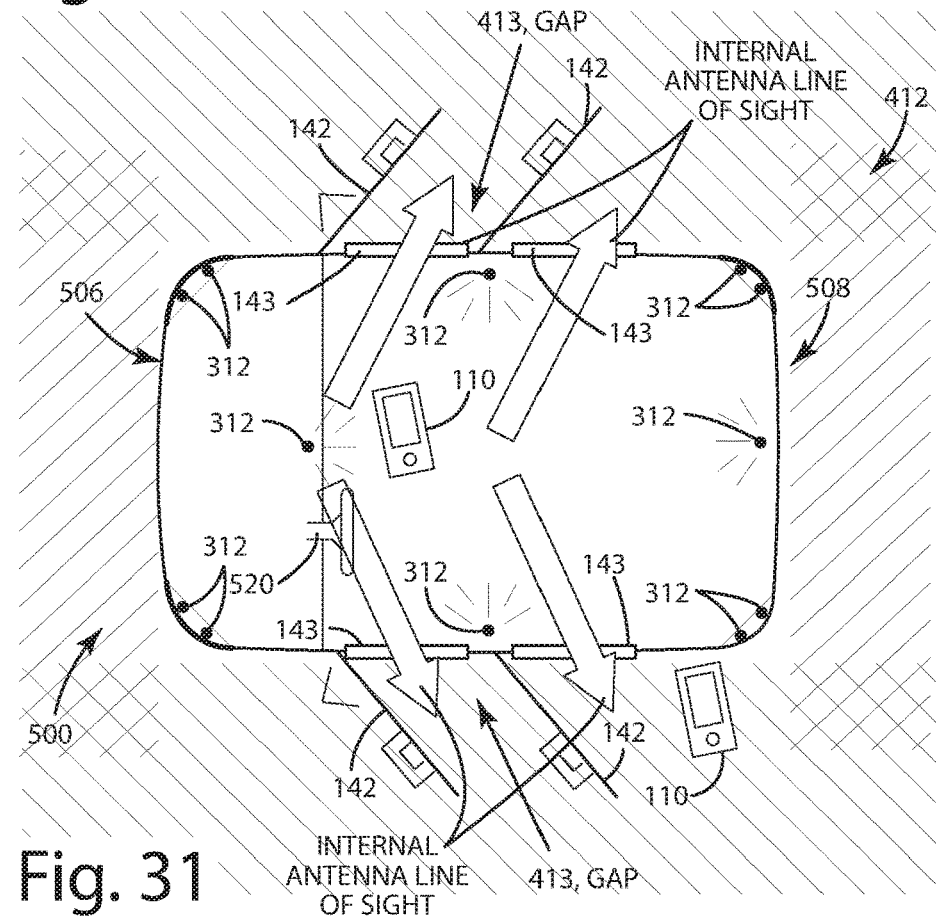
FIG. 31 depicts antennas on movable parts of equipment using angle of arrival in accordance with one embodiment.
Figure 32:
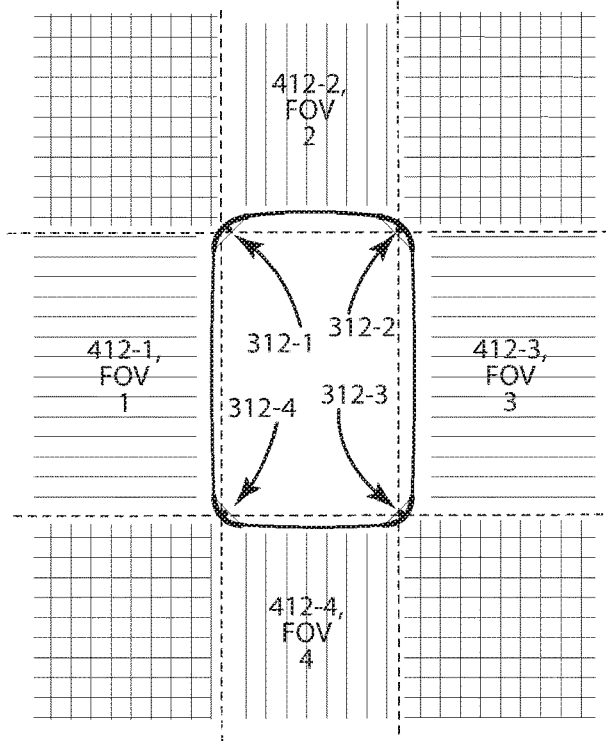
FIG. 32 shows alternate exterior antenna configurations using angle of arrival (4 antennas) in accordance with one embodiment.
Figure 33:
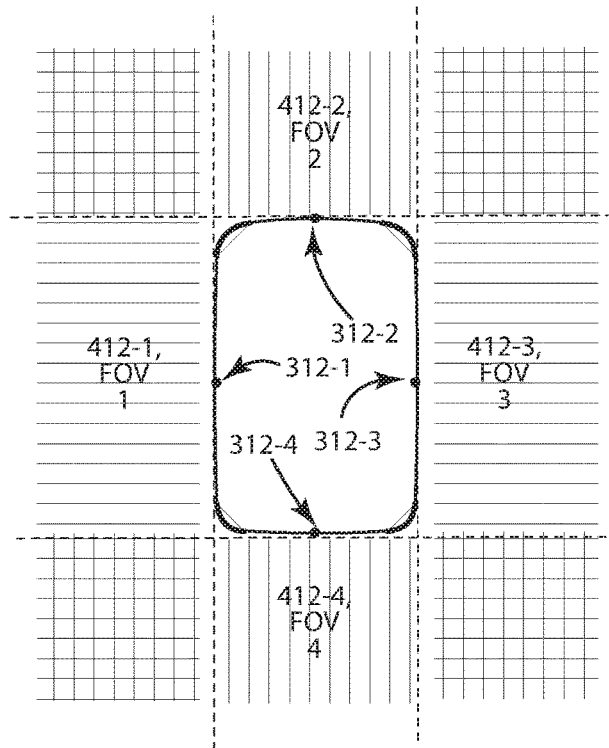
FIG. 33 shows alternate exterior antenna configurations using angle of arrival (4 antennas) in accordance with one embodiment.
Figure 34:
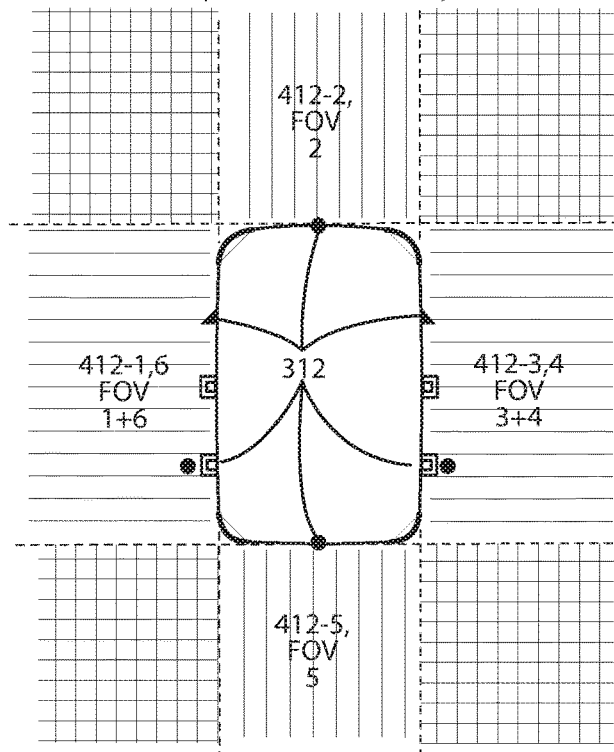
FIG. 34 shows alternate exterior antenna configurations using angle of arrival (2, 5, 6, and 8 antennas) in accordance with one embodiment.
Figure 35:
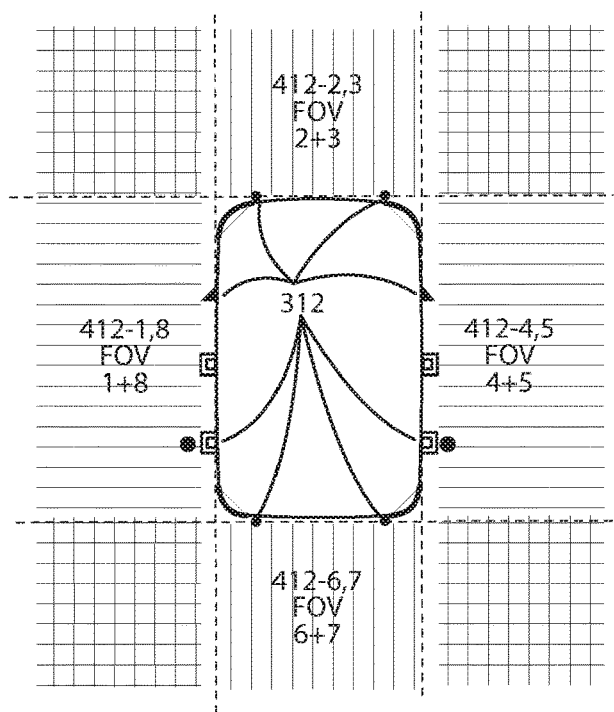
FIG. 35 shows alternate exterior antenna configurations using angle of arrival (2, 5, 6, and 8 antennas) in accordance with one embodiment.
Figure 36:
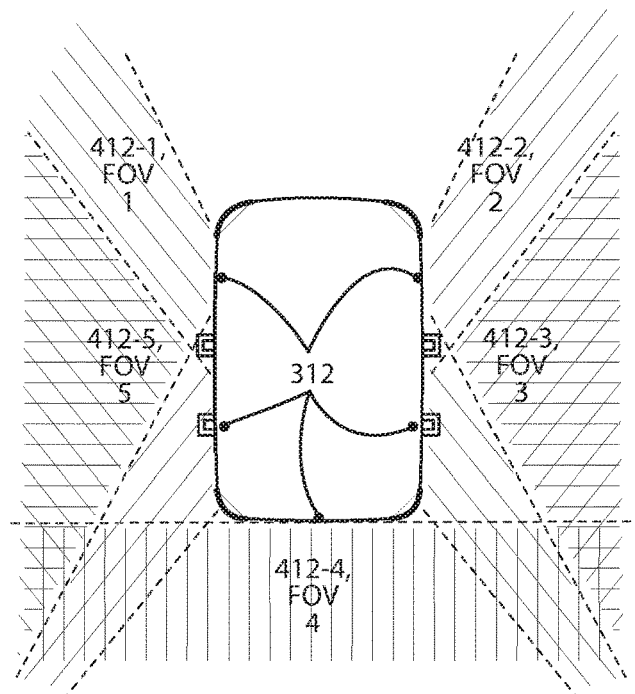
FIG. 36 shows alternate exterior antenna configurations using angle of arrival (2, 5, 6, and 8 antennas) in accordance with one embodiment.
Figure 37:
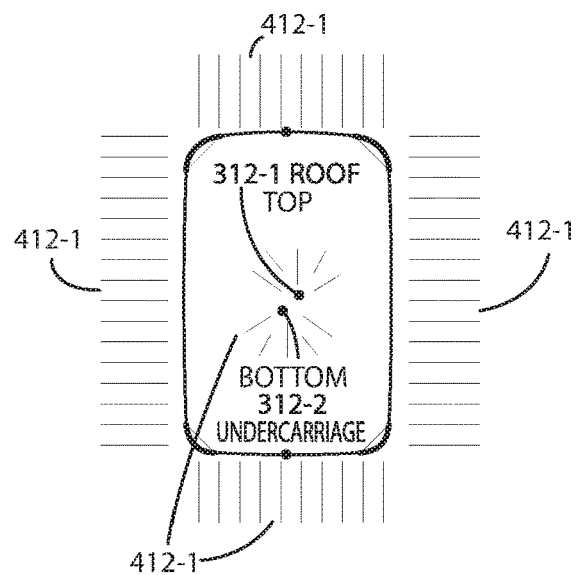
FIG. 37 shows alternate exterior antenna configurations using angle of arrival (2, 5, 6, and 8 antennas) in accordance with one embodiment.
Figure 38:
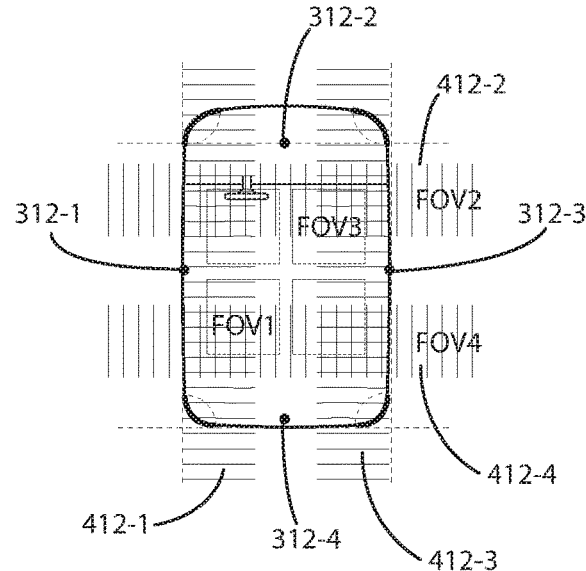
FIG. 38 shows alternate interior antenna configurations using angle of arrival (1, 2, and 4 antennas) in accordance with one embodiment.
Figure 39:
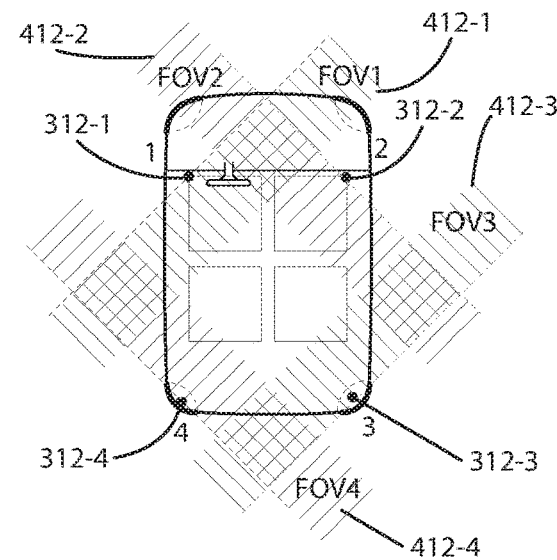
FIG. 39 shows alternate interior antenna configurations using angle of arrival (1, 2, and 4 antennas) in accordance with one embodiment.
Figure 40:
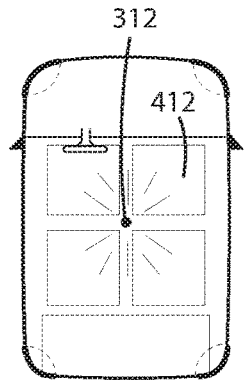
FIG. 40 shows alternate interior antenna configurations using angle of arrival (1, 2, and 4 antennas) in accordance with one embodiment.
Figure 41:
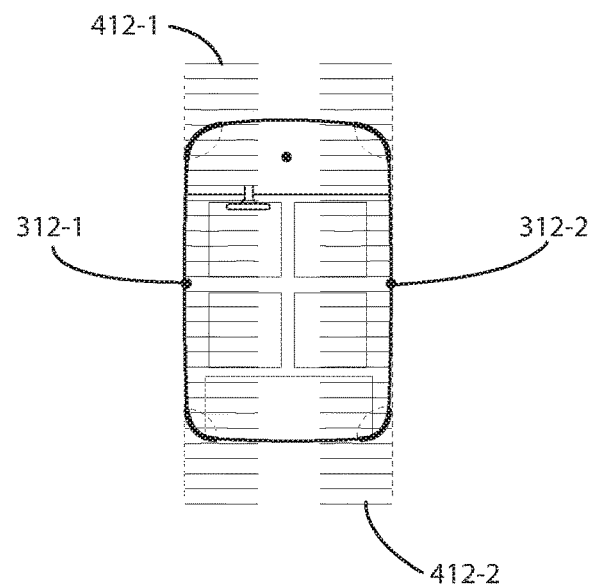
FIG. 41 shows alternate interior antenna configurations using angle of arrival (1, 2, and 4 antennas) in accordance with one embodiment.
Figure 42:
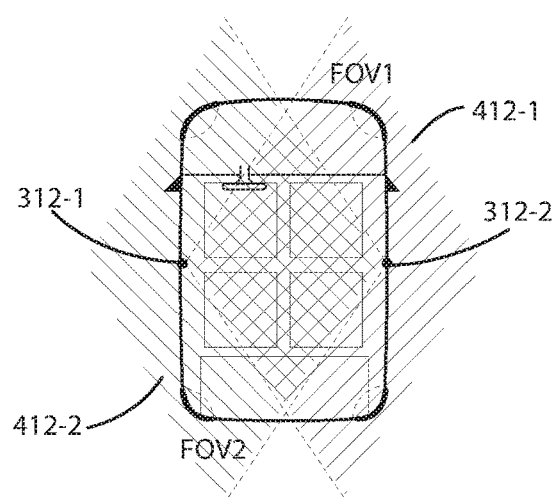
FIG. 42 shows alternate interior antenna configurations using angle of arrival (1, 2, and 4 antennas) in accordance with one embodiment.
Figure 43:
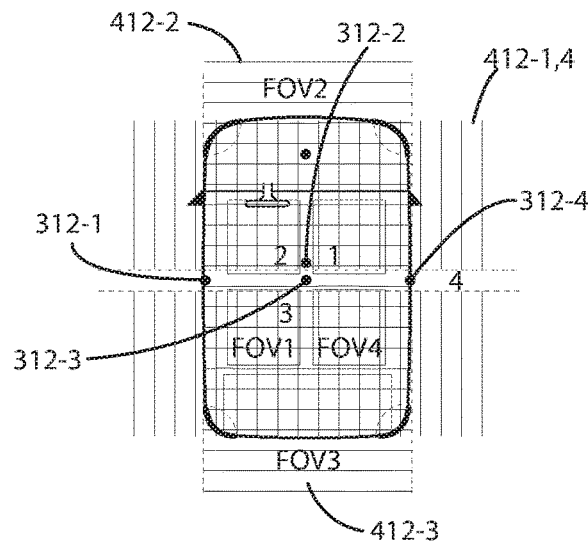
FIG. 43 shows alternate interior antenna configurations using angle of arrival (1, 2, and 4 antennas) in accordance with one embodiment.

In an alternate embodiment, seat determination may be performed using antennas 312 placed in other positions on the vehicle 500, such as the positions described for inside antennas 312 of the 11-antenna RSSI-only system for inside/outside vehicle microlocation (illustrated in FIG. 23). In such an embodiment, antennas 312 positioned near each desired zone (e.g., front driver seat, front passenger seat, rear driver seat, rear passenger seat, rear trunk/cargo area) may be used to determine proximity (or lack of proximity) to corresponding zones, as well as proximity (or lack of proximity) to corresponding doors (e.g., for use with adjusting algorithm processing based upon door state, as described herein). For example, the system 100 may determine that the portable device 110 is located in the driver seat zone 400FL, if (a) the inside front driver antenna 312-2 RSSI is larger than all other applicable inside antennas 312 by a threshold, or (b) if the inside front driver antenna 312-2 RSSI is not larger than all other applicable inside antennas 312 by a threshold (e.g., said threshold is not satisfied), and no other applicable inside antenna 312 RSSI exceeds a threshold, and the inside front driver antenna 312-2 is greater than all other applicable antennas 312. Additionally, door state may be used to inform which door a portable device 110 may be located (e.g., if the driver door is open, and the portable device 110 may be proximate to the front driver antenna 312-2 as determined by its RSSI exceeding a threshold [and/or because multiple applicable inside antennas exceed a threshold], the system 100 may determine than the portable device 110 is proximate to the driver seat or door). Any combination of the above methods, including methods that provide confirmation by absence (i.e., not near a particular antenna 312), may be used to infer in which seat or near which door a portable device 110 is located. The set of antennas 312 to include in said methods is not limited to inside antennas 312—outside antennas 312 may also be used, for example, to provide additional confidence in the proximity to a particular zone and/or to provide additional confidence in the absence of proximity to a particular zone. It should also be noted that inside zone and/or door proximity may be determined using angles and/or distance (time of flight) in addition to, or instead of, RSSI, as described herein.

Antenna 312 placement for inside seat and/or door determination may vary depending upon the application goals, available packaging locations, and sensor 310/antenna 312 packaging and operating capabilities. For example, higher antenna 312 placement locations, such as in the headliner, near the top of the pillars, upper seat backs, or headrests, etc., may provide better performance than lower placement locations, such as in the middle of doors, in seats or lower seat backs, in the middle of the pillars, consoles, or near the floor, etc., because higher positions maintain a better RF path/line-of-sight to the portable device 110 when a person is sitting in and holding and/or using the portable device 110 in the vehicle 500 and also because such positions minimize obstructions caused by other peoples' bodies in the vehicle.

Any of the above and subsequent embodiments may be combined to determine which seat zone in which a portable device 110 is located. The seating position may be used to enable seat-specific infotainment, billing, targeted marketing, and so on.

E. Inside/Outside Vehicle Microlocation Embodiment

Use of the term vehicle 500 is considered to include any mobile machine which transports people or cargo, including but not limited to wagons, bicycles, motorcycles, automobiles, cars, trucks, trains, trams, ships, boats, aircraft, and spacecraft. For example, placement of antennas inside and outside of the vehicle, in orientations and in conjunction with the vehicle shell, to enable the detection of the presence of devices 110 located either inside, outside, near or far from, the vehicle using Bluetooth Low Energy. Additionally, zones may be created to enable the detection of devices 110 in various zones outside the vehicle (e.g., driver door 142, passenger door 142, trunk, hood, rear driver door 142, rear passenger door 142, etc.).

As described in the Doorman and Sniffing disclosures (U.S. patent application Ser. No. 14/620,959, entitled SYSTEM AND METHOD FOR COMMUNICATING WITH A VEHICLE, filed Feb. 12, 2015, to Ellis et al., and U.S. Provisional Patent Application No. 62/323,262 entitled SYSTEM AND METHOD FOR ESTABLISHING REAL-TIME LOCATION, filed Apr. 15, 2016, to Stitt et al.—the disclosures of which are incorporated herein in their entirety), additional techniques may be used in addition to the RSSI-based differential approach to increase accuracy and precision (e.g., trilateration, triangulation, fingerprinting, AoA, etc.).

Figure 20:
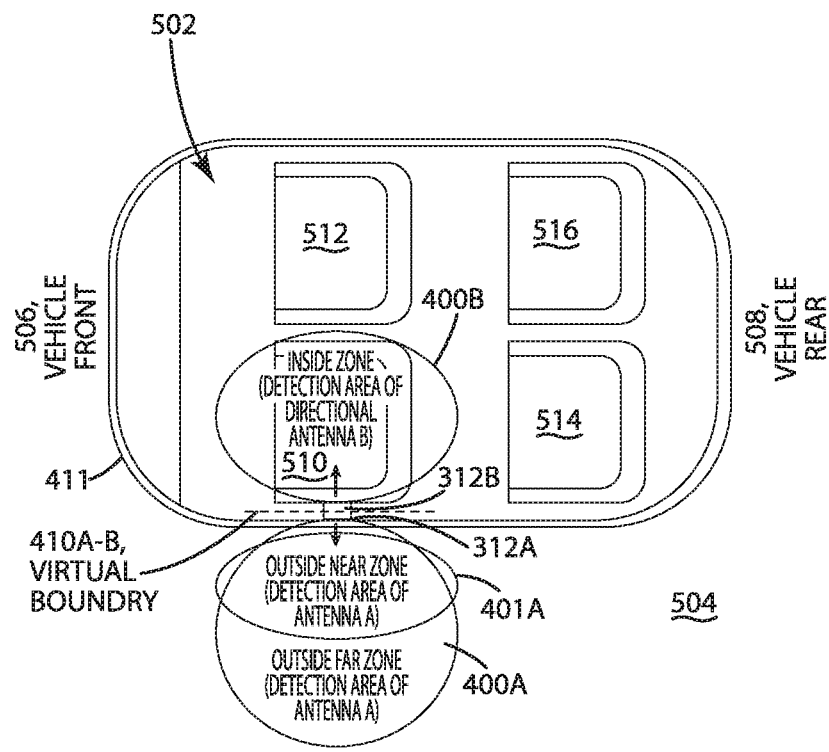
FIG. 20 includes a vehicle showing inside/outside zones in accordance with one embodiment.

The inside/outside position can be used to authenticate identity and enable payment for automated taxi and car/ride sharing services, enable access to exterior and/or interior vehicle systems, automatically lock/unlock doors 142 (as described in other systems), deliver targeted marketing (interior or exterior of vehicle), and so on. An example of this configuration can be seen in the illustrated embodiment FIG. 20, in which the vehicle 500 includes first and second antennas 312A, 312B arranged on opposing sides of a physical boundary 411 between the interior space 502 and the exterior space 504 defined by structure of the vehicle 500. In the illustrated embodiment, the antenna 312A is disposed to detect a device 110 within at least one of a zone 400A and a zone 401A nearer to the vehicle structure. Both zones 400A, 401A are outside vehicle space 502. The antenna 312B may be disposed to detect a device 110 within a zone 400B within the interior space 502. Based on one or more signal characteristics detected with respect to the antennas 312A, 312B, the system 100 may determine a position of the device 110. In one example, a virtual boundary 410A-B defined by the antennas 312A, 312B may facilitate identifying position information about the device 110.

The following sections describe more specific embodiments of microlocation with respect to a vehicle 500—although it should be understood, as discussed herein, that aspects of each of the following embodiments may be utilized in connection with any other embodiment, including embodiments outside the realm of vehicles.

E.1 Inside/Outside Vehicle Microlocation Embodiment with RSSI

In one embodiment, RSSI may be used to determine position the device 110 relative to the vehicle 500 (e.g., using a heuristic fingerprint, probabilistic heuristics, trilateration, multilateration, etc.). RSSI readings are obtained using a sniffing approach, as described herein; however, the embodiments themselves need not utilize the use of a particular architecture to obtain readings.

In one or more of the described embodiments, the system 100 may provide, for each reported zone 400, a correctness likelihood indicator (e.g., a confidence score/metric, a likelihood score/metric, probability relative to other reported zones 400 and/or the current zone 400, etc.).

E.1.a Three (3) Antenna RSSI-Only System

Figure 21:
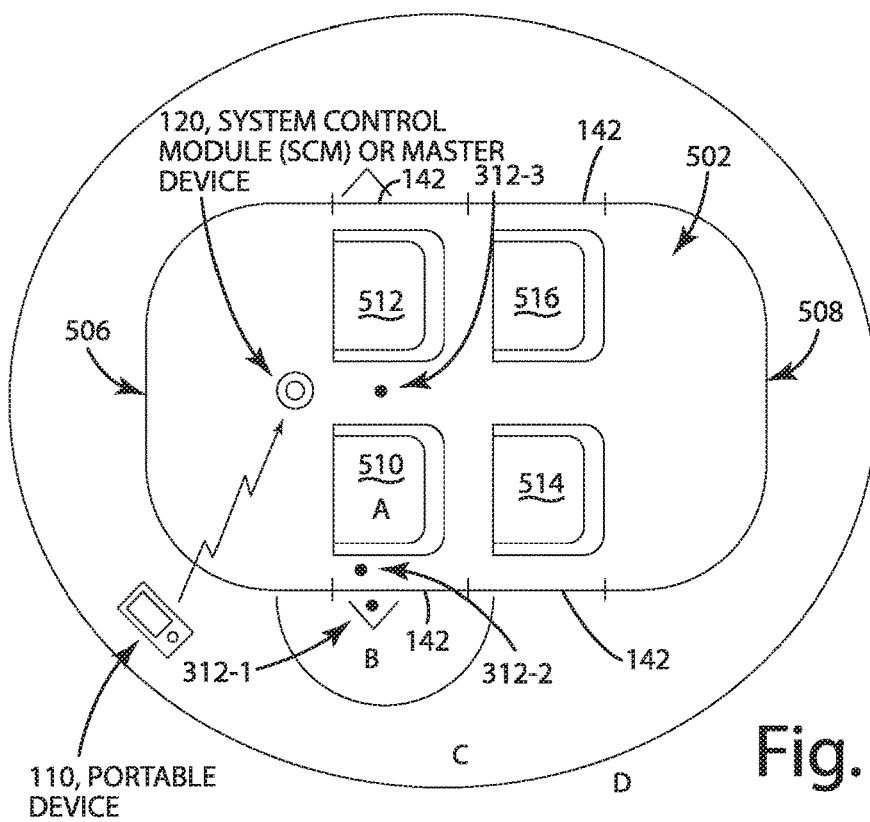
FIG. 21 shows a three antenna vehicle microlocation system using RSSI in accordance with one embodiment.

In one embodiment of a vehicle microlocation system 100, shown for example in FIG. 21, the system 100 may use RSSI and three (3) antennas 312:

1. Near, on, or in Exterior Driver Door (e.g., mirror, trim, wheel well, door handle, etc.). Antenna 312-1
2. Near, on, or in Interior Driver Door (e.g., door 142, A-pillar, B-pillar, headliner, floor, etc.). Antenna 312-2
3. Near or at Center (e.g., center stack, arm rest, headliner, floor, cup holder, cabin lights, dashboard, etc.). Antenna 312-3

In this system 100, the portable device 110 may communicate with a master device 120 located on the interior 502 of the vehicle 500 that is separate from the three (3) antennas identified above. In an alternate embodiment, the master device 120 may be located on the exterior 504 of the vehicle 500.

As depicted in the illustrated embodiment of FIG. 21, this system 100 may be capable of determining at least the following zones 400: A) inside near driver seat, B) outside near driver door 142, C) not near the vehicle, but connected, and D) not connected.

Additional zones 400 may be defined, with varying levels of accuracy. For example, another outside zone 400 may be defined outside the driver door 142, that extends further away from the door 142 (an approach zone), but the ability of the system 100 to accurately determine whether or not the device 110 is located within that zone 400 may be limited by the underlying capabilities of the communications medium (e.g., BLE vs. UWB vs. LF).

Determining in which zone 400 the portable device 110 is located may be accomplished by combining the differential and threshold techniques, along with the signal analysis techniques, described within this disclosure. The system 100 may distinguish zone A (inside) from other zones by requiring both a differential between antenna 312-1 and antenna 312-2 to indicate inside (e.g., [312-2]>[312-1]) and the maximum RSSI (or minimum computed distance) amongst a set of antennas (e.g., 312-2 and 312-3) to be within a predetermined threshold (or threshold range). There exist alternate embodiments where only thresholds are evaluated, or only differentials are evaluated, but not in combination; using both thresholds and differentials (with the appropriate mix and placement of antennas) may yield a better performing system that is able to better mitigate many environmental and RF propagation/path-loss effects.

The system 100 may distinguish zone B from C by requiring that the maximum RSSI (or minimum computed distance) amongst a set of antennas (e.g., 312-2 and 312-3) to be within one or more predetermined threshold ranges (e.g., within a near threshold range, etc.).

The system 100 may determine the position of the portable device 110 to be in zone C, if the portable device 110 is connected (i.e., is communicating with one or more master devices 120) and was not determined to be in zones A or B. The system 100 may also determine the position of the portable device 110 to be in zone C, if the portable device 110 is connected and the maximum RSSI (or minimum computed distance) amongst a set of antennas (e.g., 312-2 and 312-3) are beyond one or more predetermined threshold ranges (e.g., further than a far threshold range, above a minimum RSSI, etc.).

The system 100 may determine the position of the portable device 110 to be in zone D, if the portable device 110 is not connected.

In addition to, or in place of, a single threshold (or threshold range), different mixes of antennas 312 may have different thresholds and/or combinations of thresholds, to better handle system edge cases (e.g., the max RSSI of antennas 312-2 and 312-3 must be less than X, the RSSI of antenna 312-1 must be less than Y, etc.).

Antenna measurement/approximation error may be expressed as part of the threshold range, or as an additional range applied to each threshold (or threshold range). For example, if the measurement/approximation error is 2 dBm, thresholds (and threshold ranges) may be expressed as −50 dBm+/−2 dBm, −52 dBm, or −48 dBm, −60 dBm to −30 dBm+/−2 dBm, −58 dBm to −28 dBm, −58 dBm to −32 dBm, −62 dBm to −28 dBm, or −62 dBm to −32 dBm, and so on.

Differentials may also have a threshold or threshold range applied (e.g., to be considered inside, [312-2] must be greater than [312-1] by at least X).

Hysteresis (time- or value-based) may also be applied to a differential or threshold (or threshold range), requiring one value (or amount of time in) to enter a zone (e.g., transition from A to B) and another value (or amount of time out) to exit a zone (e.g., transition from B to A). Hysteresis may also be a means to encapsulate measurement error. Hysteresis may also be applied to zone transition decisions themselves (e.g., requiring that multiple positioning iterations result in the same decision before announcing said decision).

Thresholds and threshold ranges may be expressed and evaluated in terms of RSSI (e.g., dB, dBm, etc.), computed distance (e.g., meters), synthetic values (i.e., another value derived at least in part from RSSI), or any combination thereof.

Distances computed from different collections and aggregation methods (min, max, average, cluster, median, etc.) may use different sets of equations or approaches. For example, distances computed from individual antennas may use equation or approach X, whereas the distance computed from the max of antennas 312-2 and 312-3 may use equation or approach Y.

The system may distinguish zone B from C by requiring that the maximum RSSI (or minimum computed distance) amongst a set of antennas (e.g., 312-2 and 312-3) to be within a predetermined threshold range (e.g., within a near driver door threshold range). In addition to, or in place of, a single threshold, different mixes of antennas may have different thresholds, and combinations of thresholds, to better handle system edge cases (e.g., the max RSSI of antennas 312-2 and 312-3 must be within a near driver door threshold range, the RSSI of antenna 312-1 must be less than X, the RSSI of antenna 312-1 must be less than Y and the max RSSI of antennas 312-2 and 312-3 must be within a Y . . . Z, etc.).

A BLE-based version of this embodiment may have several possible disadvantages. In particular, this embodiment in one configuration may not work optimally or in compliance with one or more criteria when the portable device 110 is not located near the driver side of the vehicle 500, as the system 100 may not always able to distinguish between inside in the driver seat 510 versus outside on the passenger side. BLE is also a noisy communications medium, as described in subsequent embodiments, and as such, using fewer antennas 312 may result in lower accuracy and/or zone determination stability.

While this embodiment is described in the context of the driver side, and in particular the driver side front door/seat, this approach is not so limited and is applicable to other vehicle sides, doors 142, and seats.

The system 100 may, alternately or additionally, determine the zone 400 in which the portable device 110 is located using a trilateration- and/or multilateration-based approach (described herein).

The system 100 may, alternately or additionally, determine distance using a time-of-flight-/time-of-arrival-(TOF/TOA) and/or time-difference-of-arrival (TDOA)-based approach (described herein).

E.1.b Seven (7) Antenna RSSI-Only System

Figure 22:
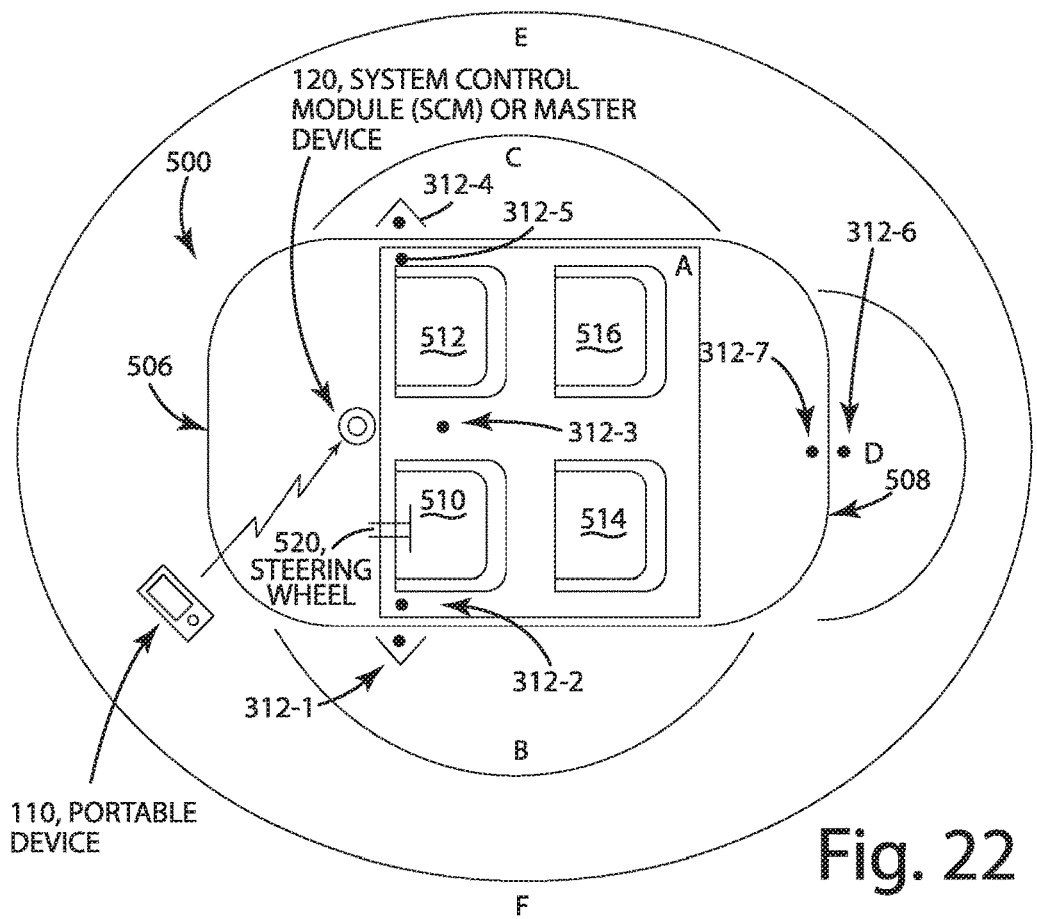
FIG. 22 shows a seven antenna vehicle microlocation system using RSSI in accordance with one embodiment.

In one embodiment of a vehicle microlocation system 100, shown for example in FIG. 22, the system 100 may use RSSI and seven (7) antennas 312:

1. Near, on, or in Exterior Driver Door (e.g., mirror, trim, wheel well, door handle, B-pillar, etc.). Antenna 312-1
2. Near, on, or in Interior Driver Door (e.g., door 142, A-pillar, B-pillar, headliner, floor, etc.). Antenna 312-2
3. Near or at Center (e.g., center stack, arm rest, headliner, floor, cup holder, cabin lights, dashboard, etc.). Antenna 312-3
4. Near, on, or in Exterior Passenger Door (e.g., mirror, trim, wheel well, door handle, B-pillar, etc.). Antenna 312-4
5. Near, on, or in Interior Passenger Door (e.g., door 142, A-pillar, B-pillar, headliner, floor, etc.). Antenna 312-5
6. Near, on, or in Exterior Rear Tailgate/Trunk (e.g., trim, spare tire well, door handle, bumper/fascia, etc.). Antenna 312-6
7. Near, on, or in Interior Rear Tailgate/Trunk (e.g., trim, spare tire well, door handle, bumper, etc.). Antenna 312-7

In this system 100, the portable device 110 may communicate with a master device 120 located on the interior 502 of the vehicle 500 that is separate from the seven (7) antennas 312 identified above. In an alternate embodiment, the master device 120 may be located on the exterior 504 of the vehicle 500. In an alternative embodiment, there is a five (5) antenna configuration that omits the tailgate/trunk antennas 312-6, 316-7.

As depicted in the illustrated embodiment of FIG. 22, this system 100 may be capable of determining at least the following zones: A) inside, B) outside near driver side, C) outside near passenger side, D) outside near tailgate/trunk, E) not near the vehicle, but connected, and F) not connected.

Additional zones 400 may be defined, with varying levels of accuracy. For example, another outside zone 400 may be defined outside of the near zones 400, that extends further away from the vehicle 500 (e.g., an approach zone). The system 100 may also be able to determine position within the vehicle 500—near the driver side, passenger side, or trunk. The ability of the system 100 to accurately determine whether or not the device 110 is located within what zone 400 may be limited by the underlying capabilities of the communications medium (e.g., BLE vs. UWB vs. LF).

Similar to the three (3) antenna system described in connection with FIG. 21, the system 100 in the illustrated embodiment of FIG. 22 may determine the zone 400 in which the portable device 110 is located by combining the differential and threshold techniques described within this disclosure. The system 100 may distinguish zone A (inside) from other zones 400 by requiring both a differential between the maximum of the inside antennas (312-2, 312-3, 312-5, and 312-7) and the maximum of the outside antennas (312-1, 312-4, and 312-6) to indicate inside (e.g., inside >outside) and the maximum RSSI (or minimum computed distance) amongst a set of antennas (e.g., 312-2, 312-3, 312-5, and 312-7) to be within a predetermined threshold (or threshold range). In addition to, or alternative to, using a differential between the maximum inside and outside antennas 312, the system 100 may distinguish zone A (inside) from other zones 400 by requiring the differential between certain pairs of antennas 312 (e.g., antennas 312 that generate a virtual boundary 410 of interest) to provide an appropriate indication. For example, the system 100 may utilize the differential between antennas 312-1 and 312-2, antennas 312-4 and 312-5, and antennas 312-6 and 312-7, to all indicate inside to be located in zone A. Which set of differentials to use may be selected based upon the values of other differentials and thresholds that are satisfied (or not); for example, if all of the differentials indicate inside, and the maximum RSSI threshold is within an alternate range of the primary threshold (e.g., just outside the primary threshold range, but within a secondary threshold range), then the system 100 may locate the portable device in zone A, regardless of the primary threshold not being satisfied.

The system 100 may distinguish zones B, C, or D from E by requiring that the maximum RSSI (or minimum computed distance) amongst a set of antennas (e.g., 312-2, 312-3, 312-5, and 312-7) to be within one or more predetermined threshold ranges (e.g., within a near driver threshold range, within a near passenger threshold range, within a near tailgate threshold range, etc.).

The system 100 may determine the position of the portable device 110 to be in zone E, if the portable device 110 is connected (i.e., is communicating with one or more master devices 120) and was not determined to be in zones A-D. The system 100 may also determine the position of the portable device 110 to be in zone E, if the portable device 110 is connected and the maximum RSSI (or minimum computed distance) amongst a set of antennas (e.g., 312-2, 312-3, 312-5, and 312-7) are beyond one or more predetermined threshold ranges (e.g., further than a far threshold range, above a minimum RSSI, etc.).

The system 100 may determine the position of the portable device 110 to be in zone F, if the portable device 110 is not connected.

Similar to the three (3) sensor system 100, in addition to, or in place of, a single threshold, different mixes of antennas 312 may have different thresholds, and combinations of thresholds, to focus on handling system edge cases (e.g., the max RSSI of antennas 312-2, 312-3, 312-5, and 312-7 must be within a near driver threshold range, the RSSI of antenna 312-1 must be less than X, the RSSI of antenna 312-1 must be less than Y and the max RSSI of antennas 312-2, 312-3, 312-5, and 312-7 must be within a Y . . . Z, etc.).

Antenna measurement/approximation error may be expressed as part of the threshold range, or as an additional range applied to each threshold (or threshold range). For example, if the measurement/approximation error is 2 dBm, thresholds (and threshold ranges) may be expressed as −50 dBm+/−2 dBm, −52 dBm, or −48 dBm, −60 dBm to −30 dBm+/−2 dBm, −58 dBm to −28 dBm, −58 dBm to −32 dBm, −62 dBm to −28 dBm, or −62 dBm to −32 dBm, and so on.

Differentials may also have a threshold or threshold range applied (e.g., to be considered inside, [312-2] must be greater than [312-1] by at least X).

Hysteresis (time- or value-based) may also be applied to a differential or threshold (or threshold range), requiring one value (or amount of time in) to enter a zone (e.g., transition from A to B) and another value (or amount of time out) to exit a zone (e.g., transition from B to A). Hysteresis may also be a means to encapsulate measurement error. Hysteresis may also be applied to zone transition decisions themselves (e.g., requiring that multiple positioning iterations result in the same decision before announcing said decision).

Thresholds and threshold ranges may be expressed and evaluated in terms of RSSI (e.g., dB, dBm, etc.), computed distance (e.g., meters), synthetic values (i.e., another value derived at least in part from RSSI), or any combination thereof.

Distances computed from different collections and aggregation methods (e.g., min, max, average, cluster, median, etc.) may use different sets of equations or approaches. For example, distances computed from individual antennas 312 may use equation or approach X, whereas the distance computed from the max of antennas 312-2, 312-3, 312-5, and 312-7 may use equation or approach Y. As a further example, the driver outside antenna (312-1), passenger outside antenna (312-4), and rear outside antenna (312-6) may each have different equations or approaches for computing distance.

The system 100 may distinguish between zones B, C, and D by determining, amongst the set of potential zone thresholds that are satisfied, which zone's representative external antennas (e.g., 312-1 for B, 312-4 for C, 312-6 for D) have the highest RSSI (or lowest computed distance).

In a BLE-based system, to enhance handling scenarios where a portable device 110 is located in a person's pocket (i.e., attenuated by their body), multiple sets of antennas 312 and thresholds may be utilized to determine whether the portable device 110 is or isn't in a near zone (where it may otherwise be determined as not near). Such processing may utilize the system 110 to determine which near zone (B, C, or D) may be selected, regardless of whether the system 100 believes the portable device 110 is within the corresponding (or any) near zone thresholds. If primary threshold ranges used to determine whether or not a portable device 110 is in a particular near zone 400 are not satisfied, but are within a secondary threshold range, and one or more other differentials and/or secondary thresholds (using the same or other antennas 312) are satisfied for a particular near zone 400, the system 100 may select that near zone 400. For example, if the system 100 believes the portable device 110 is on the driver side as determined using the representative external antennas 312, but the maximum RSSI (or minimum computed distance) amongst the set of antennas used to compute distance from the vehicle (e.g., 312-2, 312-3, 312-5, and 312-7) is not within the primary driver side near threshold, but it is within a secondary driver side near threshold, and the driver side representative external antennas' 312 RSSI (or computed distance, etc.) are within a corresponding near override threshold, the system 100 may determine that the portable device 110 is located in zone B (driver near), as opposed to zone E (not near). Such a determination may also incorporate the differentials of various sensor pairs 312 to provide more confidence (e.g., ensure that the driver side antennas 312 indicate outside and that the passenger side antennas 312 indicate inside). Such a determination may also incorporate RSSIs (or computed distance, etc.) from other antennas 312 to provide further confidence (e.g., if near the driver side, the passenger side distance should be within a particular threshold range).

With some underlying communications technologies, RSSI may be quite noisy due to signal blockers and reflectors, such as with BLE, and despite the advanced signal analysis techniques identified in this disclosure, additional (intelligent) filtering may be implemented to prevent potentially unwanted transient zone transitions due to such noise or environment effects between near zones (B, C, and D). Such filtering may utilize a larger threshold difference to transition from one near zone 400 to another (e.g., utilize a 5 dB RSSI difference between representative external antennas to transition from D to B or C, utilize a 10 dB RSSI difference between representative external antennas 312 to transition from B to C, etc.). Such filtering may also include requiring one or more differentials between certain pairs of antennas 312 (e.g., antennas 312 that generate a virtual boundary 410 of interest) to provide an appropriate indication when transitioning into a near zone 400 and/or from one near zone 400 to another. For example, the system 100 may utilize the differential between 312-1 and 312-2 to indicate outside to transition from E to B, but may utilize the differential between 312-1 and 312-2 to indicate outside and the differential between 312-4 and 312-5 to indicate inside to transition from C to B. In another example, the system may only utilize the differential between 312-1 and 312-2 to indicate outside and the differential between 312-4 and 312-5 to indicate inside when transitioning from C to B when a threshold is not satisfied. In another example, the system 100 may utilize the differential between 312-1 and 312-2 and between 312-4 and 312-5 to indicate inside to transition to D from B or C. These techniques may also be applied to other zone transitions, including inside/outside.

Variance (or noise) in measured RSSI due to reflections, despite its possible disadvantages, may provide a benefit: in systems 100 that operate across multiple frequencies/channels (e.g., BLE), it may be possible to determine that a reflective object (e.g., another vehicle) is nearby through analysis of per-frequency/channel RSSI measurements (as described in Section C.9. For example, if a portable device is far away, there may be variation amongst RSSI measurements across the vast majority of channels; however, if a portable device 110 is nearby, there may be substantial agreement amongst RSSI measurements across the vast majority of channels; therefore, in situations where RSSI measurements on only a few channels vary significantly from the others (as determined by one or more thresholds, which may encapsulate measurement/approximation error [described herein]), the system 100 may conclude that a vehicle or other object is near that antenna 312 and adjust thresholds or methods, as appropriate. For example, the system 100 may determine that another vehicle is present near the driver side of the vehicle, and alter the thresholds or distance measurement methods used with antennas 312 on that side of the vehicle 500, zone determination criteria, calibration/offsets, any other attribute or method disclosed herein, or any combination thereof. At a minimum, as described previously, said invalid measurements may be filtered.

The system 100 may adjust thresholds, hysteresis, antenna 312 combinations, differentials, combination methods, and/or any other disclosed method, based upon determined background power and/or background noise. For example, if the background power/noise determined to be high, thresholds may be increased.

The system 100 may also adjust thresholds, hysteresis, antenna 312 combinations, differentials, combination methods, and/or any other disclosed method, based upon RSSI measured from transmissions from the system's own antennas 312 (including the master device's 120 one or more antennas 312). For example, if each antenna 312 measures the RSSI of signals transmitted by the master device 120, and said measured RSSI is above a threshold (e.g., a predetermined [normal or open field] baseline, etc.), thresholds may be increased. For example, if one antenna 312 measures the RSSI of signals transmitted by another antenna 312, and said measured RSSI is above a threshold (e.g., a predetermined [normal or open field] baseline, etc.), the system 100 may determine that a large reflective objective is nearby, or conversely, if the measured RSSI is below a threshold, that an object exists between said antennas 312.

In one embodiment, the system 100, when it has determined that a vehicle or object is nearby, such as by observing variance on only a few channels, or by measuring RSSI between antennas 312, as described above, the distance to said vehicle or object may computed using the difference between the measured RSSI and a predetermined [normal or open field] baseline, by using trilateration and/or multilateration, or any other method described herein, or any combination thereof.

Some antennas 312 may be placed in locations that are movable (such as a door 142 or tailgate). In some cases, movement of the antennas 312 does not affect system operation. In other cases, knowledge of the equipment (vehicle) state may provide a means for the system 100 to alter which thresholds, differentials, distance calculation methods, or other computations are performed. In some of those cases, the desired behavior may be the same behavior as though the equipment state had not changed (e.g., when a portable device 110 is placed in the breach of an open door 142, it may be desirable for the system 100 to not indicate that said portable device 110 is inside [zone A] and instead indicate outside [zone B, C, or D, as appropriate]). By using equipment state provided by the vehicle 500, such alterations are possible. By receiving the door 142 ajar status for each door 142, the system 100 may discard, or use alternate heuristics, for heuristics that incorporate that door's differentials or antennas 312. For example, if the driver door 142 is open, the corresponding inside antenna 312 may be omitted from the set of antennas 312 used to compute vehicle distance. For example, when the portable device 110 is located at the rear driver door 142 on the outside of the vehicle cabin, if the driver front door 142 is closed, the differential may indicate outside, but if the driver door 142 is open, the differential may indicate inside, calling for the use of an additional threshold or comparison of additional differentials to continue to determine the portable device is positioned outside. By receiving the window state for each door 142, alternate signal analysis may be performed or different thresholds may be selected for affected antennas 312. For example, if the vehicle glass is coated with an RF-blocking material, window up or down may significantly alter distance calculations, whereas if it is not, the impact may be minor or negligible.

The system 100 may, alternately or additionally, determine the zone 400 in which the portable device 110 is located using a trilateration- and/or multilateration-based approach (described herein).

The system 100 may, alternately or additionally, determine distance using a time-of-flight-/time-of-arrival-(TOF/TOA) and/or time-difference-of-arrival (TDOA)-based approach (described herein).

E.1.c Eleven (11) Antenna RSSI-Only System

In one embodiment of a vehicle microlocation system 100, shown for example in FIG. 23, the system 100 may use RSSI, eleven (11) antennas:

1. Near, on, or in Exterior Front Driver Door (e.g., mirror, trim, wheel well, door handle, B-pillar, etc.). Antenna 312-1
2. Near, on, or in Interior Front Driver Door (e.g., door 142, A-pillar, B-pillar, headliner, floor, etc.). Antenna 312-2
3. Near or at Center (e.g., center stack, arm rest, headliner, floor, cup holder, cabin lights, dashboard, etc.). Antenna 312-3
4. Near, on, or in Exterior Front Passenger Door (e.g., mirror, trim, wheel well, door handle, B-pillar, etc.). Antenna 312-4
5. Near, on, or in Interior Front Passenger Door (e.g., door 142, A-pillar, B-pillar, headliner, floor, etc.). Antenna 312-5
6. Near, on, or in Exterior Rear Tailgate/Trunk (e.g., trim, spare tire well, door handle, bumper/fascia, etc.). Antenna 312-6

7. Near, on, or in Interior Rear Tailgate/Trunk (e.g., trim, spare tire well, door handle, bumper, etc.). Antenna 312-7
8. Near, on, or in Exterior Rear Driver Door (e.g., trim, wheel well, door handle, etc.). Antenna 312-8
9. Near, on, or in Interior Rear Driver Door (e.g., door 142, B-pillar, C-pillar, headliner, floor, etc.). Antenna 312-9
10. Near, on, or in Exterior Rear Passenger Door (e.g., trim, wheel well, door handle, etc.). Antenna 312-10
11. Near, on, or in Interior Rear Passenger Door (e.g., door 142, B-pillar, C-pillar, headliner, floor, etc.). Antenna 312-11

In this system 100, the portable device 110 communicates with a master device 120 located on the interior of the vehicle 500 that is separate from the eleven (11) antennas identified above. As shown in the illustrated embodiment of FIG. 23, this system 100 may be capable of determining at least the following zones: A) inside, B) outside near driver side, C) outside near passenger side, D) outside near tailgate/trunk, E) not near the vehicle 500, but connected, and F) not connected.

Additional zones 400 may be defined, with varying levels of accuracy. For example, another outside zone 400 may be defined outside of the near zones 400, that extends further away from the vehicle 500 (an approach zone 400). The system 100 may also be able to determine position within or outside the vehicle 500—near the driver front door 142, driver rear door 142, passenger front door 142, passenger rear door 142, or trunk. The ability of the system 100 to accurately determine whether or not the device is located within what zone 400 may be limited by the underlying capabilities of the communications medium (e.g., BLE vs. UWB vs. LF).

The eleven (11) antenna system 100 provides a possible advantage over the seven (7) antenna system 100, in that it is able to more accurately determine proximity and differentials relative to each door 142, and at more points over the body of the vehicle 500, providing more robust inside/outside coverage around the shell of the vehicle 500. In a BLE-based system 100, the additional antennas 312 also make this system 100 able to more accurately determine distance from the vehicle 500 in diverse environments. In a BLE-based system 100, the additional antennas 312 also enable the system 100 to overcome some of the challenges other systems have when positioning portable devices that may be inside a person's pocket (front or back).

Similar to the seven (7) antenna system 100, determining in which zone 400 the portable device 110 is located may be accomplished by combining the differential and threshold techniques described within this disclosure. The system 100 may distinguish zone A (inside) from other zones 400 by requiring both a differential between the maximum of the inside antennas 312 (312-2, 312-3, 312-5, 312-7, 312-9, and 312-11) and the maximum of the outside antennas 312 (312-1, 312-4, 312-6, 312-8, and 312-10) to indicate inside (e.g., inside >outside) and the maximum RSSI (or minimum computed distance) amongst a set of antennas 312 (e.g., 312-2, 312-3, 312-5, 312-7, 312-9, and 312-11) to be within a predetermined threshold (or threshold range). In addition to, or alternative to, using a differential between the maximum inside and outside antennas 312, the system 100 may distinguish zone A (inside) from other zones 400 by requiring the differential between certain pairs of antennas 312 (e.g., antennas 312 that generate a virtual boundary 410 of interest) to provide an appropriate indication. For example, the system 100 may utilize the differential between antennas 312-1 and 312-2, 312-4 and 312-5, 312-6 and 312-7, 312-8 and 312-9, and 312-10 and 312-11, to all indicate inside to be located in zone A, or alternatively, may only utilize only one differential on each side of the vehicle 500 to indicate inside to be located in zone A. Which set of differentials to use may be selected based upon the values of other differentials and thresholds that are satisfied (or not); for example, if all of the differentials indicate inside, and the maximum RSSI threshold is within an alternate range of the primary threshold (e.g., just outside the primary threshold range, but within a secondary threshold range), then the system 100 may locate the portable device in zone A, regardless of the primary threshold not being satisfied.

The system 100 may distinguish zones B, C, or D from E by requiring that the maximum RSSI (or minimum computed distance) amongst a set of antennas 312 (e.g., 312-2, 312-3, 312-5, 312-7, 312-9, and 312-11) to be within one or more predetermined threshold ranges (e.g., within a near driver threshold range, within a near passenger threshold range, within a near tailgate threshold range, etc.).

The system 100 may determine the position of the portable device 110 to be in zone E, if the portable device 110 is connected (i.e., is communicating with one or more master devices) and was not determined to be in zones A-D. The system 100 may also determine the position of the portable device 110 to be in zone E, if the portable device 110 is connected and the maximum RSSI (or minimum computed distance) amongst a set of antennas 312 (e.g., 312-2, 312-3, 312-5, 312-7, 312-9, and 312-11) are beyond one or more predetermined threshold ranges (e.g., further than a far threshold range, above a minimum RSSI, etc.).

The system 100 may determine the position of the portable device 110 to be in zone F, if the portable device 110 is not connected.

Similar to the seven (7) sensor system 100, in addition to, or in place of, a single threshold, different mixes of antennas 312 may have different thresholds, and combinations of thresholds, to better handle system edge cases (e.g., the max RSSI of antennas 312-2, 312-3, 312-5, 312-7, 312-9, and 312-11 must be within a near driver threshold range, the max RSSI of antenna 312-1 and 312-8 must be less than X, the max RSSI of antenna 312-1 and 312-2 must be less than Y and the max RSSI of antennas 312-2, 312-3, 312-5, 312-7, 312-9, and 312-11 must be within a Y . . . Z, etc.).

Antenna measurement/approximation error may be expressed as part of the threshold range, or as an additional range applied to each threshold (or threshold range). For example, if the measurement/approximation error is 2 dBm, thresholds (and threshold ranges) may be expressed as −50 dBm+/−2 dBm, −52 dBm, or −48 dBm, −60 dBm to −30 dBm+/−2 dBm, −58 dBm to −28 dBm, −58 dBm to −32 dBm, −62 dBm to −28 dBm, or −62 dBm to −32 dBm, and so on.

Differentials may also have a threshold or threshold range applied (e.g., to be considered inside, [312-2] must be greater than [312-1] by at least X).

Hysteresis (time- or value-based) may also be applied to a differential or threshold (or threshold range), requiring one value (or amount of time in) to enter a zone 400 (e.g., transition from A to B) and another value (or amount of time out) to exit a zone 400 (e.g., transition from B to A). Hysteresis may also be a means to encapsulate measurement error. Hysteresis may also be applied to zone transition decisions themselves (e.g., requiring that multiple positioning iterations result in the same decision before announcing said decision).

Thresholds and threshold ranges may be expressed and evaluated in terms of RSSI (e.g., dB, dBm, etc.), computed distance (e.g., meters), synthetic values (i.e., another value derived at least in part from RSSI), or any combination thereof.

Distances computed from different collections and aggregation methods (e.g., min, max, average, cluster, median, etc.) may use different sets of equations or approaches. For example, distances computed from individual antennas 312 may use equation or approach X, whereas the distance computed from the max of antennas 312-2, 312-3, 312-5, 312-7, 312-9, and 312-11 may use equation or approach Y. As a further example, the driver front outside antenna (312-1), driver rear outside antenna (312-8), and even the max of the driver outside antenna set (312-1 and 312-8) may each have different equations or approaches for computing distance; given multiple distance computations, the determined distance may be selected using a predetermined or dynamic aggregation method (e.g., min, max, average, cluster, median, etc.) (e.g., the minimum of the driver side computed distances may be selected and used as the driver side distance).

The system 100 may distinguish between zones B, C, and D by determining, amongst the set of potential zone thresholds that are satisfied, which zone's representative external antennas 312 (e.g., 312-1 and 312-8 for B, 312-4 and 312-10 for C, 312-6 for D) have the highest RSSI (or lowest computed distance).

In a BLE-based system 100, to better handle scenarios where a portable device 110 is located in a person's pocket (i.e., attenuated by their body), multiple sets of antennas 312 and thresholds may be utilized to determine whether the portable device 110 is or isn't in a near zone 400 (where it may otherwise be determined as not near). Such processing may utilize the system 100 to determine which near zone (B, C, or D) may be selected, regardless of whether the system 100 believes the portable device 110 is within the corresponding (or any) near zone thresholds. If primary threshold ranges used to determine whether or not a portable device 110 is in a particular near zone 400 are not satisfied, but are within a secondary threshold range, and one or more other differentials and/or secondary thresholds (using the same or other antennas 312) are satisfied for a particular near zone 400, the system 100 may select that near zone 400. For example, if the system 100 believes the portable device 110 is on the driver side as determined using the representative external antennas 312, but the maximum RSSI (or minimum computed distance) amongst the set of antennas 312 used to compute distance from the vehicle 500 (e.g., 312-2, 312-3, 312-5, 312-7, 312-9, and 312-11) is not within the primary driver side near threshold, but it is within a secondary driver side near threshold, and the driver side representative external antennas' maximum RSSI (or minimum computed distance, etc.) are within a corresponding near override threshold, the system 100 may determine that the portable device 110 is located in zone B (driver near), as opposed to zone E (not near). Such a determination may also incorporate the differentials of various antenna 312 pairs to provide more confidence (e.g., ensure that both, or at least one of, the driver side antennas 312 indicate outside and that both, or at least one of, the passenger side antennas 312 indicate inside). Such a determination may also incorporate the RSSIs (or computed distances, etc.) from other antennas 312 to provide further confidence (e.g., if near the driver side, the passenger side distance may be within a particular threshold range).

With some underlying communications technologies, RSSI may be quite noisy due to signal blockers and reflectors, such as with BLE, and despite the advanced signal analysis techniques identified in this disclosure, additional (intelligent) filtering may be utilized to prevent unwanted transient zone transitions due to such noise or environment effects between near zones (B, C, and D). Such filtering may include requiring a larger threshold difference to transition from one near zone to another (e.g., utilize a 5 dB RSSI difference between the maximum of the representative external antennas 312 to transition from D to B or C, utilize a 10 dB RSSI difference between the maximum of the representative external antennas 312 to transition from B to C, etc.). Such filtering may also include requiring one or more differentials between certain pairs of antennas 312 (e.g., antennas 312 that generate a virtual boundary 410 of interest) to provide an appropriate indication when transitioning into a near zone 400 and/or from one near zone 400 to another. For example, the system 100 may utilize the differential between 312-1 and 312-2 or 312-8 and 312-9 to indicate outside to transition from E to B, but may utilize the differential between 312-1 and 312-2 and 312-8 and 312-9 to indicate outside and the differential between 312-4 and 312-5 and 312-10 and 312-11 to indicate inside to transition from C to B. In another example, the system 100 may only utilize the differential between 312-1 and 312-2 or 312-8 and 312-9 to indicate outside and the differential between 312-4 and 312-5 or 312-10 and 312-11 to indicate inside when transitioning from C to B when a threshold is not satisfied. In another example, the system 100 may utilize the differential between 312-1 and 312-2 or 312-8 and 312-9 and between 312-4 and 312-5 or 312-10 and 312-11 to indicate inside to transition to D from B or C. These techniques may also be applied to other zone transitions, including inside/outside.

Variance (or noise) in measured RSSI due to reflections, despite its possible disadvantages, may provide a benefit: in systems that operate across multiple frequencies/channels (e.g., BLE), it may be possible to determine that a reflective object (e.g., another vehicle 500) is nearby through analysis of per-frequency/channel RSSI measurements (as described in Section C.9). For example, if a portable device 110 is far away, there may be variation amongst RSSI measurements across the vast majority of channels; however, if a portable device 110 is nearby, there may be substantial agreement amongst RSSI measurements across the vast majority of channels; therefore, in situations where RSSI measurements on only a few channels vary significantly from the others (as determined by one or more thresholds, which may encapsulate measurement/approximation error [described herein]), the system 100 may conclude that a vehicle 500 or other object is near that antenna 312 and adjust thresholds or methods, as appropriate. For example, the system 100 may determine that another vehicle 500 is present near the driver side of the vehicle 500, and alter the thresholds or distance measurement methods used with antennas 312 on that side of the vehicle 500, zone determination criteria, calibration/offsets, any other attribute or method disclosed herein, or any combination thereof. At a minimum, as described previously, said invalid measurements may be filtered.

The system 100 may adjust thresholds, hysteresis, antenna 312 combinations, differentials, combination methods, and/or any other disclosed method, based upon determined background power and/or background noise. For example, if the background power/noise determined to be high, thresholds may be increased.

The system 100 may also adjust thresholds, hysteresis, antenna 312 combinations, differentials, combination methods, and/or any other disclosed method, based upon RSSI measured from transmissions from the system's own antennas 312 (including the master device's one or more antennas 312). For example, if each antenna 312 measures the RSSI of signals transmitted by the master device 120, and said measured RSSI is above a threshold (e.g., a predetermined [normal or open field] baseline, etc.), thresholds may be increased. For example, if one antenna 312 measures the RSSI of signals transmitted by another antenna 312, and said measured RSSI is above a threshold (e.g., a predetermined [normal or open field] baseline, etc.), the system 100 may determine that a large reflective objective is nearby, or conversely, if the measured RSSI is below a threshold, that an object exists between said antennas 312.

In one embodiment, the system 100, when it has determined that a vehicle 500 or object is nearby, such as by observing variance on only a few channels, or by measuring RSSI between antennas 312, as described above, the distance to said vehicle 500 or object may computed using the difference between the measured RSSI and a predetermined [normal or open field] baseline, by using trilateration and/or multilateration, or any other method described herein, or any combination thereof.

Some antennas 312 may be placed in locations that are movable (such a door 142 or tailgate), or placed in locations affected by movable parts of the equipment (vehicle 500), as shown in the figure below. In some cases, movement of the antennas 312 or equipment components does not affect system operation. In other cases, knowledge of the equipment state may provide a means for the system 100 to alter which thresholds, differentials, distance calculation methods, or other computations are performed. In some of those cases, the desired behavior may be the same behavior as though the equipment state had not changed (e.g., when a portable device 110 is placed in the breach of an open door 142, it may be desirable for the system 100 to not indicate that said portable device 110 is inside [zone A] and instead indicate outside [zone B, C, or D, as appropriate]). The desired behavior may also be alternate behavior, for example, if the rear tailgate is open, prevent any transition to inside if the portable device 110 is believed to be located near the tailgate. By using equipment state provided by the vehicle 500, such alterations are possible. By receiving the door ajar status for each door 142, the system 100 may discard, or use alternate, heuristics that incorporate that door's differentials or antennas 312. For example, if the driver door 142 is open, a corresponding inside antenna 312 may be omitted from the set of antennas 312 used to compute vehicle distance. For example, when the portable device 110 is located at the rear driver door 142 on the outside of the vehicle cabin, if the driver front door 142 is closed, a differential may indicate outside, but if the driver door 142 is open, a differential may indicate inside, requiring the use of an additional threshold or comparison of additional differentials to continue to determine the portable device 110 is positioned outside.

With antennas 312 in or near each door 142, and with door open state providing a clue to the potential proximity of the portable device 110, the system 100 may optimize or bias its decisions based upon relative location of the portable device 110 to each door 142. An example of such an arrangement of antennas 312 is shown in the illustrated embodiment of FIGS. 24-27, in which the doors 142 or windows may move leaving one or more openings 143 to the interior space 502 of the vehicle 500.

By receiving the window state for each door 142, alternate signal analysis may be performed or different thresholds may be selected for affected antennas 312. For example, if the vehicle glass is coated with an RF-blocking material, window up or down may significantly alter distance calculations, whereas if it is not, the impact may be minor or negligible. For example, if the windows are closed and the doors 142 are not open, this may adversely affect the ability of a portable device 110 to transition from inside to outside, or outside to inside. Other equipment states may also be incorporated, such as ignition status (which may also be used to substantially prevent or deter making certain zone transitions) and seat sensor status (if there is a body in a seat, it may provide additional data to help position a portable device 110).

The system 100 may, alternately or additionally, determine the zone 400 in which the portable device 110 is located using a trilateration- and/or multilateration-based approach (described herein).

The system 100 may, alternately or additionally, determine distance using a time-of-flight-/time-of-arrival-(TOF/TOA) and/or time-difference-of-arrival (TDOA)-based approach (described herein).

E.1.d Other RSSI-Only Systems

Example embodiments of 3-, 5-, 7-, and 11-antenna systems have been described. A system 100 may be implemented with more or less antennas 312 while still using the identified methods. For example, a system 100 with 12 antennas, an 11-antenna system with an additional antenna 312 in the front of the vehicle 500, that additionally defines a front zone 400. For example, a system 100 with 12 antennas, an 11-antenna system with an additional antenna 312 in the exterior rear of the vehicle 500, that provides assistance in defining the rear zone 400 (e.g., similar to the driver/passenger side exterior antennas 312).

In the case of each embodiment, the system 100 may, alternately or additionally, determine the zone 400 in which the portable device 110 is located using a trilateration- and/or multilateration-based approach (described herein).

In the case of each embodiment, the system 100 may, alternately or additionally, determine distance using a time-of-flight-/time-of-arrival- (TOF/TOA) and/or time-difference-of-arrival (TDOA)-based approach (described herein).

E.2 Inside/Outside Vehicle Microlocation Embodiment with Angle of Arrival

In these systems, angle of arrival is used to position the device relative to the vehicle 500 (e.g., using a heuristic fingerprint, probabilistic heuristics, multiangulation, etc.). Angle of arrival readings are obtained using the sniffing approach, as described herein; however, the embodiments themselves need not utilize a particular architecture to obtain readings. It is noted that angle of departure (AoD) may be used instead of angle of arrival (AoA), as well as any of the angle of arrival/departure methods described herein; however, the disclosures below simply refer to all possible implementations where an angle is used (i.e., AoA and AoD may be used interchangeably, and angle may refer to either methodology).

In one or more of these embodiments, the system 100 may provide, for each reported zone 400, a correctness likelihood indicator (e.g., a confidence score/metric, a likelihood score/metric, probability relative to other reported zones 400 and/or the current zone 400, etc.).

It is noted that these disclosures refer to antennas 312, which, when measuring the angle of a signal, as described herein in this disclosure, may actually be an antenna array. As described herein, any given sensor 310 may be connected to multiple antennas 312 (or antenna arrays), and any given antenna 312 (or antenna array) may be connected to multiple sensors 310.

It is noted that, as described elsewhere, these antennas 312 may provide one or more angle measurements (e.g., horizontal, vertical, or horizontal and vertical angle measurements, etc.). For example, an antenna 312 that reports a vertical angle may provide the system 100 with the ability to estimate the vertical position (e.g., distance to ground) of a portable device 110 relative to a vehicle 500. It is important to note that, although not discussed directly in the RSSI-only descriptions, because virtual boundaries may be defined in 3D space (e.g., using an RSSI differential with an appropriately placed ground plane or other divider [as described herein]), similar to the vertical angle approach described above, the system 100 may also use an RSSI-based differential across multiple antennas 312, with a separating ground plane/divider parallel to the ground, to determine low versus high portable device 110 vertical position (or potentially more vertical positions, with additional antennas 312 and ground planes/dividers).

The angle of arrival based systems described below rely only upon angles. It is noted that while such angle-only systems use only angles to determine zones 400, they may also use RSSI to distinguish between relevant and irrelevant signals (e.g., reflections, signals that are too far away, etc.), whether using thresholds or other signal analysis techniques (e.g., significantly lower than other signals, etc.). Systems that additionally use the prior-described RSSI approaches to determine zones 400 are described herein (as AoA-RSSI systems).

E.2.a Twelve (12) Antenna AoA-Only System

Figure 48:
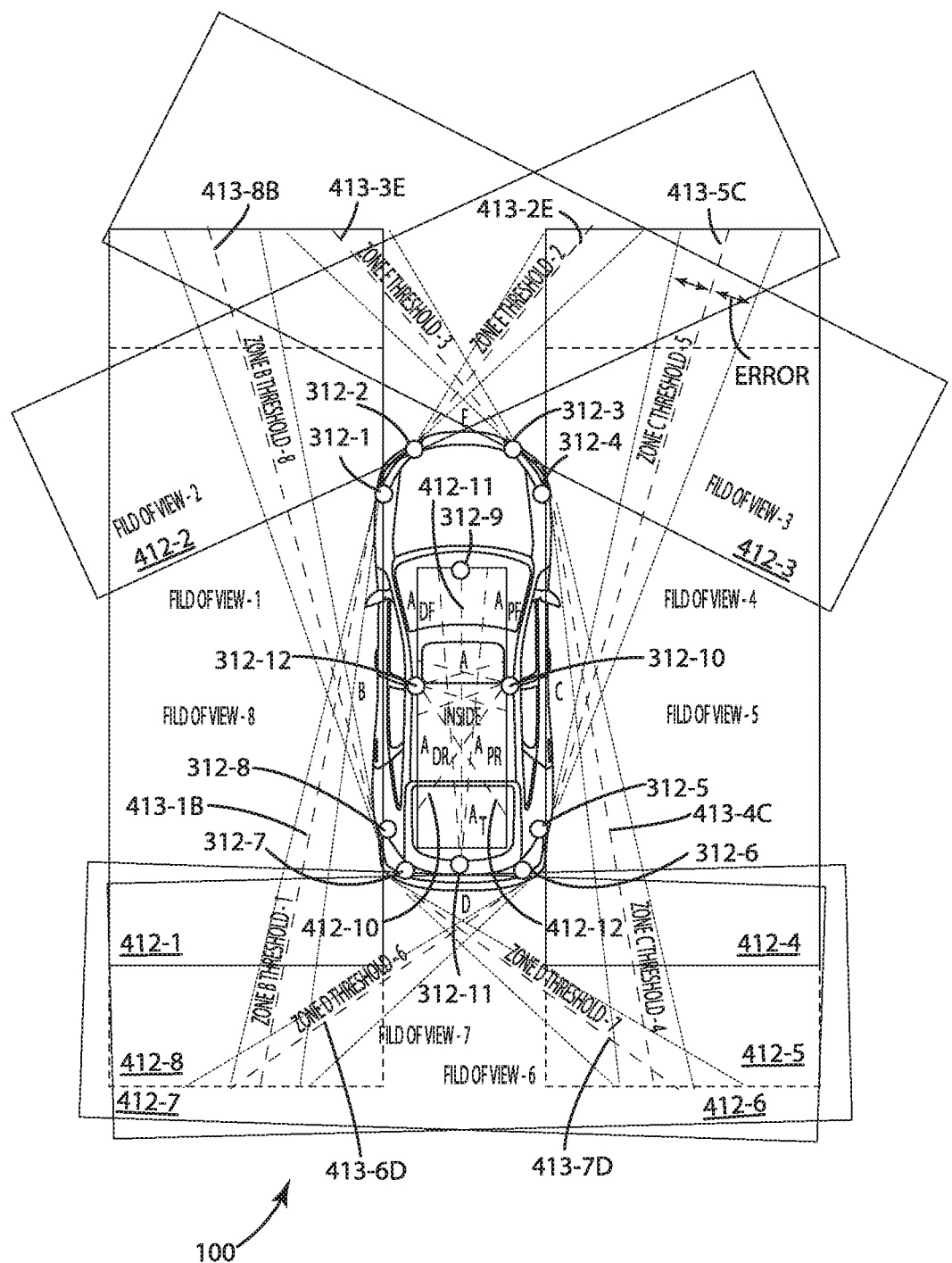
FIG. 48 shows a twelve antenna vehicle microlocation system using angle of arrival in accordance with one embodiment.

In one embodiment of a vehicle microlocation system 100, shown for example in FIG. 48, the system 100 may use angle of arrival (AoA), twelve (12) antennas:

1. Near, on, or in exterior driver side front corner covering driver side (e.g., driver side of driver side headlight assembly, driver side of driver side front quarter panel trim, front driver side wheel well, driver side of front fascia/bumper, driver side mirror, etc.). Antenna 312-1
2. Near, on, or in exterior driver side front corner covering front (e.g., front of driver side headlight assembly, front of driver side quarter panel trim, front driver side of front fascia/bumper, driver side of front grille, etc.). Antenna 312-2
3. Near, on, or in exterior passenger side front corner covering front (e.g., front of passenger side headlight assembly, front of passenger side quarter panel trim, front passenger side of front fascia/bumper, passenger side of front grille, etc.). Antenna 312-3
4. Near, on, or in exterior passenger side front corner covering passenger side (e.g., passenger side of passenger side headlight assembly, passenger side of passenger side front quarter panel trim, front passenger side wheel well, passenger side of front fascia/bumper, passenger side mirror, etc.). Antenna 312-4
5. Near, on, or in exterior passenger side rear corner covering passenger side (e.g., passenger side of passenger side taillight assembly, passenger side of passenger side rear quarter panel trim, rear passenger side wheel well, passenger side of rear fascia/bumper, passenger side rear door handle, passenger side gas tank cover, etc.). Antenna 312-5
6. Near, on, or in exterior passenger side rear corner covering rear (e.g., rear of passenger side taillight assembly, rear of passenger side quarter panel trim, rear passenger side of rear fascia/bumper, etc.). Antenna 312-6
7. Near, on, or in exterior driver side rear corner covering rear (e.g., rear of driver side taillight assembly, rear of driver side quarter panel trim, rear driver side of rear fascia/bumper, etc.). Antenna 312-7
8. Near, on, or in exterior driver side rear corner covering driver side (e.g., driver side of driver side taillight assembly, driver side of driver side rear quarter panel trim, rear driver side wheel well, driver side of rear fascia/bumper, driver side rear door handle, driver side gas tank cover, etc.). Antenna 312-8
9. Near, on, or in interior front center covering interior (e.g., center of dashboard, center stack, arm rest, cup holder, rear-view mirror, center of headliner or roof-mounted glasses-storage container near windshield, etc.). Antenna 312-9
10. Near, on, or in interior passenger side center covering interior (e.g., passenger B-pillar, passenger C-pillar, headliner near passenger B/C-pillar, floor near passenger B/C-pillar, passenger front door 142, passenger rear door 142, back/headrest of front/rear passenger seat, etc.). Antenna 312-10
11. Near, on, or in interior rear center covering interior (e.g., center of headliner near tailgate/trunk or rear window, center of floor near tailgate/trunk or rear window, spare tire well, tailgate/trunk, bumper, etc.). Antenna 312-11
12. Near, on, or in interior driver side center covering interior (e.g., driver B-pillar, driver C-pillar, headliner near driver B/C-pillar, floor near driver B/C-pillar, driver front door 142, driver rear door 142, back/headrest of front/rear driver seat, etc.). Antenna 312-12

In this system 100, the portable device 110 communicates with a master device 120 located on the interior of the vehicle 500 that is separate from the twelve (12) antennas 312 identified above.

In this system 100, as disclosed, it is assumed that the antennas 312 are limited to a 180° field-of-view (e.g., because one side of the antenna 312 is intentionally blocked, to prevent signals from reaching the antenna 312 from that side of the antenna 312 [i.e., the plane of printed circuit board opposite the plane on which the antenna array is placed], or because the vehicle metal blocks the signal to a portion of the antenna 312, etc.); however, alternate embodiments exist wherein antennas 312 with a larger field-of-view (up to 360°) are used. It is noted, that even though the field-of-view for front/rear and side antennas 312 are shown as perpendicular to one another (which may be ideal) in the illustrated embodiment of FIG. 48 packaging locations and/or actual antenna field-of-view may result in the field-of-view for various antennas 312 being at slight angles relative to one another, resulting in either gaps or overlaps.

Horizontal angle measurements are primarily described in this and other system 100 disclosures; however, it is understood that, as previously described, the system 100 (and alternate and/or derived system embodiments) may use either, or both, horizontal and vertical angle measurements (and possibly other angle measurements, such as multiple measurements of each, or measurements on yet another axis).

In this embodiment, as described above, the exterior antennas 312 are located in or near each of the headlights/taillights, as shown in the following figure. There is an alternate embodiment, where antennas 312 are located near the exterior side centers of the vehicle 500 (i.e., grille, driver B-pillar, passenger B-pillar). There are also embodiments where antennas 312 are located in any position between these embodiments (e.g., due to packaging requirements imposed by a particular vehicle 500).

In this embodiment, as described above, the interior antennas 312 are located near the center of each interior side of the vehicle 500 (i.e., driver side, front, passenger side, rear), as shown in the following figure. There is an alternate embodiment, where antennas 312 are located near the interior corners of the vehicle 500 (i.e., driver side front, passenger side front, passenger side rear, driver side rear). There are also embodiments where antennas 312 are located in any position between these embodiments (e.g., due to packaging requirements imposed by a particular vehicle 500).

This system 100 may be capable of determining at least the following zones 400: A) inside, B) outside near driver side, C) outside near passenger side, D) outside near tailgate/trunk, E) outside near front, F) not near the vehicle 500, but connected, and G) not connected.

In addition to A, the system 100 may also determine one or more of the following zones 400: $A_{DF}$ (interior driver front), $A_{PF}$ (interior passenger front), $A_{DR}$ (interior driver rear), $A_{DF}$ (interior passenger rear), $A_T$ (interior trunk).

The above zones 400, along with the field of view 412 of each antenna 312 and example thresholds that may be used to define each zone 400 (with measurement/approximation error markers) are illustrated in the illustrated embodiment of FIG. 48.

Additional zones 400 may be defined, with varying levels of accuracy. For example, another outside zone 400 may be defined outside of the near zones 400, that extends further away from the vehicle 500 (an approach zone 400). Vertical zones 400 may also be defined, also with varying levels of accuracy. For example, low, medium, and high vertical zones 400 may be defined for near zones 400. The ability of the system 100 to accurately determine whether or not the device is located within what zone 400 may be limited by the underlying capabilities of the communications medium (e.g., BLE vs. UWB vs. LF) and accuracy of angle measurement facilities (e.g., measurement/approximation error).

Each antenna's angles and/or thresholds may be defined in any orientation and/or unit; however, in this disclosure, angles and thresholds are expressed in degrees (e.g., versus radians). For example, in this disclosure, it is assumed that for all horizontal angle measurements, 0° (and 360°) is towards the front of the vehicle 500 and 90° is towards the passenger side, and for all vertical angle measurements, 0° is parallel to the ground, +90° is towards the sky (i.e., up), and −90° is towards the ground (i.e., down). Alternatively, for example, for antenna 312-12, 0° may be towards the front of the vehicle 500 and 90° may be towards the passenger side, whereas for antenna 312-10, 90° may be towards the driver side. The orientation of each antenna 312 is assumed to be fixed (predetermined) relative to the vehicle 500. There exist alternate embodiments wherein antenna 312 orientation is not fixed, such as when an antenna 312 is placed on a movable part of the vehicle 500, in which case, the antenna 312 orientation may be determined dynamically.

The system 100 may distinguish zone A (inside) from other zones 400 by requiring the angles measured from each interior antenna 312 (312-9 through 312-12) to be within a predetermined threshold (or threshold range). The system 100 may additionally utilize, to determine zone A, that exterior antennas (312 through 312-8) be not receiving (or not consistently receiving) signals (or valid signals [e.g., reflected signals may be deemed invalid, a measured angle may vary too significantly from prior measurements, etc.]) from the portable device 110, be not measuring consistent angles (i.e., that if exterior antennas 312 are measuring signals, that said measurements vary significantly [perhaps indicating that received measurements are due to reflections or from far away]), be within (or outside) a predetermined threshold (or threshold range), or any combination thereof.

The system 100, when it has determined that the portable device 110 is in zone A (inside), may determine whether the portable device 110 is located in zone $A_{DF}$, $A_{PF}$, $A_{DR}$, $A_{PR}$, or $A_T$ by requiring that angles measured from combinations of interior antennas (312-9 through 312-12) be within predetermined thresholds (or threshold ranges). For example, it may be determined that the portable device 110 is located in zone $A_{DF}$, when antenna 312-9 measures the angle to be in range 180° to 270°, antenna 312-10 measures the angle to be within 270° to 0°, antenna 312-11 measures the angle to be in range 180° to 270°, and antenna 312-12 measures the angle to be in range 0° to 90°. The system 100 may alternatively determine zone $A_{DF}$, given that it was determined that the portable device 110 is in zone A, by using only two antennas 312: antenna 312-9 or 312-11 along with antenna 312-10 or 312-12; zones $A_{PF}$, $A_{DR}$, and $A_{PR}$ may be determined in a similar manner. For example, it may be determined that the portable device 110 is located in zone $A_T$, when antenna 312-9 measures the angle to be in range 90° to 270°, antenna 312-10 measures the angle to be within 180° to 225°, antenna 312-11 measures the angle to be in range 90° to 270°, and antenna 312-12 measures the angle to be in range 135° to 180°. The system 100 may alternatively determine zone $A_T$, given that it was determined that the portable device 110 is in zone A, by using only antennas 312-10 and 312-12. For example, with regard to zone $A_T$ determination, additional confidence may be provided by further restricting the threshold for antenna 312-9 (e.g., to utilize the measured angle to be within 155° to 205°).

When a zone 400 may be computed with varying numbers of antennas 312 (e.g., with varying levels of confidence), multiple thresholds may be utilized to determine which antennas 312 to use. For example, the system 100 may normally determine $A_{DF}$ using all four internal antennas 312 (312-9 through 312-12), as described above, but may only utilize two internal antennas 312 (as described above), when zone A is already determined, antenna 312-12 measures the angle to be in range 30° to 60°, and antenna 312-9 measures the angle to be in range 210° to 240°. For example, if the vertical position of a portable device 110 is determined to be low, one set of antennas 312 and/or thresholds may be used, and if the vertical position is determined to be high, another set of antennas 312 and/or thresholds may be used.

The system 100 may distinguish zones B-E from F by applying an approach similar to that as used to determine zones A, $A_{DF}$, $A_{PF}$, $A_{DR}$, $A_{PR}$, and/or $A_T$. Zones B-E may be determined by requiring that angles measured from combinations of exterior antennas (312-1 through 312-8) be within predetermined thresholds (or threshold ranges). For example, it may be determined that the portable device 110 is located in zone B, when antenna 312-1 measures the angle to be in range 180° to 210° and antenna 312-8 measures the angle to be within 330° to 0°.

The system 100 may additionally utilize, to determine a particular zone B-E, that any combination of other exterior antennas (312-1 through 312-8) be not receiving (or not consistently receiving) signals (or valid signals [e.g., reflected signals may be deemed invalid, a measured angle may vary too significantly from prior measurements, etc.]) from the portable device 110, be not measuring consistent angles (i.e., that if exterior antennas 312 are measuring signals, that said measurements vary significantly [perhaps indicating that received measurements are due to reflections or from far away]), be within (or outside) a predetermined threshold (or threshold range), or any combination thereof. For example, it may be determined that the portable device 110 is located in zone B, when antenna 312-1 measures the angle to be in range 180° to 210°, antenna 312-8 measures the angle to be within 330° to 0°, antenna 312-2 does not receive signals from the portable device 110 or measures the angle to be in its field of view 412 in the front of the vehicle 500 (e.g., 315° to 45°, 0° to 90°, etc.), antenna 312-7 does not receive signals from the portable device 110 or measures the angle to be in its field of view 412 in the rear of the vehicle 500 (e.g., 230° to 95°, 180° to 90°, etc.), and other exterior antennas 312 do not receive signals, or do not measure consistent angles, from the portable device 110. Such additional constraints may be utilized to determine a particular zone 400, or may be used as a means to provide additional confidence.

The system 100 may additionally utilize, to determine a particular zone B-E, any combination of interior antennas (312-9 through 312-12) be not receiving (or not consistently receiving) signals (or valid signals [e.g., reflected signals may be deemed invalid, a measured angle may vary too significantly from prior measurements, etc.]) from the portable device 110, be not measuring consistent angles (i.e., that if exterior antennas 312 are measuring signals, that said measurements vary significantly [perhaps indicating that received measurements are due to reflections or from far away]), be within (or outside) a predetermined threshold (or threshold range), or any combination thereof. For example, it may be determined that the portable device 110 is located in zone B, when antenna 312-1 measures the angle to be in range 180° to 210°, antenna 312-8 measures the angle to be within 330° to 0°, antenna 312-9 measures the angle to be within 270° to 225°, antenna 312-10 measures the angle to be within 225° to 315°, antenna 312-11 measures the angle to be within 270° to 315°. Alternatively, the system 100 may additionally utilize antenna 312-12 to not be receiving signals, or to not be measuring angles consistently, from the portable device 110. Alternatively, the system 100 may use only antenna 312-10 (ignoring antennas 312-9, 312-11, and 312-12). Such additional constraints may be utilized to determine a particular zone 400, or may be used as a means to provide additional confidence.

Similar to interior zones 400, when a zone 400 may be computed with varying numbers of antennas 312 (e.g., with varying levels of confidence), multiple thresholds may be utilized to determine which antennas 312 to use. For example, the system 100 may determine B using four external antennas 312 (e.g., 312-1, 312-2, 312-7, and 312-8), as described above, but may only utilize two antennas 312 (e.g., 312-1 and 312-8), as described above, when antenna 312-1 measures the angle to be in range 180° to 200°, and antenna 312-8 measures the angle to be in range 340° to 0°. Alternatively, the system 100 may determine B using two antennas (312-1 and 312-8), when other antennas 312 do not receive signals, or do not measure consistent angles, from the portable device 110, and may utilize more antennas 312 (e.g., 312-1, 312-2, 312-7, and 312-8) when signals are being received from antennas 312 other than 312-1 and 312-8. Alternatively, the system 100 may determine B using three antennas 312 (312-1, 312-8, and 312-10), when other antennas 312 do not receive signals, or do not measure consistent angles, from the portable device 110, and may utilize more antennas 312 (e.g., 312-1, 312-8, 312-9, 312-10, and 312-11) when signals are being received from external antennas 312 other than 312-1 and 312-8. For example, if the vertical position of a portable device 110 is determined to be low, one set of antennas 312 and/or thresholds may be used, and if the vertical position is determined to be high, another set of antennas 312 and/or thresholds may be used.

Examples above are provided relative to zone B; zones C-E may be determined in a similar manner. Absence from one zone 400 may provide confidence in the determination of another zone 400 (e.g., absence from zone C may provide additional confidence in the presence in zone B). For example, if the portable device 110 is not determined to be in zone A, then there is greater confidence that it is located in another zone 400.

Unlike RSSI-based systems, angle-only-based systems do not compute distance directly; instead, presence within zones 400 defined by larger or alternate thresholds may be used to determine the presence in zones 400 defined further from zones B-E (e.g., approach and/or welcome zones 400). Distance may be determined using any number of approaches once a zone 400 has been determined, such as by estimating the distance from the centroid of a zone 400 to the center of a vehicle 500 (or any other reference point), by estimating the distance from a particular edge of a zone to the center of the vehicle 500, etc. Distance may also be determined by estimating the distance to the center of the vehicle 500 (or any other reference point) from the computed position when using a multiangulation-based positioning approach (described herein).

The system 100 may determine the position of the portable device 110 to be in zone F, if the portable device 110 is connected (i.e., is communicating with one or more master devices) and was not determined to be in zones A-E. The system 100 may also determine the position of the portable device 110 to be in zone F, if any combination of antennas 312 (e.g., all, all exterior, all interior, etc.) are not receiving (or are not consistently receiving) signals (or valid signals [e.g., reflected signals may be deemed invalid, a measured angle may vary too significantly from prior measurements, etc.]) from the portable device 110, are not measuring consistent angles (i.e., that if exterior antennas 312 are measuring signals, that said measurements vary significantly [perhaps indicating that received measurements are due to reflections or from far away]), are within (or outside) any defined zone F thresholds (or threshold ranges), or any combination thereof.

The system 100 may determine the position of the portable device 110 to be in zone G, if the portable device 110 is not connected.

In addition to, or in place of, a single threshold, different mixes of antennas 312 may have different thresholds, and combinations of thresholds, to better handle system edge cases (e.g., when determining zone B, the thresholds used when using antennas 312-1 and 312-8 may be different from the thresholds used when using antennas 312-1, 312-2, 312-7, and 312-8, or 312-1, 312-8, and 312-10, etc.).

Each antenna 312 has a measurement (approximation) error that may be expressed in degrees (i.e., the antenna 312 approximates the angle of the signal, which may vary from the actual angle by an approximation error). In a typical angle of arrival system, measurement error may be 10° or 20°. In a coarse angle of arrival system, such as an angle of arrival antenna array is formed by using an RSSI-based differential antenna pair, measurement error may be 45° or 90°. The antenna measurement/approximation error may be different for vertical and horizontal measurements (and additional measurements).

Antenna measurement/approximation error may be expressed as part of the threshold range, or as an additional range applied to each threshold (or threshold range). For example, if the measurement/approximation error is 10°, thresholds (and threshold ranges) may be expressed as 90°+/−10°, 80°, or 100°, 10° to 170°+/−10°, 0° to 160°, 0° to 180°, 20° to 160°, or 20° to 180°, and so on.

Hysteresis (time- or value-based) may also be applied to thresholds (or threshold ranges), requiring one value (or amount of time in) to enter a zone 400 (e.g., transition from A to B) and another value (or amount of time out) to exit a zone 400 (e.g., transition from B to A). Hysteresis may also be a means to encapsulate measurement/approximation error. Hysteresis may also be applied to zone 400 transition decisions themselves (e.g., requiring that multiple positioning iterations result in the same decision before announcing said decision).

With some underlying communications technologies, measured angles may be quite noisy due to signal blockers and reflectors, such as with BLE, and despite the advanced signal analysis techniques identified in this disclosure, additional (intelligent) filtering may be utilized to prevent unwanted transient zone transitions due to such noise or environment effects. Due to such reflections, it may be problematic to rely upon the absence of measurements from a particular antenna 312 as part of a set of constraints to determine a particular zone 400. As a result, and as described herein in this disclosure, invalid measurements may be ignored (e.g., reflected signals [as determined by comparing RSSI or other mechanisms/algorithms], too much variance from prior measurements, etc.]), or antennas 312 that have inconsistent measurements may be ignored or treated similarly to those as not receiving signals, to help mitigate such problems. Even with such filtering, such angle-only-based system (i.e., a system that does not use RSSI differentials/ thresholds/and/or distances to determine zones 400) are vulnerable to reflections.

Variance (or noise) in measured angles due to reflections, despite its possible disadvantages, may provide a benefit: in systems that operate across multiple frequencies/channels (e.g., BLE), it may be possible to determine that a reflective object (e.g., another vehicle 500) is nearby through analysis of per-frequency/channel angle measurements (as described in Section C.9). For example, if a portable device 110 is not within the field of view 412 of the antenna 312, or far away, there may be variation amongst angle measurements across the vast majority of channels; however, if a portable device 110 is within the field of view 412 of the antenna 312, and nearby, there may be substantial agreement amongst angle measurements across the vast majority of channels; therefore, in situations where angle measurements on only a few channels vary significantly from the others (as determined by one or more thresholds, which may encapsulate measurement/approximation error [described herein]), the system 100 may conclude that a vehicle 500 or other object is near that antenna 312 and adjust thresholds or methods, as appropriate. For example, the system 100 may determine that another vehicle 500 is present near the driver side of the vehicle 500, and alter the thresholds or distance measurement methods used with antennas 312 on that side of the vehicle 500, zone determination criteria, calibration/offsets, any other attribute or method disclosed herein, or any combination thereof. At a minimum, as described previously, said invalid measurements may be filtered.

The system 100 may adjust thresholds, hysteresis, antenna 312 combinations, differentials, combination methods, and/ or any other disclosed method, based upon determined background power and/or background noise. For example, if the background power/noise determined to be high, thresholds may be tightened or relaxed.

The system 100 may also adjust thresholds, hysteresis, antenna 312 combinations, differentials, combination methods, and/or any other disclosed method, based upon angles measured from transmissions from the system's own antennas 312 (including the master device's one or more antennas 312). For example, if each antenna 312 measures the angle of signals transmitted by the master device 120, and said measured angle is within or outside a threshold range (e.g., a predetermined [normal or open field] baseline, etc.), thresholds may be tightened or relaxed (or be determined unusable). For example, if one antenna 312 measures the angle of signals transmitted by another antenna 312, and said measured angle is within or outside a threshold range (e.g., a predetermined [normal or open field] baseline, etc.), the system 100 may determine that a large reflective objective is nearby.

In one embodiment, the system 100, when it has determined that a vehicle 500 or object is nearby, such as by observing variance on only a few channels, as described above, the distance to said vehicle 500 or object may computed using multiangulation (e.g., triangulation).

Some antennas 312 may be placed in locations that are movable (such as moveable headlights, taillights, doors 142, tailgates/trunks, etc.), or placed in locations affected by movable parts of the equipment (vehicle 500), as shown in the figure below. In some cases, movement of the antennas 312 or equipment components does not affect system operation. In other cases, knowledge of the equipment state may provide a means for the system 100 to alter which thresholds or other computations are performed. In some of those cases, the desired behavior may be the same behavior as though the equipment state had not changed (e.g., when a portable device 110 is placed in the breach of an open door 142, it may be desirable for the system 100 to not indicate that said portable device 110 is inside [zone A] and instead indicate outside [zone B-E, as appropriate]). The desired behavior may also be alternate behavior, for example, if the rear tailgate is open, preventing any transition to inside if the portable device 110 is believed to be located near the tailgate. By using equipment state provided by the vehicle 500, such alterations are possible. By receiving the door ajar status for each door 142 on which antennas 312 are placed, the system 100 may discard, or use alternate heuristics or thresholds, when said antennas 312 are utilized. For example, when the portable device 110 is located at the rear driver door 142 on the outside of the vehicle cabin, if an antenna 312 is located on the driver front door 142, and the driver front door 142 is closed, that antenna 312 may indicate outside, but if the driver door 142 is open, an antenna 312 may indicate inside, requiring the use of an additional threshold or comparison of additional or alternate thresholds and antennas 312 to continue to determine the portable device 110 is positioned outside. In an alternate example, when the portable device 110 is located at the rear driver door 142 on the outside of the vehicle cabin, if an antenna 312 is located on a non-moving part of the equipment, and the driver front door 142 is closed, that antenna 312 may indicate outside, but if the driver door 142 is open, it may block the path at certain angles (creating a gap), or provide a direct reflection path to another antenna 312, requiring the use of an additional threshold or comparison of additional or alternate thresholds and antennas 312 to continue to determine the portable device 110 is positioned outside.

With door open state providing a clue to the potential proximity of the portable device 110, the system 100 may optimize or bias its decisions based upon relative location of the portable device 110 to each door 142. By receiving the window state for each door 142, alternate signal analysis may be performed or different heuristics used. For example, if the windows are closed and the doors 142 are not open, this may adversely affect the ability of a portable device 110 to transition from inside to outside, or outside to inside. Other equipment states may also be incorporated, such as ignition status (which may also be used to substantially prevent or deter making certain zone transitions) and seat sensor status (if there is a body in a seat, it may provide additional data to help position a portable device 110). An example of such an arrangement of antennas 312 and states is depicted in the illustrated embodiment of FIGS. 28-31.

The system 100 may, alternately or additionally, determine the zone 400 in which the portable device 110 is located using a multiangulation-based approach (described herein).

The system 100 may, alternately or additionally, determine distance using a time-of-flight-/time-of-arrival-(TOF/TOA) and/or time-difference-of-arrival (TDOA)-based approach (described herein).

E.2.b Other AoA-Only Systems

An example embodiment of a twelve (12) antenna system has been described. It is possible to implement systems using more or less antennas 312 while still using the identified methods. For example:

Twelve (12) antenna systems with different placements from the described system.

Ten (10) antenna systems, with six (6) external and four (4) internal antennas 312, that may be limited in their ability to determine front and rear near zones 400.

Eight (8) antenna systems, with four (4) external and four (4) internal antennas 312, that may be more limited in their ability to determine outside near zones 400.

Eight (8) antenna systems without any internal antennas 312 that may not provide an inside determination, but provide outside zones 400.

Four (4) antenna systems without any external antennas 312 that may provide only inside determinations, or that rely upon inside antennas 312 to determine outside zones 400.

Sixteen (16) antenna systems that provide many very precise zones 400.

And so on.

In the illustrated embodiments of FIGS. 31-43 and 67, some of the possible alternate inside and outside antenna configurations are shown; these configurations, or other configurations not shown, may be combined to produce angle-based systems of varying characteristics (e.g., precision/accuracy, number of possible zones 400, redundancy, 2D versus 3D coverage, etc.).

In the case of each embodiment, the system 100 may, alternately or additionally, determine the zone 400 in which the portable device 110 is located using a multiangulation-based approach (described herein).

In the case of each embodiment, the system 100 may, alternately or additionally, determine distance using a time-of-flight-/time-of-arrival- (TOF/TOA) and/or time-difference-of-arrival (TDOA)-based approach (described herein).

E.3 Inside/Outside Vehicle Microlocation Embodiment with Angle of Arrival and RSSI In these systems (subsequently referred to as AoA-RSSI systems), RSSI and/or angle of arrival may be used to position the device relative to the vehicle 500 (e.g., using a heuristic fingerprint, probabilistic heuristics, trilateration, multilateration, multiangulation, multiangulateration, etc.). RSSI and angle of arrival readings may be obtained using the sniffing approach, as described herein; however, the embodiments themselves need not utilize a particular architecture to obtain readings. It is noted that angle of departure (AoD) may be used instead of angle of arrival (AoA), as well as any of the angle of arrival/departure methods described herein; however, the disclosures below simply refer to all possible implementations where an angle is used (i.e., AoA and AoD may be used interchangeably, and angle may refer to either methodology).

In one or more of the embodiments described herein, the system 100 may provide, for each reported zone 400, a correctness likelihood indicator (e.g., a confidence score/metric, a likelihood score/metric, probability relative to other reported zones 400 and/or the current zone 400, etc.).

It is noted that these disclosures refer to antennas 312, which, when measuring the angle of a signal, as described herein in this disclosure, may actually be an antenna array. As described herein, any given sensor 310 may be connected to multiple antennas 312 (or antenna arrays), and any given antenna 312 (or antenna array) may be connected to multiple sensors 310.

It is noted that, as described elsewhere, said antennas 312 may provide one or more angle measurements (e.g., horizontal, vertical, or horizontal and vertical angle measurements, etc.). For example, an antenna 312 that reports a vertical angle may provide the system 100 with the ability to estimate the vertical position (e.g., distance to ground) of a portable device 110 relative to a vehicle 500.

It is noted that, as described herein, angle-measuring sensors may use RSSI to distinguish between relevant and irrelevant signals (e.g., reflections, signals that are too far away, etc.), whether using thresholds or other signal analysis techniques (e.g., significantly lower than other signals, etc.).

Sensors 310 may report (i.e., measure and make available to other sensors 310 for use) angle, RSSI, a differential (RSSI or angle), or any combination thereof. AoA-RSSI systems may be composed of any combination of sensor types (e.g., sensors 310 that report only angle, sensors 310 that report only RSSI, sensors 310 that report both, etc.). For example, a system 100 may be composed of some number of sensors 310 that report angles and some number of sensors 310 that report RSSI. Alternatively, for example, a system 100 may be composed entirely of sensors 310 that both report angle and RSSI. Sensors that report both angle and RSSI may do so using a single antenna 312 (measuring both angle and RSSI using one antenna 312 [i.e., antenna array]), using multiple antennas 312 (e.g., measuring RSSI using one antenna and measuring angle using another, separate antenna array), or any combination thereof. The appropriate combination of sensors 310 (and antennas 312), along with their design and specifications (e.g., measurement/approximation error, sensitivity, size, communications mediums, etc.) for a particular AoA-RSSI system depends upon its application and cost/performance requirements.

It is noted that distance may be computed from RSSI or angle (via multiangulation); therefore, wherever distance is used, RSSI or angle (or any other unit/derivation of RSSI or angle) may be substituted and/or added; likewise, wherever RSSI or angle (or any other unit/derivation of RSSI or angle) is used, distance may be substituted and/or added. There exist methods where distance is determined without relying upon RSSI or angle, such as via time-of-flight/time-of-arrival (TOF/TOA) and time-difference-of-arrival (TDOA); the usage of RSSI, angle, and/or distance in this disclosure is not intended to limit or prevent the usage of TOF, TDOA, or alternate methods, and as such, wherever distance, RSSI, and/or angle is used in reference to distance measurement/evaluation, distance may refer to distance computed by such alternate methods, and RSSI or angle may be substituted with the source measurement (e.g., time, delta time, etc.).

In an AoA-RSSI system, related (correlated) angle and distance measurements (e.g., angle and RSSI measurements from the same position) may be referred to as <angle, distance> pairs, which may be provided, as described above, via one sensor 310 using one or more antennas 312 (e.g., from a sensor 310 with one antenna array 312 that provides both angle and distance, from a sensor 310 with an antenna array 312 that provides angle and another antenna 312 that provides distance, from a sensor 310 with multiple antenna arrays 312 that provides multiple <angle, distance> pairs, etc.), via multiple sensors 310 using one or more antennas 312 (e.g., one sensor 310 may provide angle and another nearby sensor 310 may provide distance, etc.), or any combination thereof. It is noted, that as described herein, <angle> may be an angle relative to a horizontal axis, a vertical axis, or any other axis, or in-fact, multiple angle measurements (e.g., <$angle_H$, $angle_V$> from both horizontal and vertical axes). Any given sensor 310 may report multiple <angle, distance> pairs (e.g., one sensor 310 may be connected to multiple antennas 312, with each antenna 312 located with different fields of view and/or in different positions on the equipment [e.g., inside and outside], etc.). In an AoA-RSSI system using the sniffing approach described herein, <angle, distance> pairs may be obtained from the same signal transmission across many antennas 312 and thus may be additionally temporally-, frequency-, and spatially-correlated. The <distance> component may include a distance relative to the portable device 110 (absolute or delta), a distance relative to one or more other antennas 312/sensors 310 (e.g., delta distances, similar to a delta-based multilateration approach), or any combination thereof. Similarly, the <angle> component may include one or more angles relative to the portable device 110 (absolute or delta), one or more angles relative to one or more other antennas 312/sensors 310 (e.g., delta angles, similar to a delta-based multilateration approach), or any combination thereof. In the provided example embodiments, antenna 312/sensor 310 position (and corresponding position information) is fixed (static); however, alternate embodiments exist where antenna 312/sensor 310 position may be partially dynamic (i.e., may move from one position to some number of other positions based upon equipment state [e.g., an antenna 312/sensor 310 on a door 142, etc.]) or fully dynamic (i.e., corresponding position information is determined in real-time [e.g., by alternate systems/methods, by using other fixed antennas 312/sensors 310, etc.]).

Both RSSI- and angle-based systems, and the techniques used within them to position devices within zones 400, have been described. Individually, each of these systems, when using the methods/techniques described in this disclosure, perform amazingly well, each with various possible advantages (strengths) and possible disadvantages (weaknesses). Because RSSI- and AoA-based systems operate on different data (RSSI vs. angle), they have different failure modes (and some of the same failure modes, but that occur in different scenarios). To provide improved performance and robustness, particularly in systems that operate using communications mediums that are susceptible to reflections and attenuations from common objects (like metal and water), such as BLE, RSSI-based and angle-based techniques may be combined in a way that takes possible advantage of the differences in the systems' failure modes.

The disclosed RSSI and AoA systems and/or techniques may be combined, to take possible advantage of their strengths and the differences in their failure modes, using the methods and techniques subsequently disclosed herein, resulting in AoA-RSSI systems that may provide improved performance and robustness, as compared to RSSI-only and angle-only systems, while also mitigating failure modes that neither system 100 may individually overcome. For example, systems that operate using BLE are susceptible to signal reflections and attenuations from common objects (e.g., metal, water, human bodies, wood, etc.), and thus, may incorrectly determine a device is positioned within, or not within, a particular zone 400, as a result of said signal reflections and/or attenuations.

AoA-RSSI systems may use RSSI and AoA techniques in any combination at any given time: AoA-RSSI systems may incorporate both RSSI and AoA techniques for all zone decisions or they may only incorporate both RSSI and AoA techniques in certain situations and/or zone decisions, using only RSSI or AoA techniques in other situations and/or zone decisions (e.g., a system 100 may use RSSI and AoA to determine a certain set of outside zones 400 and use only RSSI to determine whether a device is in an inside zone 400).

As described above, RSSI-only and angle-only systems may each have different failure modes. Signal reflections and blockers may affect RSSI and angle differently (for each transmitter/receiver orientation, as well as for each channel/frequency, in RF-based systems, such as BLE).

For example, RSSI may be stronger or weaker due to reflections or blockers that enable or disable propagation paths to antennas 312 from a particular location that normally may be disabled or enabled, respectively (e.g., if a portable device 110 is two meters from the rear of a vehicle 500, the maximum RSSI of the inside antennas 312 may be significantly higher when the vehicle 500 is located within a commercial garage with a metal roof, than it is when it is located within a residential garage, than it is when it is located in an open field; if a person is located between a portable device 110 and an antenna 312, the RSSI measurements of signals from said portable device 110 to said antenna 312 may be significantly lower than without a person located between them; if a vehicle 500 is parked amongst other vehicles 500, the nearby vehicles 500 may produce reflections that cause the maximum RSSI of the inside antennas 312 to be higher than normal at a particular distance; etc.).

The RSSI differential technique, when used with the sniffing architecture as described herein, is substantially immune to reflections/blockers; however, RSSI-based distance calculations and RSSIs (i.e., not differentials) may be vulnerable to reflections/blockers (which is where angles may provide some assistance).

As another example, angle measurements may be erratic due to reflections, as the angles of reflections may be measured, instead of the angles of direct signals from the portable device 110 (e.g., due to constructive/destructive interference [fast fading], if a vehicle 500 is parked on the driver side of a vehicle 500, and the portable device 110 is located on the driver side of said vehicle 500, antennas 312 may measure the angle of the signal reflected off the nearby parked vehicle 500, as opposed to not receiving said signal, etc.).

Angle measurements are not made stronger or weaker due to reflections (they are instead made more reliable by being within the field of view 412 of an antenna 312); as disclosed herein, angle of arrival techniques to filter invalid measurements are employed, and when using the sniffing architecture, may be filtered over and correlated with all available channels/frequencies and other antennas 312/sensors 310. Coupled with RSSI information obtained and filtered using the sniffing architecture may also provide additional insight into the validity of various signal measurements.

By combining angle of arrival with the RSSI techniques disclosed to bound zones 400, an AoA-RSSI system may provide higher near zone determination accuracy, as well as resilience against situations where the device is actually outside the zone 400, but appears to be within the zone 400, or appears to be outside the zone 400, but is actually inside the zone 400, due to reflections. These failure mode differences, as well as others, may be exploited for all zones 400—inside, outside, near, far, distance-based, or differential-based.

The following sections describe embodiments of a number of possible AoA-RSSI systems and their methods. It is noted that AoA-RSSI systems may use the previously described RSSI- and angle-based methods, the combined methods described below, time-of-flight (TOF), time-difference-of-arrival (TDOA), trilateration, multilateration, multiangulation, multiangulateration, or any combination thereof. It is also noted that said systems may integrate the results of positioning methods (within one method or to integrate the results of multiple methods) using any combination of disclosed methods, including, but not limited to, the subsequently disclosed combination methods, Kalman filters, particle filters, probabilistic estimation/filters, fingerprinting, and heuristics.

E.3.a Twenty-Three (23) Antenna AoA-RSSI System (12 AoA+11 RSSI)

Figure 49:
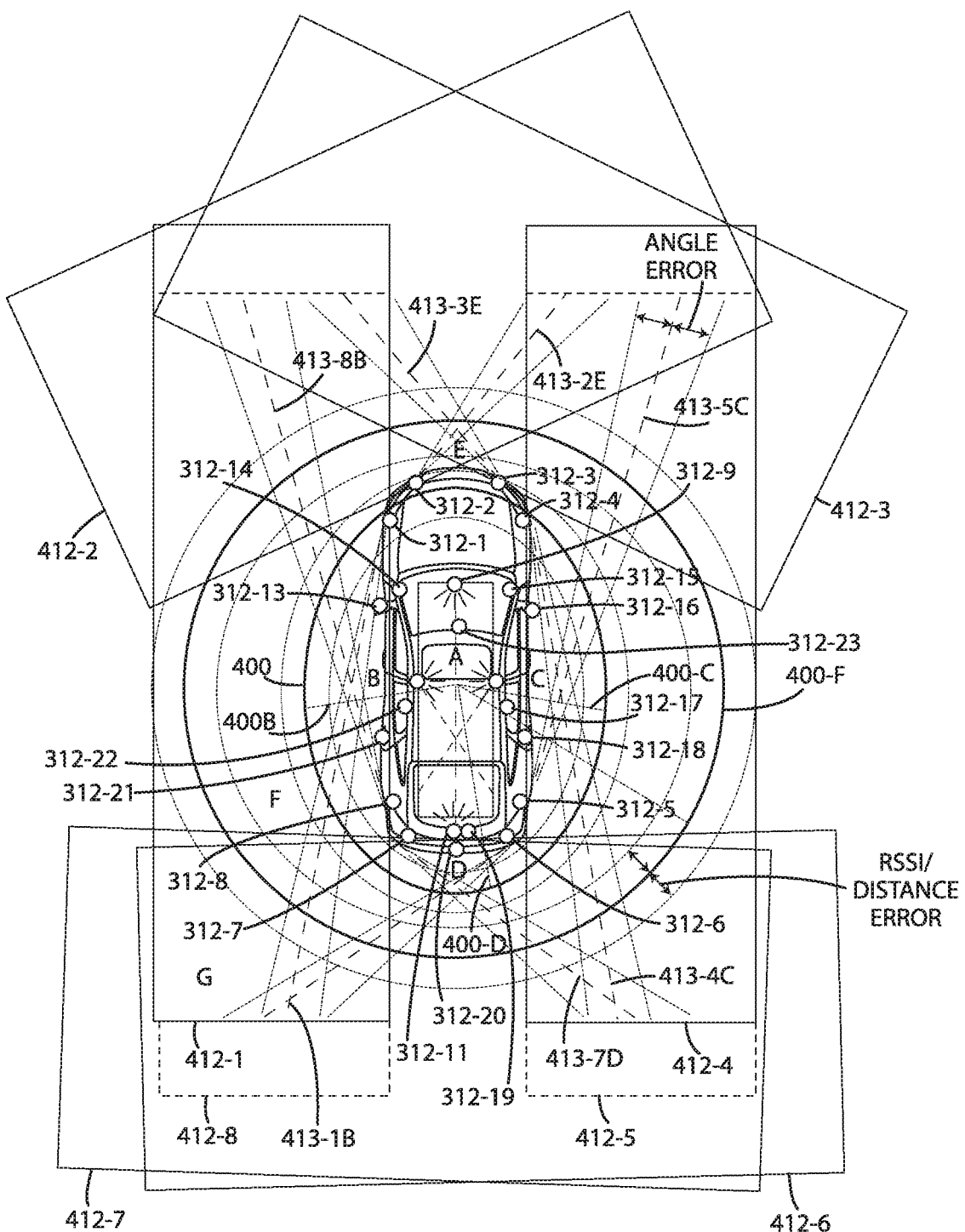
FIG. 49 depicts a twenty-three antenna vehicle microlocation system using angle of arrival and RSSI in accordance with one embodiment.

In one embodiment of a vehicle microlocation system 100, shown for example in FIG. 49, the system 100 may use angle of arrival (AoA) and RSSI. The system 100 may include twenty-three (23) antennas 312. In this system 100, the twelve (12) antenna AoA system (as described in Section E.2.a, antennas 312-1 through 312-12) and eleven (11) antenna RSSI system (as described in Section E.1.c, antennas 312-13 through 312-23) are combined, using the antennas 312 (RSSI-only and angle-only) and antenna placements previously described for each respective system 100. It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

In this system 100, the portable device 110 communicates with a master device 120 located on the interior of the vehicle 500 that is separate from the twenty-three (23) antennas 312 identified above.

This system 100 may be capable of determining at least the following zones 400: A) inside, B) outside near driver side, C) outside near passenger side, D) outside near tailgate/trunk, E) outside near front, F) not near the vehicle 500, but within one or more secondary thresholds, G) not near the vehicle 500, but connected, and H) not connected.
In addition to A, the system 100 may also determine one or more of the following zones 400: $A_{DF}$ (interior driver front), $A_{PF}$ (interior passenger front), $A_{DR}$ (interior driver rear), $A_{DF}$ (interior passenger rear), $A_T$ (interior trunk).

The above zones 400, along with the field of view 412 of each AoA antenna 312, and example thresholds that may be used to define zones 400 for both AoA and RSSI antennas 312 (with measurement/approximation error markers), are depicted in the illustrated embodiment of FIG. 49.

Additional (or fewer) zones 400 may be defined, with varying levels of accuracy. For example, another outside zone 400 may be defined outside of the near zones 400, that extends further away from the vehicle 500, zone F may not exist, or additional near zones 400 at various angles may be defined. Vertical zones 400 may also be defined, also with varying levels of accuracy. For example, low, medium, and high vertical zones 400 may be defined for near zones 400. The ability of the system 100 to accurately determine whether or not the device is located within what zone 400 may be limited by the underlying capabilities of the communications medium (e.g., BLE vs. UWB vs. LF) and accuracy of RSSI and angle measurement facilities (e.g., measurement/approximation error).

The system 100 may use any combination of RSSI-based and/or angle-based methods to determine presence within (or absence from) a particular zone 400 (e.g., using only RSSI, using only angles, requiring agreement between both RSSI- and angle-based methods, requiring agreement between both RSSI- and angle-based methods only when certain thresholds are [or are not] satisfied and/or when both are able to determine a zone 400, requiring one of RSSI- and angle-based methods, selecting the method that yields the most probable position [e.g., based on probability, with the greatest margin, etc.], etc.).

The system 100 may use RSSI-based methods to determine or alter which angle-based methods, antenna 312 combinations, threshold combinations, thresholds, or any combination thereof, are used to determine that a portable device 110 is located in a particular zone 400 or at a particular distance (e.g., if an RSSI-based method determines a particular zone 400 [e.g., zone B], the criteria utilized of an angle-based method may be relaxed [e.g., adjust zone B thresholds to be slightly more inclusive than normal]); likewise, the system 100 may use angle-based methods to determine or alter which RSSI-based methods, antenna 312 combinations, threshold combinations, thresholds, or any combination thereof, are used to determine that a portable device 110 is located in a particular zone 400 or at a particular distance (e.g., if an angle-based method determines a particular zone 400 [e.g., zone B], the criteria utilized of an RSSI-based method may be relaxed [e.g., adjust zone B thresholds to be slightly more inclusive than normal], if an angle-based method determines that the portable device 110 is near a particular zone 400 at a particular approximate height, the criteria utilized of an RSSI-based method may be tightened [e.g., adjust zone B thresholds to be slightly more restrictive than normal], etc.).

As described previously, variance (or noise) in measured RSSI and/or angles, from a portable device 110 and/or other system antennas 312 (including a master device 120 antenna 312), and measured background power/noise, may allow the system 100 to determine the presence (or absence) of nearby objects (e.g., vehicles 500, people, etc.) and/or whether the system 100 is located within certain environments (e.g., a highly reflective environment). The previously described RSSI- and angle-based methods may be used separately or together to make such determinations and/or adjustments.

In one embodiment, the system 100, when it has determined that a vehicle 500 or object is nearby, such as by observing variance on only a few channels using both RSSI- and angle-based methods, as described above, the distance to said vehicle 500 or object may computed using multiangulation (e.g., triangulation), multiangulateration, any other disclosed method, or any combination thereof.

The system 100 may use different combination methods to combine positioning method results at different times (e.g., the system 100 may utilize agreement between both RSSI- and angle-based methods to transition into or out of a zone 400, but may utilize only one of RSSI- and angle-based methods to remain in said zone 400, etc.). Depending on both methods agreeing (in the presence in—or absence from—a particular zone 400) may reduce the probability that the system 100 determines an incorrect zone 400, at the expense of focusing on the portable device 110 being more clearly within a particular zone 400 (i.e., within all of the applicable thresholds from both systems); this may result in certain situations in which a particular zone determination is desired, but where the system 100 is unable to provide such determination (e.g., cases at the edge of certain thresholds, in certain positions that present challenges due to reflectors or blockers, etc.). Conversely, requiring only one of the methods increases the probability that the system 100 may determine a particular zone 400, at the expense of potentially determining an incorrect zone 400; this may result in certain situations in which a particular zone determination is not desired, but where the system 100 is unable to prevent such determination (e.g., cases at the edge of certain thresholds, in certain positions that present challenges due to reflectors or blockers, etc.).

The appropriate selection of when to utilize agreement, or when not to, depends on the desired behavior of the system 100, and may be determined a priori, statically, or dynamically for each zone 400 in each system 100. For most systems, the optimal or selected combination of methods for a particular zone 400 may vary dynamically based upon the previous zone 400 and candidate zones 400 (i.e., the sort of zone transition), the set of candidate zones 400 themselves (i.e., are the RSSI- and angle-based methods determining zones 400 nearby to one another or far apart), concreteness of the candidate zones 400 (i.e., is one candidate zone 400 barely probable, but another highly probable), the set of thresholds that are (or aren't) satisfied, whether a particular method is able to determine a zone 400 (i.e., if the angle-based method is not able to determine a zone 400, but the RSSI-based method is, or vice versa), other related criteria (e.g., other vehicle sensors, portable device 110 sensors, sensor 310 state/diagnostics, etc.), or any combination thereof.

In one embodiment, positioning results may be alternately or additionally combined using a particle filter. In another embodiment, positioning results may be alternately or additionally combined using a Kalman filter. In yet another embodiment, positioning results may be alternately or additionally combined using probabilistic models of feasible state/zone transitions. In yet another embodiment, positioning results may be alternately or additionally combined using fingerprinting.

In any embodiment, it is noted that additional sensor information, such as those described previously (e.g., portable device 110 or system 100 provided INS [e.g., accelerometer, magnetometer, gyroscope, etc.], ultrasonic, step counting, etc.), may be integrated into antenna 312 measurements, signal processing techniques, zone determination methods, position combination methods, any other disclosed method or technique, or any combination thereof.

With regard to angle-based antennas 312, the field-of-view of one or more antennas 312 may be restricted, or the measurement/approximation error of one or more antennas 312 may be significant, such that thresholds associated with said antennas 312 may be restricted, resulting in zone boundaries that are either smaller, larger, or less accurate than desired. In such situations, to reach agreement, it may be advantageous to relax or tighten one or more thresholds of the angle-based methods, when the RSSI-based methods determine that the portable device 110 is (or is not) located in one of these zones 400. For example, if RSSI-based methods determine that the portable device 110 is located in zone B, one or more thresholds for angle-based methods may be relaxed to form a larger angle-based zone B (thus increasing the probability that the angle-based method determines that the portable device 110 is located in zone B [e.g., because the angle-based system by itself results in closer than desired boundaries]).

With regard to RSSI-based antennas 312, the field-of-view (i.e., radiation pattern) of one or more antennas 312 may be restricted, or the measurement/approximation error of one or more antennas 312 may be significant, such that thresholds associated with said antennas 312 may be restricted, resulting in zone boundaries that are either smaller, larger, or less accurate than desired. In such situations, to reach agreement, it may be advantageous to relax or tighten one or more thresholds of the RSSI-based methods, when the angle-based methods determine that the portable device 110 is (or is not) located in one of these zones 400. For example, if angle-based methods determine that the portable device 110 is located in zone B, one or more thresholds for RSSI-based methods may be relaxed to allow a larger RSSI-based zone B (thus increasing the probability that the RSSI-based method determines that the portable device 110 is located in zone B [e.g., because the RSSI-based system 100 by itself results in closer than desired boundaries]). For example, if an angle-based method determines that the portable device 110 is near a particular zone 400 at a particular approximate height, the criteria utilized of an RSSI-based method may be tightened (e.g., adjust zone B thresholds to be slightly more restrictive than normal, or use alternate thresholds, formulas, or methods to compute distance [e.g., because the portable device 110 may be located in a position in which the RSSI-based methods measure signals more strongly]).

It is noted that, as previously disclosed, zones 400 may be determined by taking possible advantage of one set of methods indicating presence and another indicating absence, and/or that one or more methods may be supported by a presence of measurements and one or methods may be supported by an absence of measurements. Reaching agreement amongst RSSI-based and angle-based methods may also take possible advantage of these properties, as such, agreement may include the presence or absence in a particular zone 400 and/or the presence or absence of measurements from the portable device 110 (or any other data source [e.g., vehicle sensors, portable device 110 sensors, etc.]). For example, RSSI-based methods may determine that the portable device 110 is located in zone B, but angle-based methods may not provide a determination; in the case where no measurements were obtained from angle-based antennas 312, the system 100 may not consider both methods as in agreement; however, in the case where measurements were only not obtained from certain antennas 312, the system 100 may consider the angle-based methods as in agreement. For example, the system 100 may determine that, due to an RSSI-based method determination of zone B, and an angle-based method determination that the portable device 110 is absent from zone B, C, and E, that the portable device 110 is positioned in zone B.

The system 100 may distinguish zone A (inside) from other zones 400 using the methods previously described for RSSI-based and angle-based systems. The system 100 may utilize that both RSSI- and angle-based methods agree that the portable device 110 is located in zone A to determine that the portable device 110 is located in zone A. Alternatively, the system 100 may only utilize that either RSSI- or angle-based methods determine that the portable device 110 is located in zone A to determine that the portable device 110 is located in zone A; such an approach may additionally utilize that one or more thresholds be satisfied (which may include requiring that a particular approach have a minimum amount of margin in its decision process). Alternatively, the system 100 may utilize that both RSSI- and angle-based methods agree that the portable device 110 is located in zone A to transition the determined position of the portable device 110 from any other zone to zone A, but only utilize that either RSSI- or angle-based methods determine that the portable device 110 is located in zone A to remain located in zone A when one or more thresholds have not been reached (e.g., remain in zone A if is not apparent that the portable device 110 is positioned in another zone 400, remain in zone A if the system 100 cannot determine that the portable device 110 is positioned in any other zone 400, etc.).

The system 100, when it has determined that the portable device 110 is in zone A (inside), may determine whether the portable device 110 is located in zone $A_{DF}$, $A_{PF}$, $A_{DR}$, $A_{PR}$, or $A_T$ using the methods previously described for RSSI-based and angle-based systems. Similar to zone A, the system 100 may utilize agreement amongst RSSI- and angle-based methods to determine in which of these zones 400 a portable device 110 is located. Alternatively, the system 100 may select the most probable zone 400 by using the determined zone 400 with the most margin and greatest probability (e.g., if RSSI-based methods determine $A_{DF}$, and approach-based methods determine $A_{PF}$, and the RSSI-based methods concretely determined $A_{DF}$ [i.e., it is very unlikely to be any other zone 400—there is a lot of margin in the selected zone 400], and the approach-based method loosely determined $A_{PF}$ [i.e., the decision was right on the edge, and it may not take much to determine another zone 400—there is not a lot of margin in the selected zone 400], then the system 100 may determine $A_{DF}$ [and may instead not determine a zone 400 if both are concrete or loose, or if instead both methods result in zones 400 that are not nearby], etc.).

The system 100 may distinguish zones B-E from F by applying an approach similar to that as used to determine zones A, $A_{DF}$, $A_{PF}$, $A_{DR}$, $A_{PR}$, and/or $A_T$. The system 100 may utilize agreement amongst RSSI- and angle-based methods to determine in which of these zones 400 a portable device 110 is located. Alternatively, the system 100 may select the most probable zone 400 by using the determined zone 400 with the most margin and greatest probability (e.g., if RSSI-based methods determine B, and approach-based methods determine D, and the RSSI-based methods concretely determined B [i.e., it is very unlikely to be any other zone 400—there is a lot of margin in the selected zone 400], and the approach-based method loosely determined D [i.e., the decision was right on the edge, and it may not take much to determine another zone 400—there is not a lot of margin in the selected zone 400], then the system 100 may determine B [and may instead not determine a zone 400 if both are concrete or loose, or if instead both methods result in zones 400 that are not nearby], etc.).

The system 100 may distinguish zone F by applying an approach similar to that as used to determine zones B-E. The system 100 may utilize agreement amongst RSSI- and angle-based methods to determine that the portable device 110 is located zone F. For example, angle-based methods may not define zone F, in which case, the system 100 may utilize that RSSI-based methods determine that the portable device 110 is located in zone F and that angle-based methods determine that the portable device 110 is not present in zones A-E; alternatively, angle-based methods may define zone F, in which case, the angle-based system 100 may also be utilized to determine that the portable device 110 is located in zone F. Alternatively, the system 100 may select the most probable zone 400 by using the determined zone 400 with the most margin and greatest probability (e.g., if RSSI-based methods determine F, and approach-based methods determine B, and the RSSI-based methods concretely determined F [i.e., it is very unlikely to be any other zone 400—there is a lot of margin in the selected zone 400], and the approach-based method loosely determined B [i.e., the decision was right on the edge, and it may not take much to determine another zone 400—there is not a lot of margin in the selected zone 400], then the system 100 may determine F [or may instead determine zone B, if both are concrete, or one method determines zone G], etc.).

The system 100 may distinguish zone G by applying an approach similar to that as used to determine zone F. The system 100 may utilize agreement amongst RSSI- and angle-based methods to determine that the portable device 110 is located zone G. For example, angle-based methods may not define zone G, in which case, the system 100 may utilize that RSSI-based methods determine that the portable device 110 is located in zone G and that angle-based methods determine that the portable device 110 is not present in zones A-F; alternatively, angle-based methods may define zone G, in which case, the angle-based system 100 may also be utilized to determine that the portable device 110 is located in zone G. Alternatively, the system 100 may select the most probable zone 400 by using the determined zone 400 with the most margin and greatest probability (e.g., if RSSI-based methods determine G, and approach-based methods determine B or F, and the RSSI-based methods concretely determined G [i.e., it is very unlikely to be any other zone 400—there is a lot of margin in the selected zone 400], and the approach-based method loosely determined B or F [i.e., the decision was right on the edge, and it may not take much to determine another zone 400—there is not a lot of margin in the selected zone 400], then the system 100 may determine G [or may instead determine zone F, if both are concrete, or B, depending upon the level of concreteness or other conditions], etc.).

The system 100 may determine the position of the portable device 110 to be in zone H, if the portable device 110 is not connected.

The system 100 may, alternately or additionally, determine the zone 400 in which the portable device 110 is located using a trilateration-, multilateration-, multiangulation-, or multiangulateration-based approach, or any combination thereof (described herein).

The system 100 may, alternately or additionally, determine distance using a time-of-flight-/time-of-arrival-(TOF/TOA) and/or time-difference-of-arrival (TDOA)-based approach (described herein).

E.3.b Twenty-one (21) Antenna AoA-RSSI System (10 AoA+11 RSSI)

The above twenty-three (23) antenna AoA-RSSI system embodiment, without the front-facing front AoA antennas 312 (antennas 312-2, 312-3).

E.3.c Twenty-one (21) Antenna AoA-RSSI System (10 AoA+11 RSSI, No Rear)

The above twenty-three (23) antenna AoA-RSSI system embodiment, without the rear-facing rear AoA antennas 312 (antennas 312-6, 312-7).

E.3.d Nineteen (19) Antenna AoA-RSSI System (8 AoA+11 RSSI, No Front/Rear)

The above twenty-three (23) antenna AoA-RSSI system embodiment, without the front-facing front and rear-facing rear AoA antennas 312 (antennas 312-2, 312-3, 312-6, 312-7).

E.3.e Nineteen (19) Antenna AoA-RSSI System (8 AoA+11 RSSI)

Figure 50:
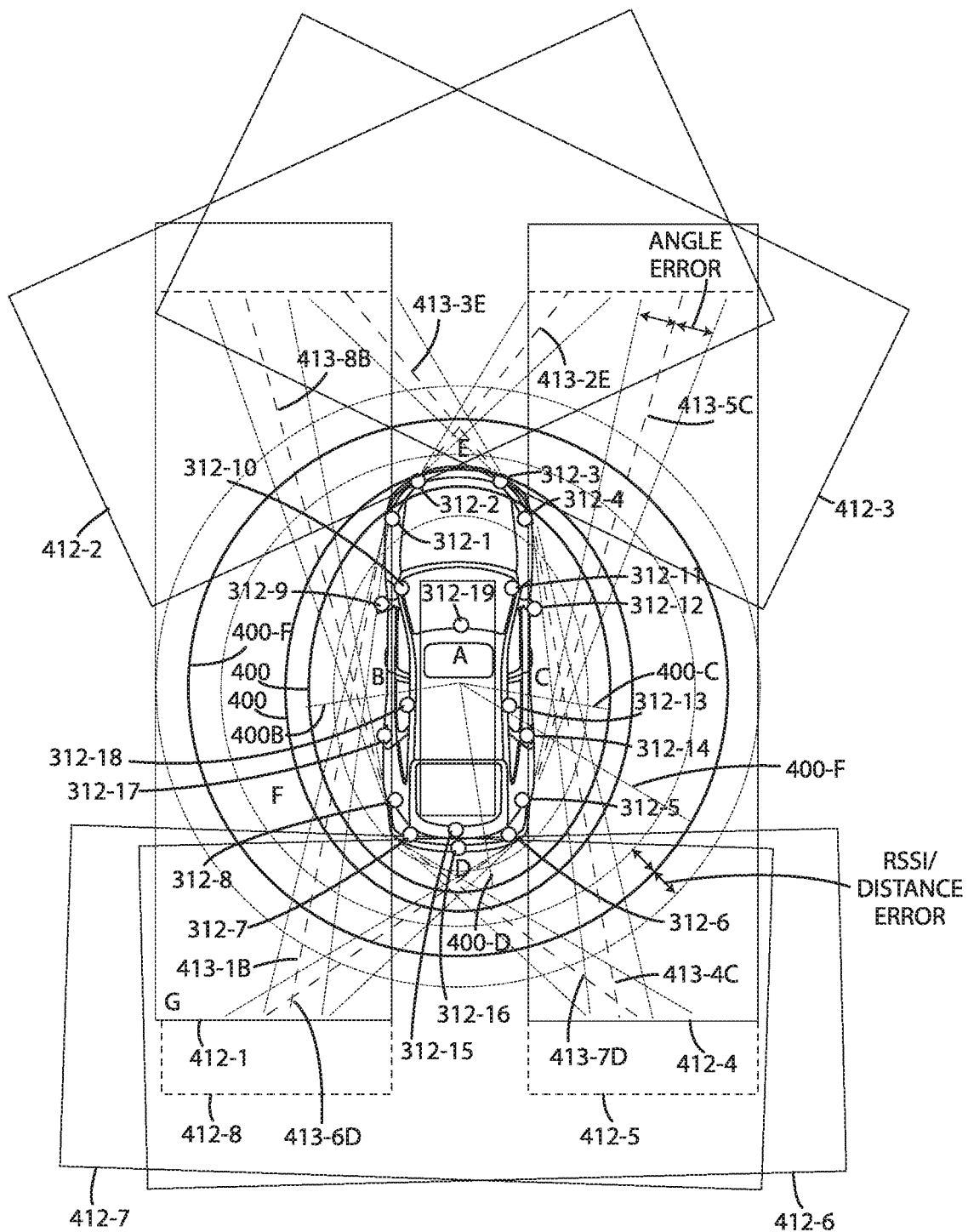
FIG. 50 shows a nineteen antenna vehicle microlocation system using angle of arrival and RSSI in accordance with one embodiment.

In one embodiment of a vehicle microlocation system 100, shown for example in FIG. 50, the system 100 may use angle of arrival (AoA) and RSSI with nineteen (19) antennas 312. In this system 100, an eight (8) antenna AoA system (antennas 312-1 through 312-8), which is a variation of the twelve (12) antenna AoA system (as described in Section E.2.a) without inside antennas, and an eleven (11) antenna RSSI system (as described in Section E.1.c, antennas 312-9 through 312-19), are combined, using the antennas (RSSI-only and angle-only) and antenna placements previously described for each respective system 100. It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system 100 previously described.

For the purposes of disclosing this nineteen (19) antenna AoA-RSSI system 100, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. Additionally, or alternatively, as previously disclosed, AoA antennas 312 may participate in interior zone determination (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are depicted in the illustrated embodiment of FIG. 50.

E.3.f Seventeen (17) Antenna AoA-RSSI System (6 AoA+11 RSSI)

Figure 51:
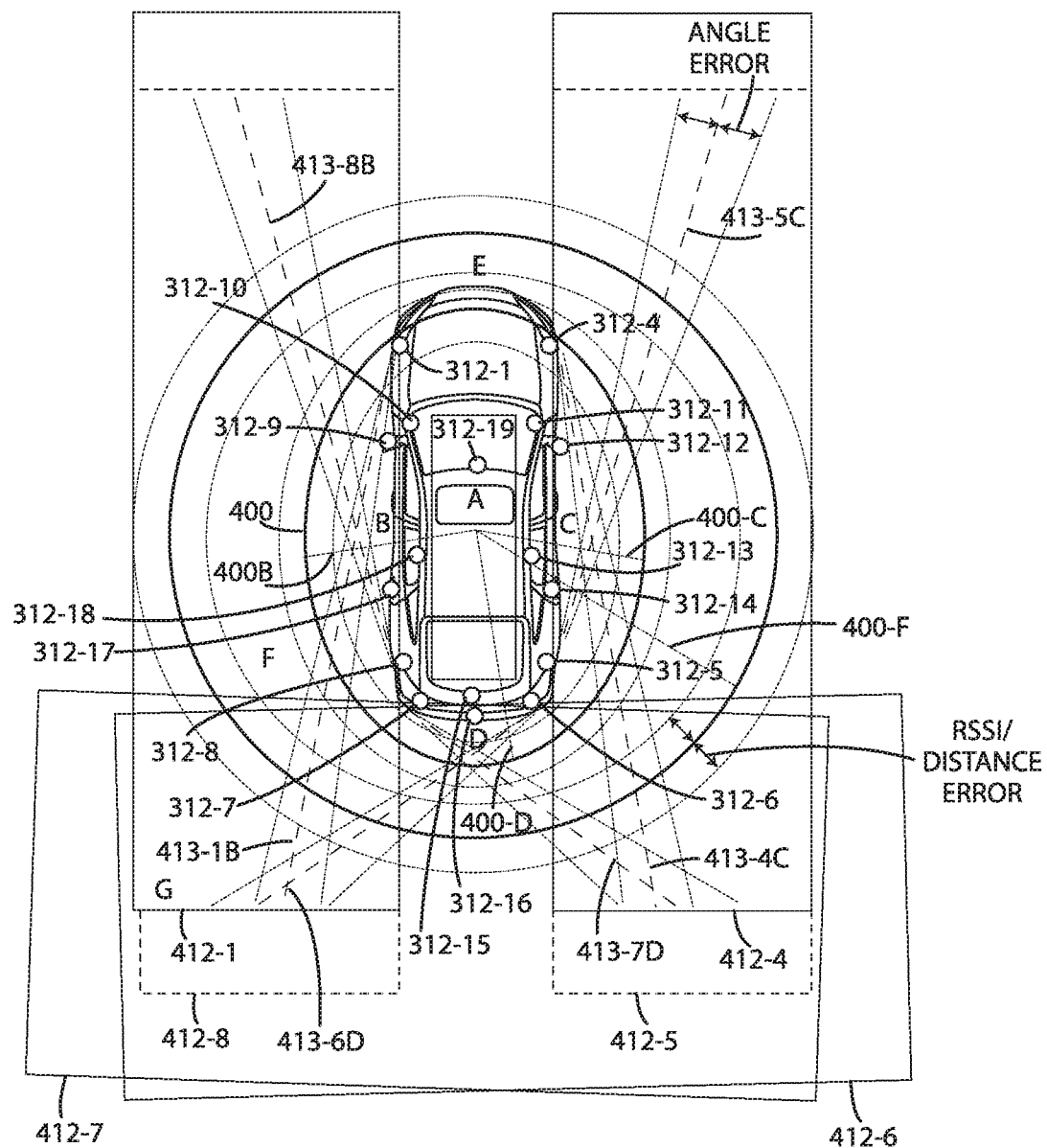
FIG. 51 shows a seventeen antenna vehicle microlocation system using angle of arrival and RSSI in accordance with one embodiment.

In one embodiment of a vehicle microlocation system 100, shown for example in FIG. 51, the system 100 may uses angle of arrival (AoA) and RSSI with seventeen (17) antennas 312. In this system 100, a six (6) antenna AoA system (antennas 312-1, 312-4 through 312-8), which is a variation of the twelve (12) antenna AoA system (as described in Section E.2.a) without inside and front-facing front antennas 312, and an eleven (11) antenna RSSI system (as described in Section E.1.c, antennas 312-9 through 312-19), are combined, using the antennas 312 (RSSI-only and angle-only) and antenna placements previously described for each respective system 100. It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system previously described.

For the purposes of disclosing this seventeen (17) antenna AoA-RSSI system, it is assumed that the set of potential zones 400 is the same set as described within the previously disclosed twenty-three (23) antenna AoA-RSSI system, without the front near zone 400; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. Additionally, or alternatively, as previously disclosed, AoA antennas 312 may participate in interior zone determination (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 51.

E.3.g Fifteen (15) Antenna AoA-RSSI System (4 AoA+11 RSSI)

Figure 52:
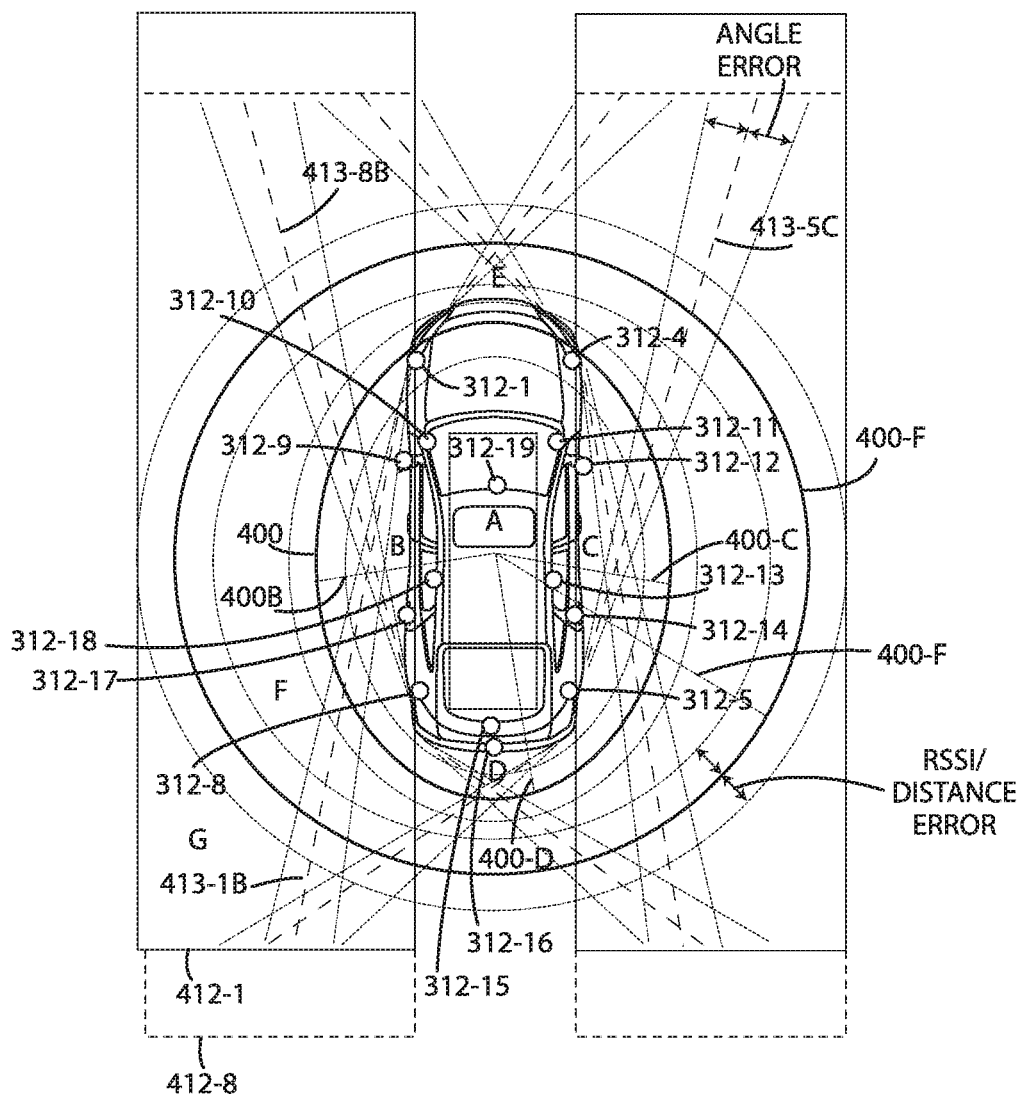
FIG. 52 depicts a fifteen antenna vehicle microlocation system using angle of arrival and RSSI in accordance with one embodiment.

In one embodiment of a vehicle microlocation system 100, shown for example in FIG. 52, the system 100 may use angle of arrival (AoA) and RSSI with fifteen (15) antennas 312. In this system 100, a four (4) antenna AoA system (e.g., antennas 312-1, 312-4, 312-5, 312-8), which is a variation of the twelve (12) antenna AoA system (as described in Section E.2.a) without inside, front-facing front, and rear-facing rear antennas 312, and an eleven (11) antenna RSSI system (as described in Section E.1.c, antennas 312-7 through 312-17), are combined, using the antennas 312 (RSSI-only and angle-only) and antenna placements previously described for each respective system 100. It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system 100 previously described.

For the purposes of disclosing this fifteen (15) antenna AoA-RSSI system, it is assumed that the set of potential zones 400 is the same set as described within the previously disclosed twenty-three (23) antenna AoA-RSSI system, without the front near zone 400; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. In this system 100, the one or more exterior rear zones 400 (e.g., D) may be determined using the previously disclosed RSSI-based methods. Additionally, or alternatively, as previously disclosed, AoA antennas 312 may participate in interior or exterior rear zone determinations (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are depicted in the illustrated embodiment of FIG. 52.

Figure 53:
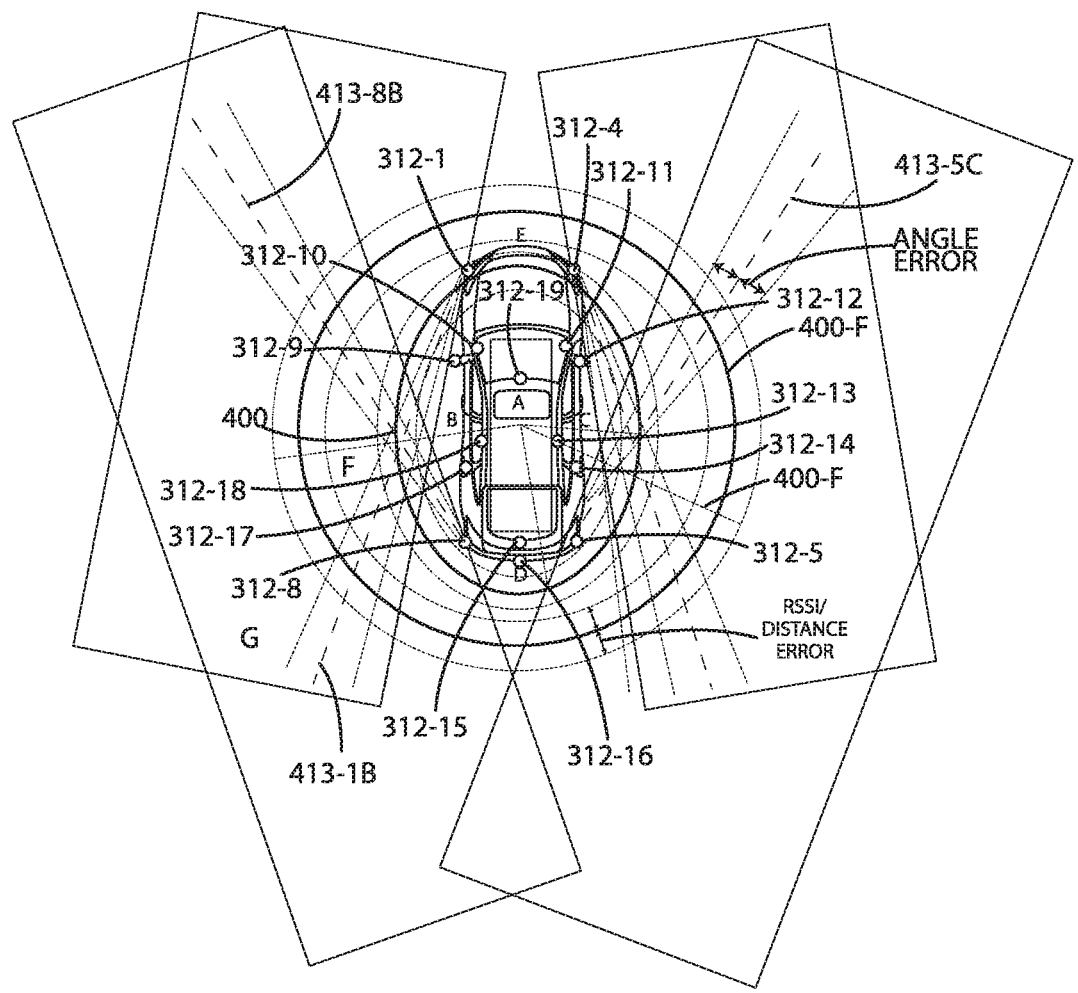
FIG. 53 shows an alternate fifteen antenna vehicle microlocation system using angle of arrival and RSSI in accordance with one embodiment.

In the illustrated embodiment of FIG. 53, an alternate embodiment of this fifteen (15) antenna AoA-RSSI system is shown, wherein the positions and fields of view for AoA antennas 312 (312-1, 312-4, 312-5, 312-8) are moved slightly (e.g., to illustrate less optimal side zone coverage, with the potential for some rear zone coverage).

E.3.h Fifteen (15) Antenna AoA-RSSI System (8 AoA+7 RSSI)

Figure 54:
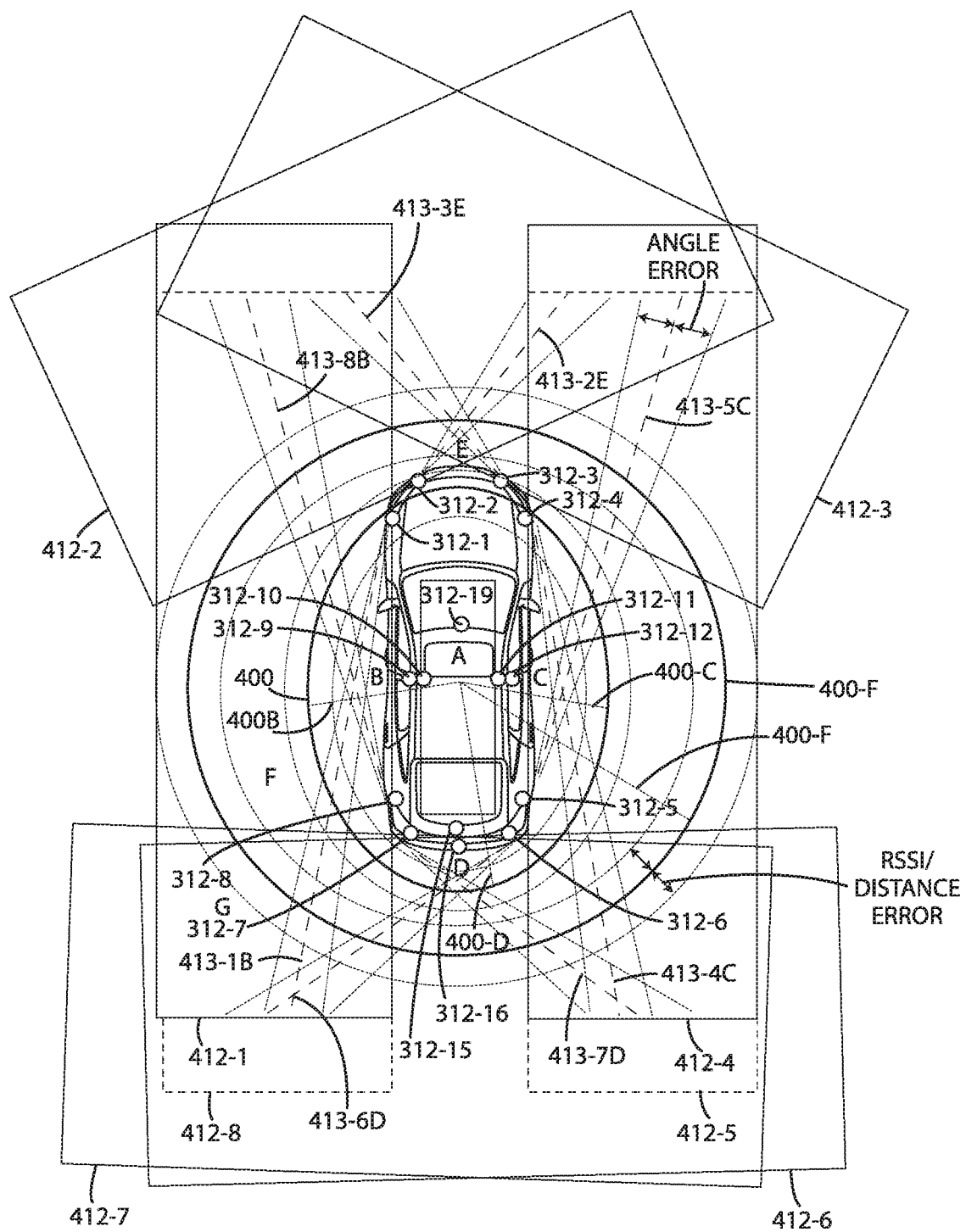
FIG. 54 depicts a fifteen antenna vehicle microlocation system using angle of arrival and RSSI in accordance with one embodiment.

In one embodiment of a vehicle microlocation system 100, shown for example in FIG. 54, the system 100 may use angle of arrival (AoA) and RSSI with fifteen (15) antennas 312. In this system 100, an eight (8) antenna AoA system (antennas 312-1 through 312-8), which is a variation of the twelve (12) antenna AoA system (as described in Section E.2.a) without inside antennas 312, and a seven (7) antenna RSSI system (antennas 312-9 through 312-12, 312-15, 312-16, 312-19), which is a variation of the eleven (11) antenna RSSI system (as described in E.1.c) without rear driver side and rear passenger side antenna pairs (i.e., equivalent to the seven [7] antenna RSSI system described in E.1.b), are combined, using the antennas 312 (RSSI-only and angle-only) and antenna placements previously described for each respective system 100, except for possibly antennas 312-9 through 312-12. In this system 100, antennas 312-9 through 312-12 may use the previously described placements, or alternately, they may be moved more towards the center of the sides of the vehicle 500, such as on or near the B-pillar or door handle.

It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system previously described.

For the purposes of disclosing this fifteen (15) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. For example, in one embodiment, only interior zone A may be determined; in another embodiment, only zones A and $A_T$ may be determined; in yet another embodiment, only zones A, $A_D$ (driver side interior, combining $A_{DF}$ and $A_{DR}$), $A_P$ (passenger side interior, combining $A_{PF}$ and $A_{PR}$), and $A_T$ may be determined. Additionally, or alternatively, as previously disclosed, AoA antennas 312 may participate in interior zone determination (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 54.

E.3.i Thirteen (13) Antenna AoA-RSSI System (6 AoA+7 RSSI)

Figure 55:
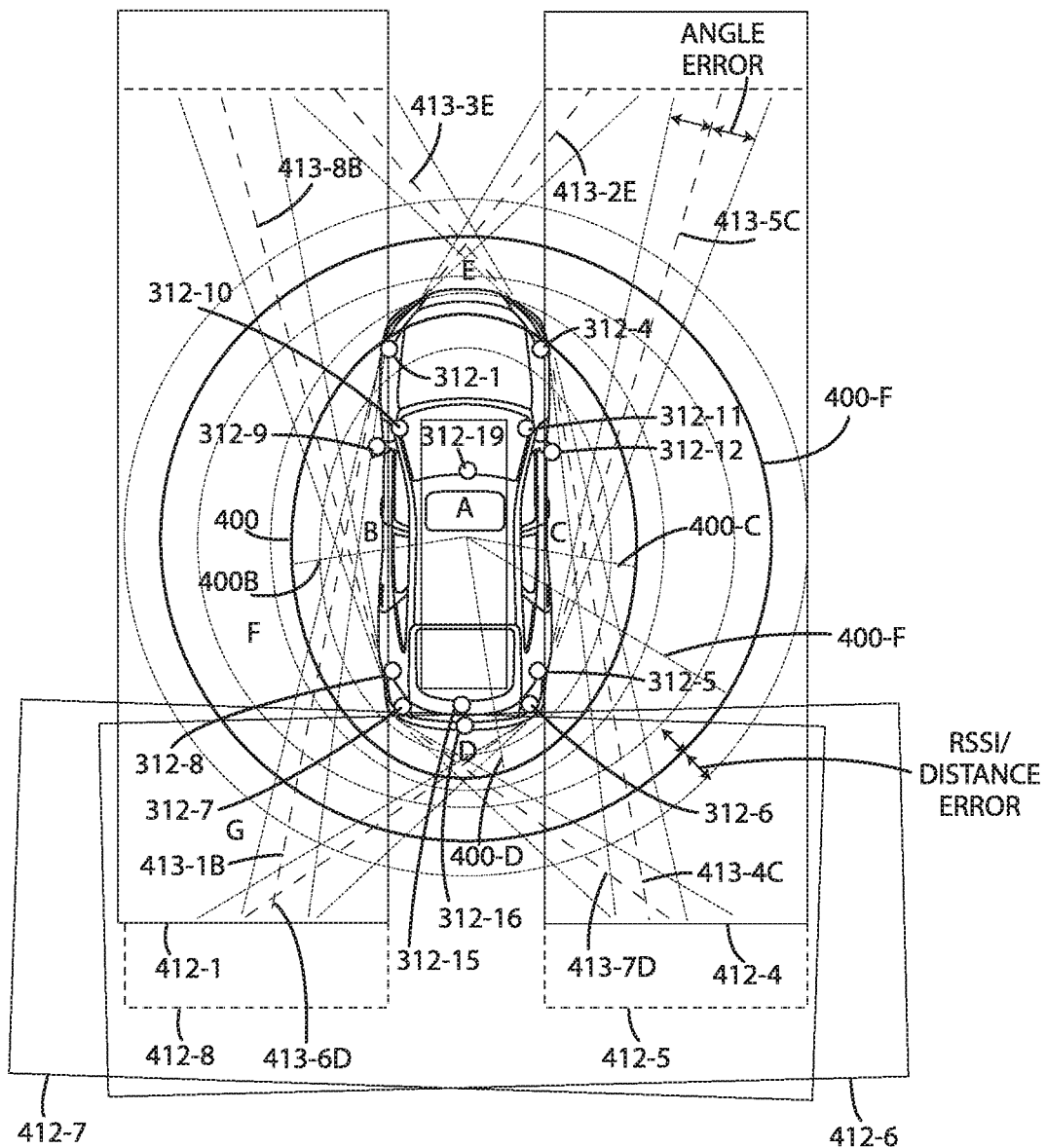
FIG. 55 shows a thirteen antenna vehicle microlocation system using angle of arrival and RSSI in accordance with one embodiment.

In one embodiment of a vehicle microlocation system 100, shown for example in FIG. 55, the system 100 may use angle of arrival (AoA) and RSSI with thirteen (13) antennas 312. In this system 100, a six (6) antenna AoA system (antennas 312-1, 312-4 through 312-8), which is a variation of the twelve (12) antenna AoA system (as described in Section E.2.a) without inside and front-facing front antennas 312, and a seven (7) antenna RSSI system (antennas 312-9 through 312-12, 312-15, 312-16, 312-19), which is a variation of the eleven (11) antenna RSSI system (as described in E.1.c) without rear driver side and rear passenger side antenna pairs (i.e., equivalent to the seven [7] antenna RSSI system described in E.1.b), are combined, using the antennas (RSSI-only and angle-only) and antenna placements previously described for each respective system 100, except for possibly antennas 312-9 through 312-12. In this system 100, antennas 312-9 through 312-12 may use the previously described placements, or alternately, they may be moved more towards the center of the sides of the vehicle 500, such as on or near the B-pillar.

It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system previously described.

For the purposes of disclosing this thirteen (13) antenna AoA-RSSI system, it is assumed that the set of potential zones 400 is the same set as described within the previously disclosed twenty-three (23) antenna AoA-RSSI system, without the front near zone 400; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. For example, in one embodiment, only interior zone A may be determined; in another embodiment, only zones A and $A_T$ may be determined; in yet another embodiment, only zones A, $A_D$ (driver side interior, combining $A_{DF}$ and $A_{DR}$), $A_P$ (passenger side interior, combining $A_{PF}$ and $A_{PR}$), and $A_T$ may be determined. Additionally, or alternatively, as previously disclosed, AoA antennas 312 may participate in interior zone determination (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are depicted in the illustrated embodiment of FIG. 55.

E.3j Eleven (11) Antenna AoA-RSSI System (4 AoA+7 RSSI)

Figure 56:
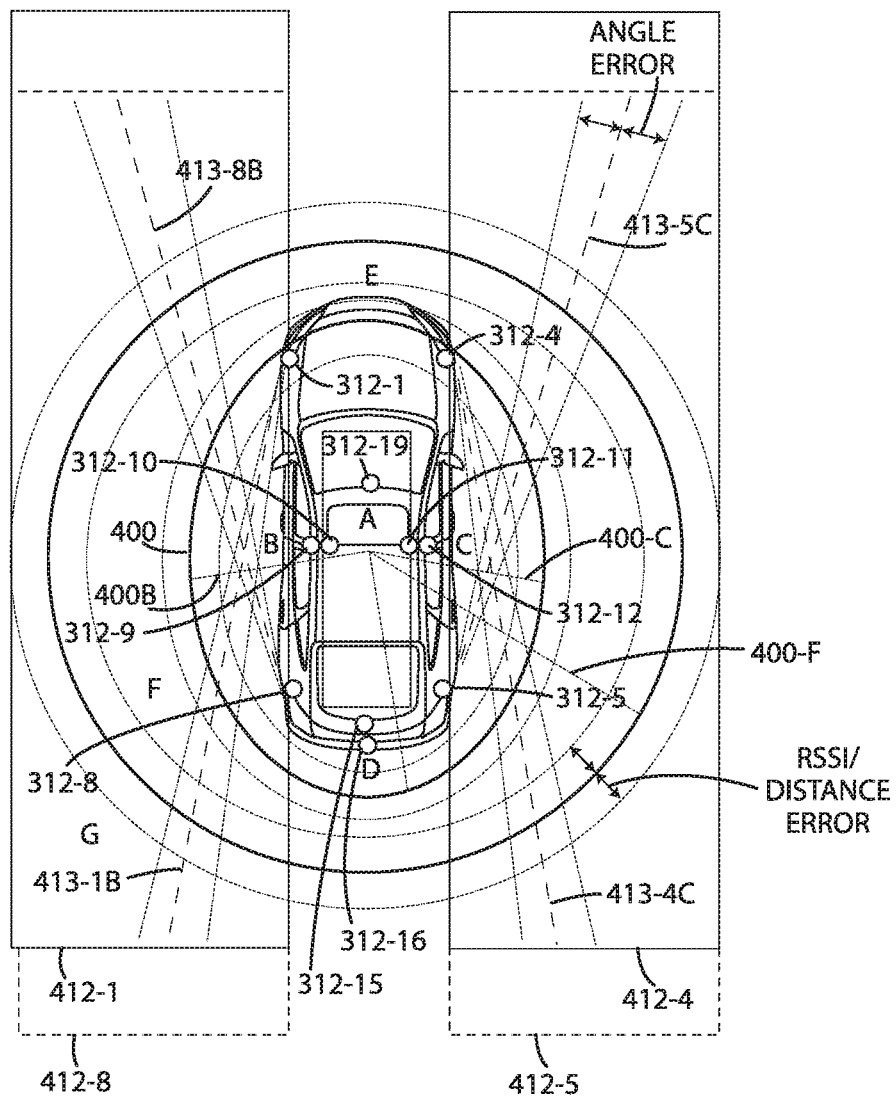
FIG. 56 shows an eleven antenna vehicle microlocation system using angle of arrival and RSSI in accordance with one embodiment.

In one embodiment of a vehicle microlocation system 100, shown for example in FIG. 56, the system 100 may use angle of arrival (AoA) and RSSI with eleven (11) antennas 312. In this system 100, a four (4) antenna AoA system (antennas 312-1, 312-4, 312-5, 312-8), which is a variation of the twelve (12) antenna AoA system (as described in Section E.2.a) without inside, front-facing front, and rear-facing rear antennas 312, and a seven (7) antenna RSSI system (antennas 312-9 through 312-12, 312-15, 312-16, 312-19), which is a variation of the eleven (11) antenna RSSI system (as described in E.1.c) without rear driver side and rear passenger side antenna pairs (i.e., equivalent to the seven [7] antenna RSSI system described in E.1.b), are combined, using the antennas 312 (RSSI-only and angle-only) and antenna placements previously described for each respective system 100, except for possibly antennas 312-9 through 312-12. In this system 100, antennas 312-9 through 312-12 may use the previously described placements, or alternately, they may be moved more towards the center of the sides of the vehicle 500, such as on or near the B-pillar or door handle.

It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system previously described.

For the purposes of disclosing this eleven (11) antenna AoA-RSSI system, it is assumed that the set of potential zones 400 is the same set as described within the previously disclosed twenty-three (23) antenna AoA-RSSI system, without the front near zone 400; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed RSSI-based methods. For example, in one embodiment, only interior zone A may be determined; in another embodiment, only zones A and $A_T$ may be determined; in yet another embodiment, only zones A, $A_D$ (driver side interior, combining $A_{DF}$ and $A_{DR}$), $A_P$ (passenger side interior, combining $A_{PF}$ and $A_{PR}$), and $A_T$ may be determined. In this system 100, the one or more exterior rear zones 400 (e.g., D) may be determined using the previously disclosed RSSI-based methods. Additionally, or alternatively, as previously disclosed, AoA antennas 312 may participate in interior zone determination (e.g., if the field-of-view of the exterior AoA antennas 312 allow it, etc.).

The described set of potential zones 400, along with the field of view 412 of each AoA antenna 312, and example thresholds that may be used to define zones 400 for both AoA and RSSI antennas 312 (with measurement/approximation error markers), are depicted in the illustrated embodiment of FIG. 56.

E.3.k Eighteen (18) Antenna AoA-RSSI System (12 AoA+6 RSSI)

Figure 57:
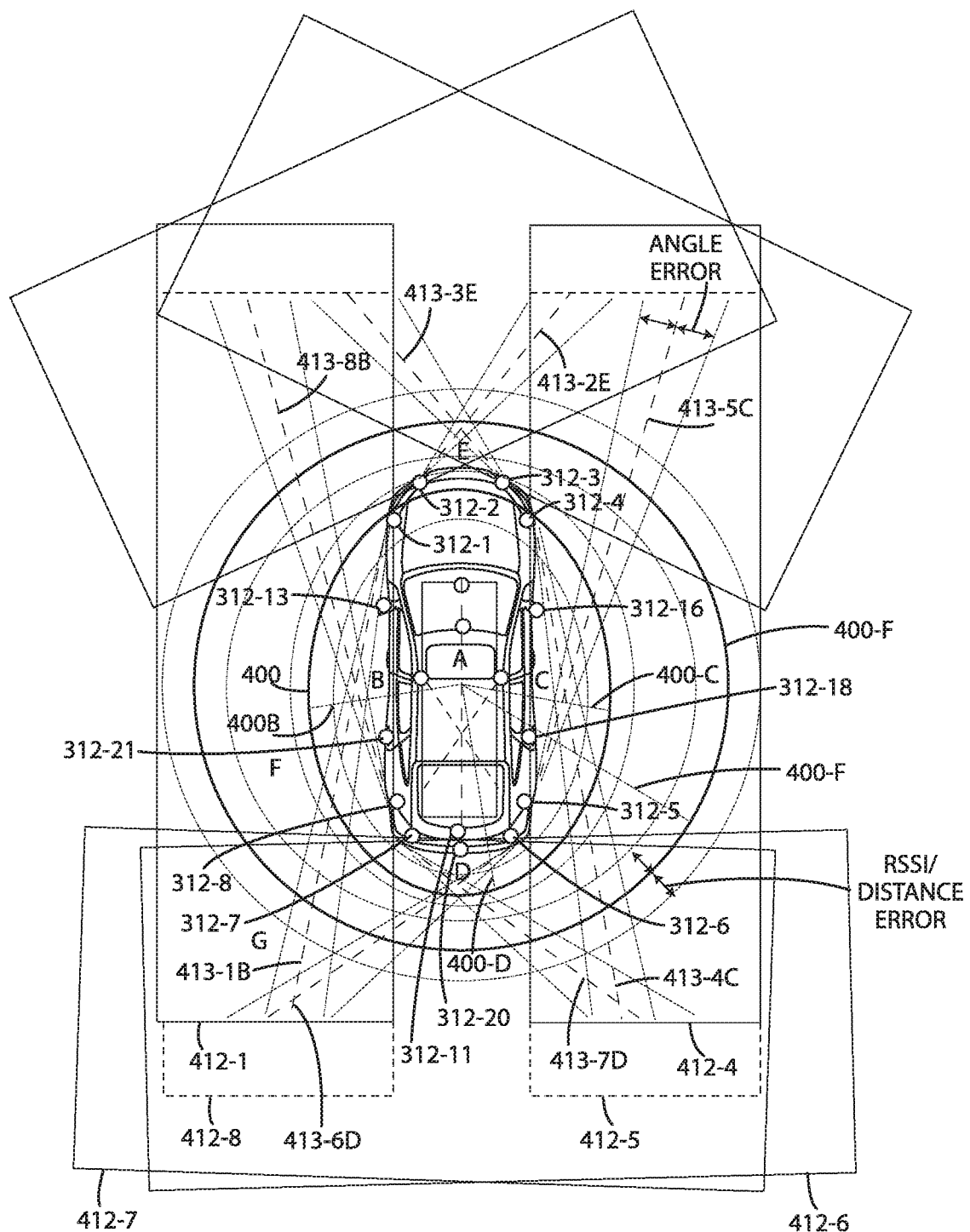
FIG. 57 depicts an eighteen antenna vehicle microlocation system using angle of arrival and RSSI in accordance with one embodiment.

In one embodiment of a vehicle microlocation system 100, shown for example in FIG. 57, the system 100 may use angle of arrival (AoA) and RSSI with eighteen (18) antennas 312. In this system 100, the twelve (12) antenna AoA system (as described in Section E.2.a, antennas 312-1 through 312-12), and a six (6) antenna RSSI system (antennas 312-13, 312-16, 312-18, 312-20, 312-21, 312-23), which is a variation of the eleven (11) antenna RSSI system (as described in E.1.c) without interior antennas 312 (except for the center antenna 312), are combined, using the antennas 312 (RSSI-only and angle-only) and antenna placements previously described for each respective system 100. It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system 100 are similar to those used in the twenty-three (23) antenna AoA-RSSI system previously described.

For the purposes of disclosing this eighteen (18) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed AoA-based methods. Additionally, or alternatively, as previously disclosed, RSSI antennas 312 may participate in interior zone determination.

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 57.

E.3.l Fourteen (14) Antenna AoA-RSSI System (8 AoA+6 RSSI)

The above eighteen (18) antenna AoA-RSSI system embodiment, without the front-facing front and rear-facing rear AoA antennas (antennas 312-2, 312-3, 312-6, 312-7).

E.3.m Seventeen (17) Antenna AoA-RSSI System (12 AoA+5 RSSI)

The above eighteen (18) antenna AoA-RSSI system embodiment, without the center RSSI antenna (antenna 312-23).

E.3.n Thirteen (13) Antenna AoA-RSSI System (8 AoA+5 RSSI)

The above seventeen (17) antenna AoA-RSSI system embodiment, without the front-facing front and rear-facing rear AoA antennas (antennas 312-2, 312-3, 312-6, 312-7).

E.3.o Sixteen (16) Antenna AoA-RSSI System (12 AoA+4 RSSI)

Figure 58:
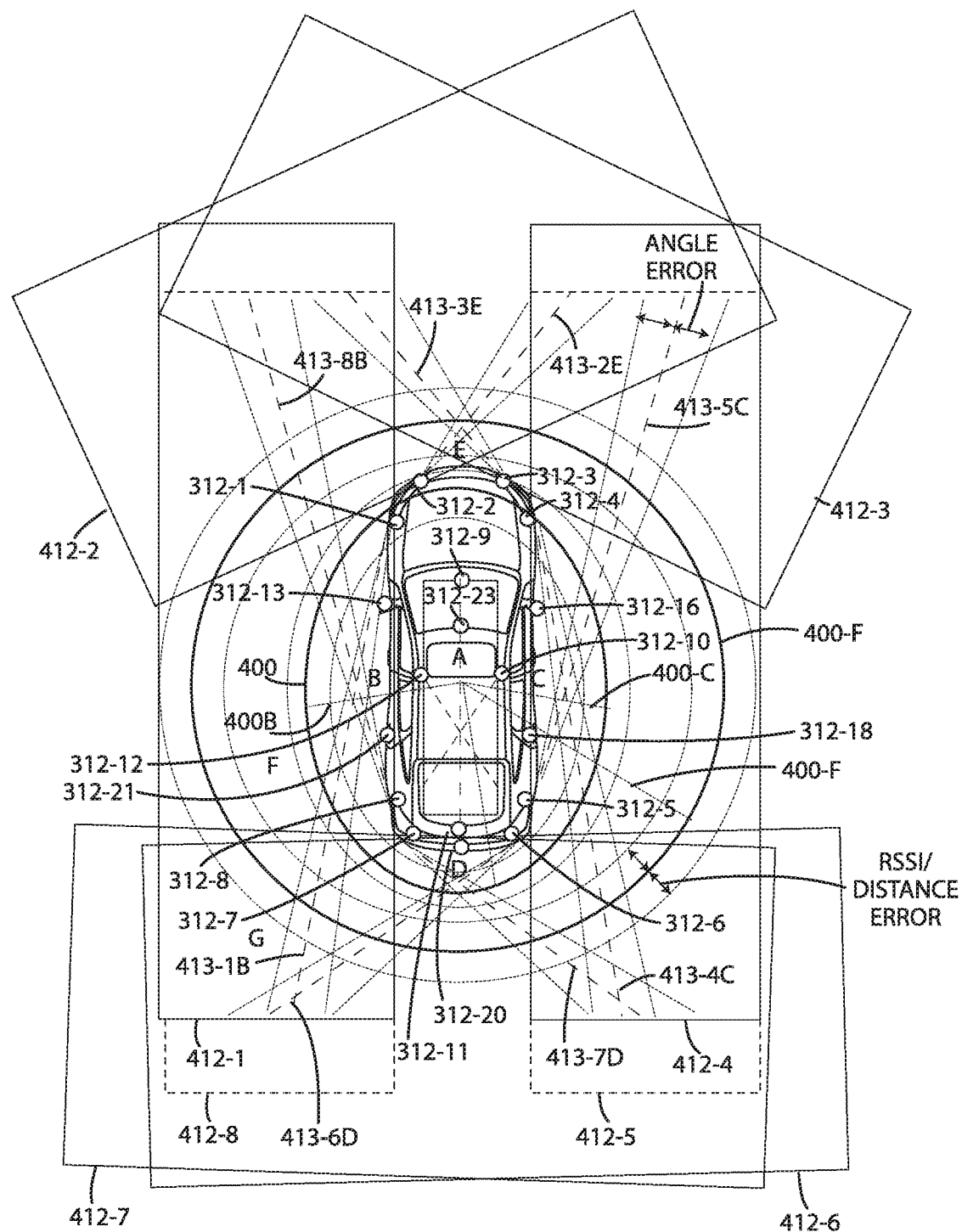
FIG. 58 shows a eighteen antenna vehicle microlocation system using angle of arrival and RSSI in accordance with one embodiment.

In one embodiment of a vehicle microlocation system 100, shown for example in FIG. 58, the system 100 may use angle of arrival (AoA) and RSSI with seventeen (17) antennas. In this system, the twelve (12) antenna AoA system (as described in Section E.2.a, antennas 312-1 through 312-12), and a four (4) antenna RSSI system (antennas 312-13, 312-16, 312-20, 312-23), which is a variation of the eleven (11) antenna RSSI system (as described in E.1.c) without rear driver side and rear passenger side antenna pairs (i.e., equivalent to the seven [7] antenna RSSI system described in E.1.b) and additionally without interior antennas 312 (except for the center antenna 312), are combined, using the antennas 312 (RSSI-only and angle-only) and antenna placements previously described for each respective system 100, except for possibly antennas 312-13 and 312-16. In this system 100, antennas 312-13 and 312-16 may use the previously described placements, or alternately, they may be moved more towards the center of the sides of the vehicle 500, such as on or near the B-pillar or door handle.

It is noted that this may be considered a naïve embodiment of a combined AoA-RSSI system, and as such, more efficiency may be gained with alternate embodiments that use sensors 310 that report both angle and RSSI together, with more efficient/combined placement (such embodiments are described herein in this disclosure); however, the methods and techniques used with this embodiment may be used in subsequently described embodiments.

The methods used to determine the position of, and/or distance to, a portable device 110 in this system are similar to those used in the twenty-three (23) antenna AoA-RSSI system previously described.

For the purposes of disclosing this sixteen (16) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

In this system 100, the one or more interior zones 400 (e.g., A, $A_{DF}$, $A_{PF}$, $A_{DR}$, $A_{PR}$, $A_T$, etc.) may be determined using the previously disclosed AoA-based methods. Additionally, or alternatively, as previously disclosed, RSSI antennas 312 may participate in interior zone determination.

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 58.

E.3.p Fifteen (15) Antenna AoA-RSSI System (12 AoA+3 RSSI)

The above sixteen (16) antenna AoA-RSSI system embodiment, without the center RSSI antenna 312 (antenna 312-23).

E.3.q Fifteen (15) Antenna AoA-RSSI System (12 AoA+3 RSSI, No Rear)

The above sixteen (16) antenna AoA-RSSI system embodiment, without the rear exterior RSSI antenna 312 (antenna 312-20).

E.3.r Fourteen (14) Antenna AoA-RSSI System (12 AoA+2 RSSI)

The above sixteen (16) antenna AoA-RSSI system embodiment, without the center or rear exterior RSSI antennas 312 (antennas 312-20 and 312-23).

E.3.s Twelve (12) Antenna AoA-RSSI System (8 AoA+4 RSSI)

Figure 59:
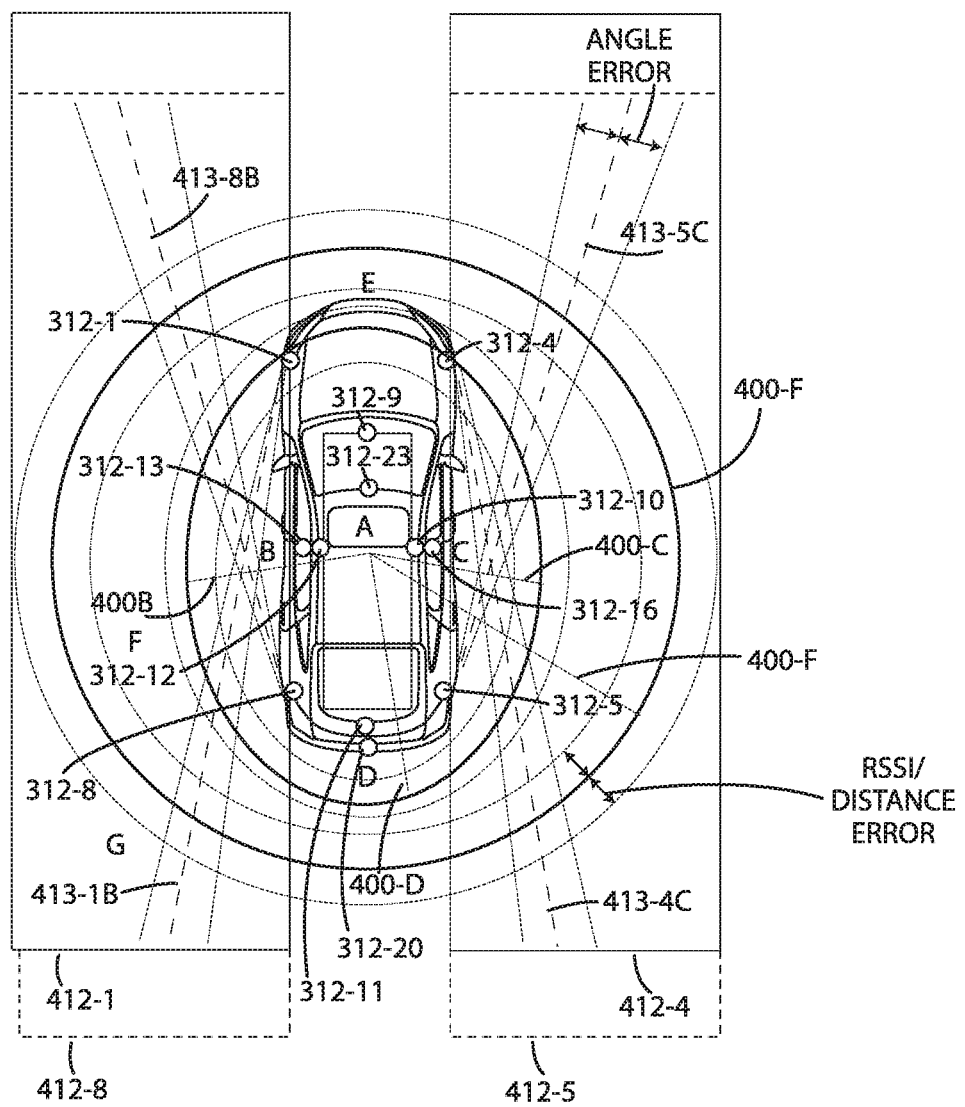
FIG. 59 depicts a twelve antenna vehicle microlocation system using angle of arrival and RSSI in accordance with one embodiment.

The above sixteen (16) antenna AoA-RSSI system embodiment, without the front-facing front and rear-facing rear AoA antennas 312 (antennas 2, 3, 6, 7). An example is shown in the illustrated embodiment of FIG. 59.

E.3.t Eleven (11) Antenna AoA-RSSI System (8 AoA+3 RSSI)

The above sixteen (16) antenna AoA-RSSI system embodiment, without the front-facing front and rear-facing rear AoA antennas 312 (antennas 312-2, 312-3, 312-6, 312-7) and without the center RSSI antenna 312 (antenna 312-23).

E.3.u Eleven (11) Antenna AoA-RSSI System (8 AoA+3 RSSI, No Rear)

The above sixteen (16) antenna AoA-RSSI system embodiment, without the front-facing front and rear-facing rear AoA antennas 312 (antennas 312-2, 312-3, 312-6, 312-7) and without the rear exterior RSSI antenna 312 (antenna 312-20).

E.3.v Ten (10) Antenna AoA-RSSI System (8 AoA+2 RSSI)

The above sixteen (16) antenna AoA-RSSI system embodiment, without the front-facing front and rear-facing rear AoA antennas 312 (antennas 312-2, 312-3, 312-6, 312-7) and without the center or rear exterior RSSI antennas 312 (antennas 312-20 and 312-23).

E.3.w Thirteen (13) Antenna AoA-RSSI System (13 Combined)

Figure 60:
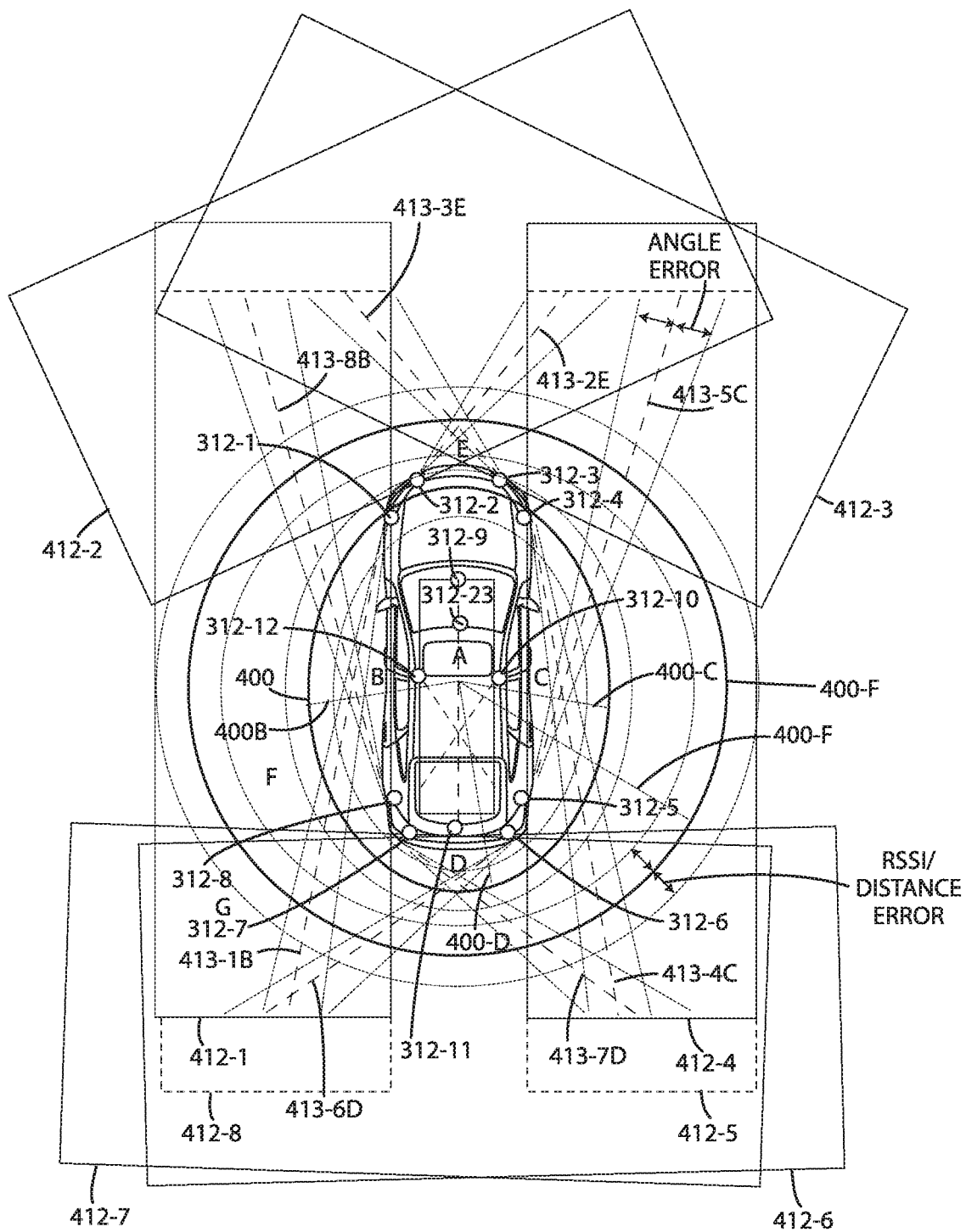
FIG. 60 shows a thirteen combined antenna vehicle microlocation system using angle of arrival and RSSI in accordance with one embodiment.

In one embodiment of a vehicle microlocation system 100, shown for example in FIG. 60, the system 100 may use angle of arrival (AoA) and RSSI with thirteen (13) combined antennas 312. In this system 100, the antenna 312 placements for the twelve (12) antenna AoA system (as described in Section E.2.a, antennas 312-1 through 312-12) are used, plus an additional center antenna 312 (antenna 312-23) similar to that in previously described RSSI systems (e.g., as described in Section E.1.c), but each antenna 312 is a combined antenna 312 (e.g., sensor 310) capable of reporting both angle and RSSI (either together or separately). As previously described, said combined antennas 312 (sensors 310) may comprise one or more antennas 312 (or antenna arrays), and may or may not be physically combined/collocated. As previously described, said combined antennas 312 may provide one or more angle measurements (e.g., horizontal, vertical, or horizontal and vertical angle measurements, etc.).

The methods used to determine the position of, and/or distance to, a portable device 110 in this system 100 are similar to those used in the twenty-three (23) antenna AoA-RSSI system previously described.

For the purposes of disclosing this thirteen (13) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 60. One concern with this embodiment, as is evident in the illustration, may be that antenna placement may not provide for spatially-correlated RSSI differentials (i.e., there are antenna pairs that are not near one another, but that have radiation patterns that are opposite one another). In one embodiment with the illustrated sensor placement, some or all of the interior sensors 310 may have one antenna 312 placed inside measuring RSSI, and another placed outside measuring RSSI, in approximately the same location (e.g., inside and outside of the B-pillar or door handle), wherein each said sensor 310 acts and reports as two sensors 310 (one inside and one outside). Alternatively, additional antennas 312/sensors 310 may be used, or the antenna placement may be modified (as shown in the illustrated embodiment of FIG. 61).

Figure 61:
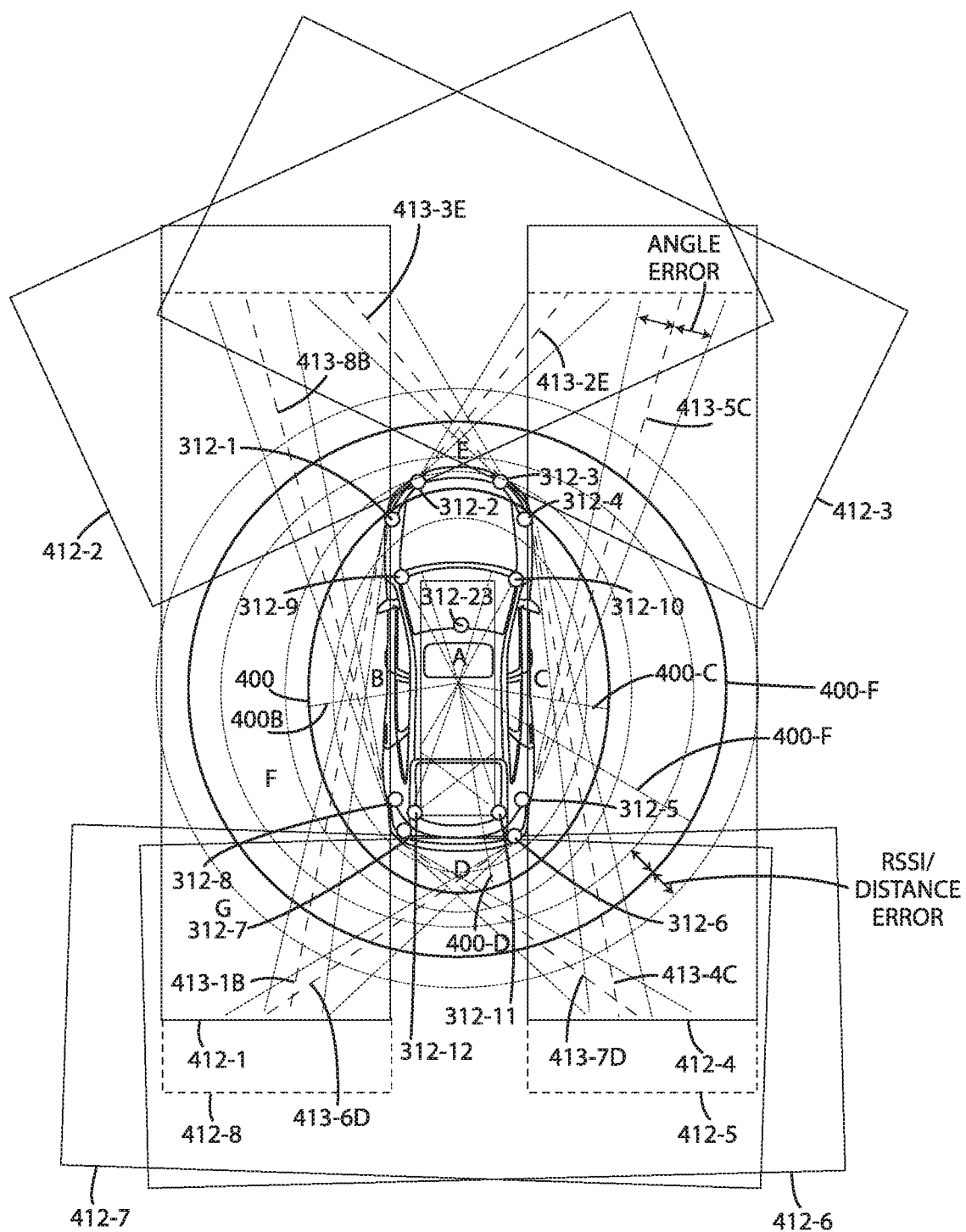
FIG. 61 shows a thirteen combined antenna vehicle microlocation system using angle of arrival and RSSI—alternate placement in accordance with one embodiment.

As described above, antenna placement may be modified in an alternate embodiment, for example to increase the number of spatially-correlated RSSI differentials that may be performed within the system 100, as shown in the illustrated embodiment of FIG. 61. In this system 100, for example, differentials may be computed between RSSI measurements of antennas 312-1 and 312-9, 312-7 and 312-12, 312-8 and 312-12, 312-6 and 312-11, and so on.

E.3.x Twelve (12) Antenna AoA-RSSI System (12 Combined)

The above thirteen (13) antenna AoA-RSSI system embodiment, without the center combined antenna (antenna 312-23).

E.3.y Fifteen (15) Antenna AoA-RSSI System (15 Combined)

Figure 62:
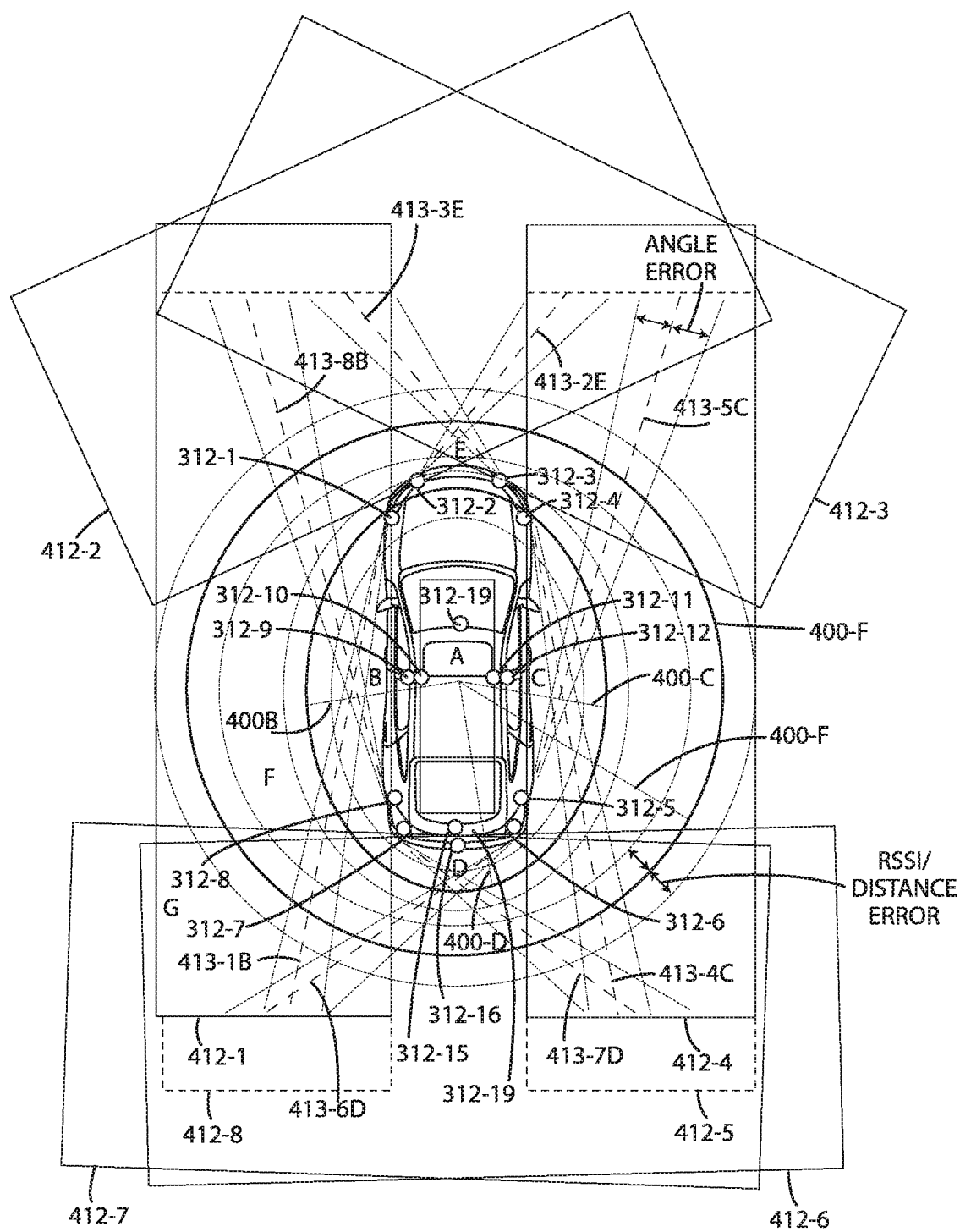
FIG. 62 depicts a fifteen combined antenna vehicle microlocation system using angle of arrival and RSSI in accordance with one embodiment.

In one embodiment of a vehicle microlocation system 100, shown for example in FIG. 62, the system 100 may use angle of arrival (AoA) and RSSI with fifteen (15) combined antennas 312. In this system 100, the antenna placements for an eight (8) antenna system, which is a variation of the twelve (12) antenna AoA system (as described in Section E.2.a, antennas 312-1 through 312-8) without inside antennas 312, and for a seven (7) antenna system (antennas 312-9 through 312-12, 312-15, 312-16, 312-19), which is a variation of the eleven (11) antenna RSSI system (as described in E.1.c) without rear driver side and rear passenger side antenna pairs (i.e., equivalent to the seven [7] antenna RSSI system described in E.1.b), are combined, but each antenna 312 is a combined antenna 312 (e.g., sensor 310) capable of reporting both angle and RSSI (either together or separately). As previously described, said combined antennas 312 (sensors 310) may comprise of one or more antennas 312 (or antenna arrays), and may or may not be physically combined/collocated. As previously described, said combined antennas 312 may provide one or more angle measurements (e.g., horizontal, vertical, or horizontal and vertical angle measurements, etc.).

In this system 100, antennas 312-9 through 312-12 may use the previously described placements, or alternately, they may be moved more towards the center of the sides of the vehicle 500, such as on or near the B-pillar or door handle.

The methods used to determine the position of, and/or distance to, a portable device 110 in this system 100 are similar to those used in the twenty-three (23) antenna AoA-RSSI system previously described.

For the purposes of disclosing this fifteen (15) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 61. A possible advantage of this antenna 312 placement configuration over the previously described thirteen (13) combined antenna system 100, is that each side has an additional centered combined antenna 312 that may be used to provide zone determination assistance and/or additional zone bounding.

E.3.z Eleven (11) Antenna AoA-RSSI System (11 Combined, Center)

Figure 63:
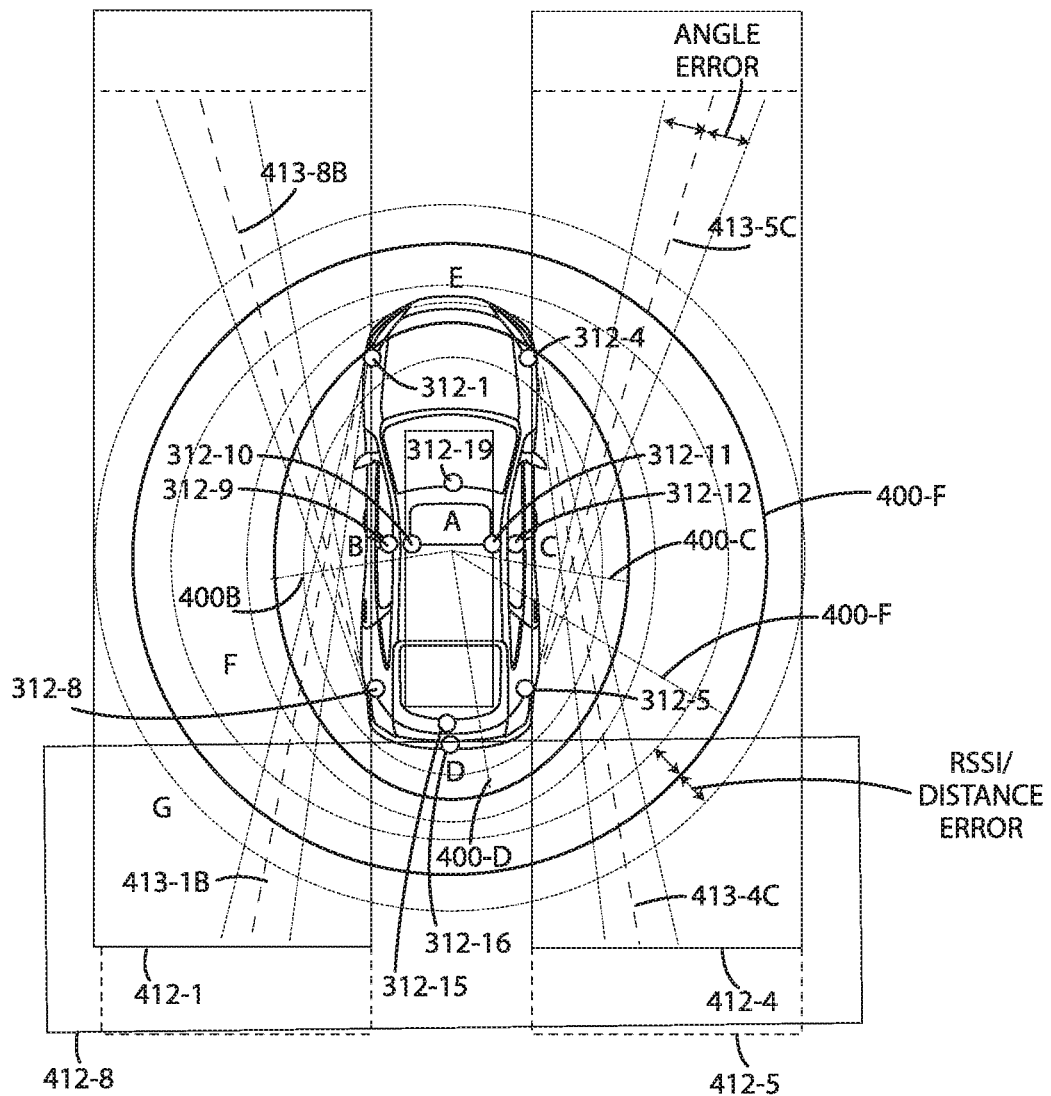
FIG. 63 depicts an eleven combined antenna vehicle microlocation system using angle of arrival and RSSI—centers in accordance with one embodiment.

The above fifteen (15) antenna AoA-RSSI system embodiment, without the front-facing front and rear-facing rear combined antennas (antennas 312-2, 312-3, 312-6, 312-7), as shown in the illustrated embodiment of FIG. 63.

E.3.aa Eleven (11) Antenna AoA-RSSI System (11 Combined)

Figure 64:
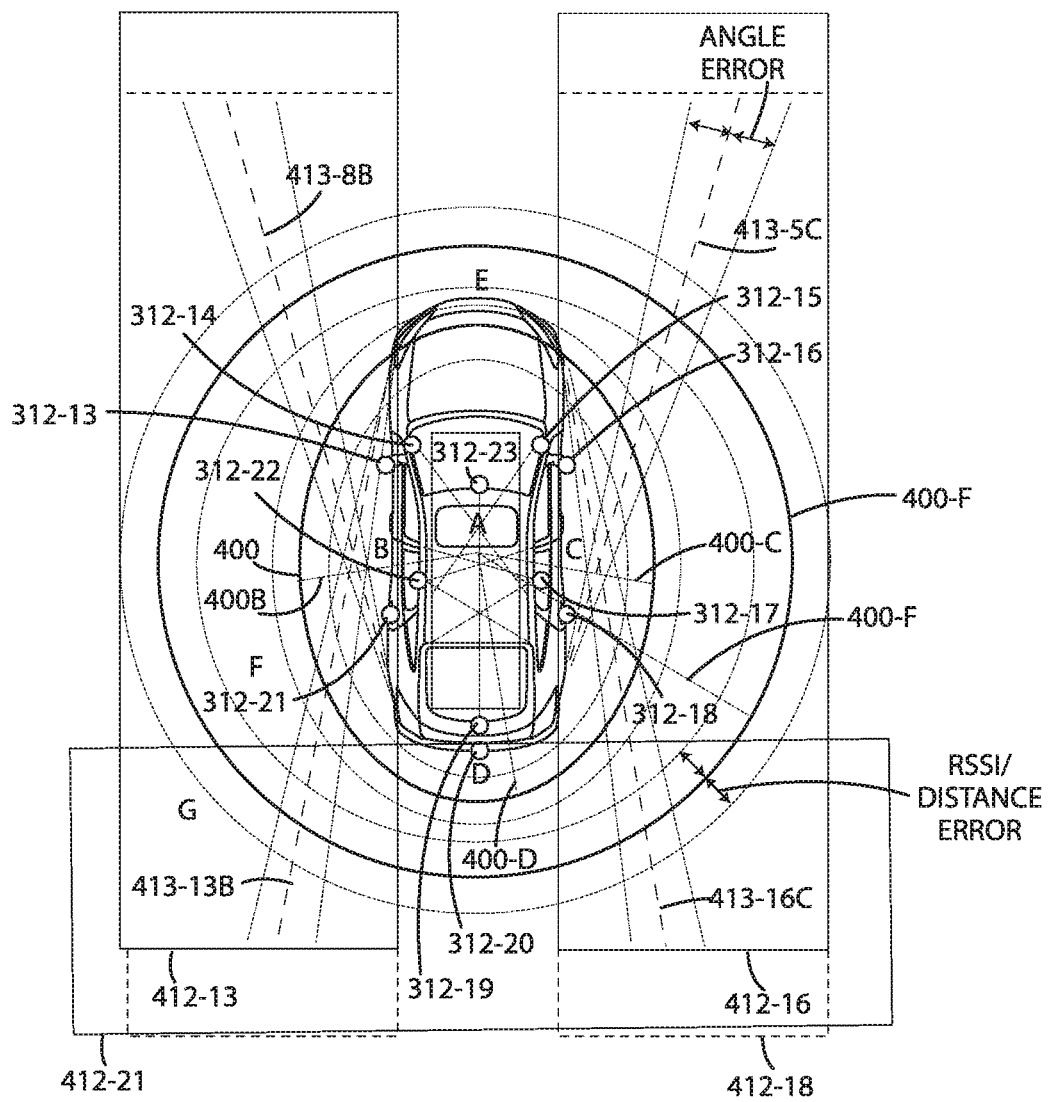
FIG. 64 depicts an eleven combined antenna vehicle microlocation system using angle of arrival and RSSI in accordance with one embodiment.

In one embodiment of a vehicle microlocation system 100, shown for example in FIG. 64, the system 100 may use angle of arrival (AoA) and RSSI with eleven (11) combined antennas 312. In this system 100, the antenna placements for the eleven (11) antenna RSSI system (as described in E.1.c) is used, but each antenna 312 is a combined antenna 312 (e.g., sensor 310) capable of reporting both angle and RSSI (either together or separately). As previously described, said combined antennas 312 (sensors 310) may comprise one or more antennas 312 (or antenna arrays), and may or may not be physically combined/collocated. As previously described, said combined antennas 312 may provide one or more angle measurements (e.g., horizontal, vertical, or horizontal and vertical angle measurements, etc.).

The methods used to determine the position of, and/or distance to, a portable device 110 in this system 100 are similar to those used in the twenty-three (23) antenna AoA-RSSI system previously described.

For the purposes of disclosing this eleven (11) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

The described set of potential zones 400, along with the field of view 412 of each AoA antenna, and example thresholds that may be used to define zones 400 for both AoA and RSSI antennas 312 (with measurement/approximation error markers), are depicted in the illustrated embodiment of FIG. 64.

E.3.bb Ten (10) Antenna AoA-RSSI System (10 Combined)

The above eleven (11) antenna AoA-RSSI system embodiment, without the center combined antenna (antenna 312-23).

E.3.cc Seven (7) Antenna AoA-RSSI System (7 Combined)

Figure 65:
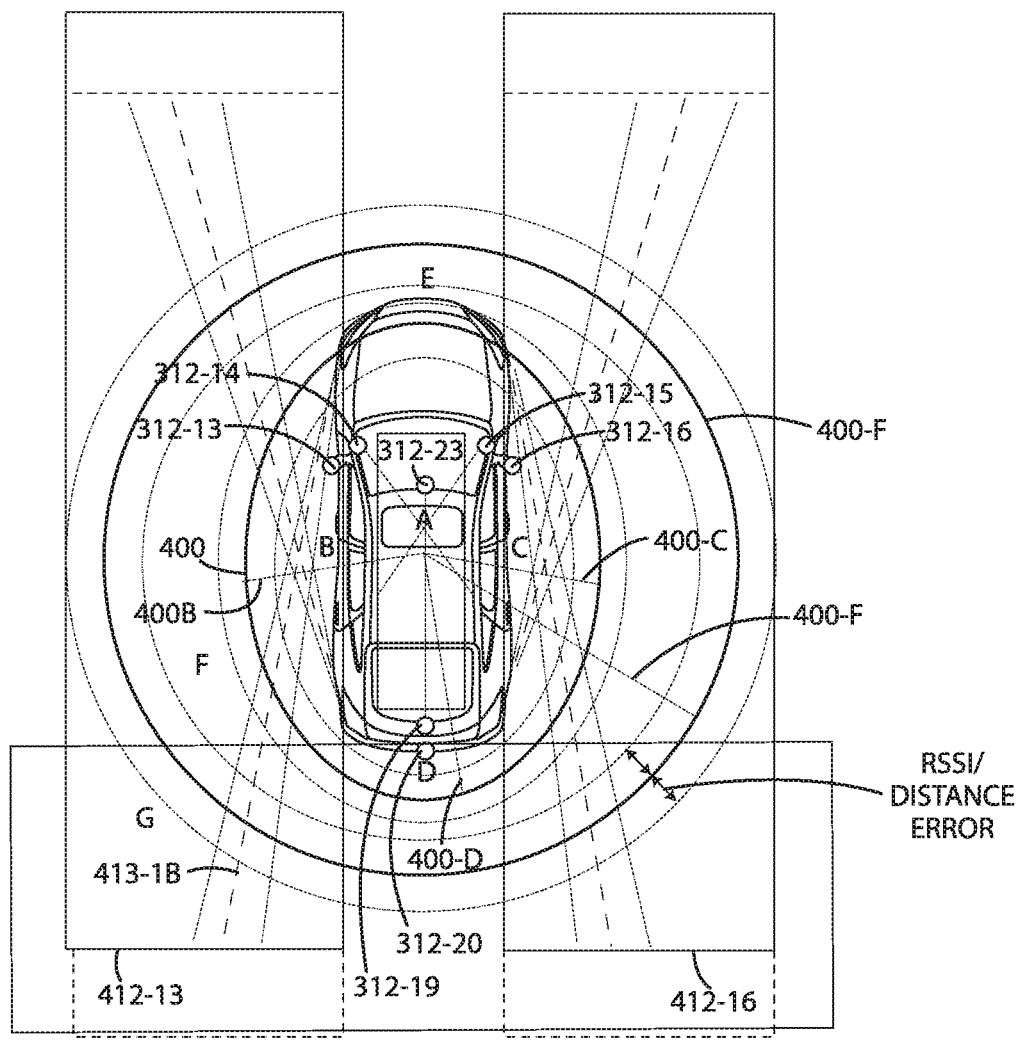
FIG. 65 depicts a seven combined antenna vehicle microlocation system using angle of arrival and RSSI in accordance with one embodiment.

In one embodiment of a vehicle microlocation system 100, shown for example in FIG. 65, the system 100 may use angle of arrival (AoA) and RSSI with seven (7) combined antennas. In this system 100, the antenna placements for the seven (7) antenna RSSI system (as described in E.1.b) is used, but each antenna 312 is a combined antenna 312 (e.g., sensor 310) capable of reporting both angle and RSSI (either together or separately). As previously described, said combined antennas 312 (sensors 310) may comprise one or more antennas 312 (or antenna arrays), and may or may not be physically combined/collocated. As previously described, said combined antennas 312 may provide one or more angle measurements (e.g., horizontal, vertical, or horizontal and vertical angle measurements, etc.).

The methods used to determine the position of, and/or distance to, a portable device 110 in this system 100 are similar to those used in the twenty-three (23) antenna AoA-RSSI system previously described.

For the purposes of disclosing this seven (7) antenna AoA-RSSI system, it is assumed that the set of potential zones 400 is the same set as described within the previously disclosed twenty-three (23) antenna AoA-RSSI system; however, as also previously disclosed, the system 100 may use additional and/or fewer zones 400, with the same or different boundaries/definitions.

The described set of potential zones 400, along with the field of view 412 of each AoA antenna 312, and example thresholds that may be used to define zones 400 for both AoA and RSSI antennas 312 (with measurement/approximation error markers), are shown in the illustrated embodiment of FIG. 65.

E.3.dd Six (6) Antenna AoA-RSSI System (6 Combined)

The above six (6) antenna AoA-RSSI system embodiment, without the center combined antenna 312 (antenna 312-23).

E.3.ee Other Systems

The above sections describe a number of AoA-RSSI system embodiments, but there are many alternate configurations that are not described above (with fewer or additional antennas 312, using any combination of positioning approaches described herein). For example, using time-of-flight-/time-of-arrival-(TOF/TOA) and/or time-difference-of-arrival (TDOA)-based distance measurement (described herein) may allow systems with fewer antennas 312, if using the same radios as existing antennas 312 (or alternately, more antennas 312, if new radios are utilized). For example, a configuration using a mixture of RSSI-only, angle-only, and combined (both RSSI and angle) sensors 310/antennas 312 is not explicitly described; however, it is clear from the set of embodiments that are described, that said embodiments may exist, and what methods may be used to assemble and place said sensors 310/antennas 312, compute portable device 110 position and/or distance, define and determine zones 400, combine methods, mitigate vulnerabilities, and so on.

In the case of each embodiment, the system 100 may, alternately or additionally, determine the zone 400 in which the portable device 110 is located using a trilateration-, multilateration-, multiangulation-, or multiangulateration-based approach, or any combination thereof (described herein).

In the case of each embodiment, the system 100 may, alternately or additionally, determine distance using a time-of-flight-/time-of-arrival- (TOF/TOA) and/or time-difference-of-arrival (TDOA)-based approach (described herein).

E.3.ff Triangulation (Multiangulation), Trilateration, Multilateration, and Triangulateration (Multiangulateration)

The above AoA-RSSI systems are described in terms of combining the methods disclosed for RSSI-only and angle-only systems. It is assumed that only RSSI measurements (or distance measurements [computed from RSSI measurements]) are available to determine position in RSSI-only systems. It is assumed that only angle measurements are available to determine position in angle-only systems. In AoA-RSSI systems, both measurements may be available. With angle measurements available from many antennas 312/sensors 310, multiangulation (including triangulation) may be performed. With both measurements available from many antennas 312/sensors 310, multiangulateration (including triangulateration) may be performed.

It is noted that this section focuses upon trilateration, multilateration, multiangulation, and multiangulateration positioning methods and their supporting methods, and thus, the methods are described relative to these positioning methods; however, said methods may be used with any of the previously described RSSI, AoA, and AoA-RSSI methods.

Multiangulation, or simply angulation, may use two or more angles, with each angle associated with a known reference position, to compute an unknown position (in this case, of a portable device 110) in a reference coordinate system (described herein). The reference coordinate system is simply a means to define the position each antenna 312/sensor 310, the computed position of the portable device 110, and various zones 400 or attributes of the vehicle 500 (as described herein). Because each angle is associated with a particular antenna 312/sensor 310 position, the inputs (angulation inputs) to a multiangulation algorithm may also be expressed as <angle, position> pairs. It is noted, that as described herein, <angle> may be an angle relative to a horizontal axis, a vertical axis, or any other axis, or in-fact, multiple angle measurements (e.g., <$angle_H$, $angle_V$> from both horizontal and vertical axes). Triangulation is multiangulation that involves three (3) positions: a third position is computed using two <angle, position> pairs. As such, all references to triangulation, angulation, and/or multiangulation in this disclosure may refer to any or all of triangulation, angulation, or multiangulation. For example, unless specified otherwise, all references to triangulation may actually refer to triangulation and/or multiangulation/angulation.

Trilateration, despite its name, may use two or more distances (e.g., three or more), with each distance associated with a known reference position, to compute an unknown position (in this case, of a portable device 110) in a reference coordinate system (described herein). Because each distance is associated with a particular antenna 312/sensor 310 position, the inputs (trilateration inputs) to a trilateration algorithm may also be expressed as <distance, position> pairs. Trilateration is different from multilateration, and thus, it is noted that trilateration is not multilateration with three positions.

Multilateration, or MLAT, may use two or more (e.g., three or more) distance deltas (the difference in computed distance), with each delta distance associated with two known reference positions, to compute an unknown position (in this case, of a portable device 110) in a reference coordinate system (described herein). Because each distance delta is associated with two particular antenna 312/sensor 310 positions, the inputs (multilateration inputs) to a multilateration algorithm may also be expressed as <distance delta, positions, position2> pairs. Although multilateration may be used with a time difference of arrival (TDOA)-based delta distance measuring approach, other delta distance measuring approaches, such as the sniffing approach described herein, may be used. Multilateration is different from trilateration, and thus, it is noted that multilateration is not the generalization of trilateration.

Multiangulateration, or simply angulateration, is the combination of multiangulation and trilateration methods, which uses any number of <angle, distance> pairs, with each pair associated with a known reference position, to compute an unknown position (in this case, of a portable device 110) in a reference coordinate system (described herein). Multiangulateration approaches using multilateration (instead of trilateration) may also be used, but such an approach is not explicitly described herein. Because each <angle, distance> pair is associated with a particular antenna 312/sensor 310 position, the inputs to a multiangulateration algorithm may also be expressed as <angle, distance, position> triplets. It is noted, that as described herein, <angle> may be an angle relative to a horizontal axis, a vertical axis, or any other axis, or in-fact, multiple angle measurements (e.g., <$angle_H$, $angle_V$> from both horizontal and vertical axes). Triangulateration is multiangulateration that combines triangulation and trilateration: a third position is computed using two <angle, distance, position> triplets. As such, all references to triangulateration, angulateration, and/or multiangulateration in this disclosure may refer to any or all of triangulateration, angulateration, or multiangulateration. For example, unless specified otherwise, all references to triangulateration may actually refer to triangulateration and/or multiangulateration/angulateration.

RSSI-only-based systems may use trilateration and/or multilateration. Angle-only-based systems may use multiangulation. AoA-RSSI systems may use multiangulation, multiangulateration, trilateration, multilateration, or any combination thereof.

It is noted that distance may be computed from RSSI or angle (via multiangulation); therefore, wherever distance is used, RSSI or angle (or any other unit/derivation of RSSI or angle) may be substituted and/or added; likewise, wherever RSSI or angle (or any other unit/derivation of RSSI or angle) is used, distance may be substituted and/or added. There exist methods where distance is determined without relying upon RSSI or angle, such as via time-of-flight (TOF) and time-difference-of-arrival (TDOA); the usage of RSSI, angle, and/or distance in this disclosure is not intended to limit or prevent the usage of TOF, TDOA, or alternate methods, and as such, wherever distance, RSSI, and/or angle is used in reference to distance measurement/evaluation, distance may refer to distance computed by such alternate methods, and RSSI or angle may be substituted with the source measurement (e.g., time, delta time, etc.).

As described herein, in an AoA-RSSI system, related (correlated) angle and distance measurements (e.g., angle and RSSI measurements from the same position) may be referred to as <angle, distance> pairs, which may be provided, as described above, via one sensor 310 using one or more antennas 312 (e.g., from a sensor 310 with one antenna array that provides both angle and distance, from a sensor 310 with an antenna array that provides angle and another antenna 312 that provides distance, from a sensor 310 with multiple antenna arrays that provides multiple <angle, distance> pairs, etc.), via multiple sensors 310 using one or more antennas 312 (e.g., one sensor 310 may provide angle and another nearby sensor 310 may provide distance, etc.), or any combination thereof. It is noted, that as described herein, <angle> may be an angle relative to a horizontal axis, a vertical axis, or any other axis, or in-fact, multiple angle measurements (e.g., <$angle_H$, $angle_V$> from both horizontal and vertical axes). Any given sensor 310 may report multiple <angle, distance> pairs (e.g., one sensor 310 may be connected to multiple antennas 312, with each antenna 312 located with different fields of view and/or in different positions on the equipment [e.g., inside and outside], etc.). In an AoA-RSSI system using the sniffing approach described herein, <angle, distance> pairs may be obtained from the same signal transmission across many antennas 312 and thus may be additionally temporally-, frequency-, and spatially-correlated. Some positioning algorithms may benefit from such <angle, distance> pairs, such as multiangulateration-based algorithms. The <distance> component may include a distance relative to the portable device 110 (absolute or delta), a distance relative to one or more other antennas 312/sensors 310 (e.g., delta distances, similar to a delta-based multilateration approach), or any combination thereof. Similarly, the <angle> component may include one or more angles relative to the portable device 110 (absolute or delta), one or more angles relative to one or more other antennas 312/sensors 310 (e.g., delta angles, similar to a delta-based multilateration approach), or any combination thereof. In the provided example embodiments, antenna 312/sensor 310 position (and corresponding position information) is fixed (static); however, alternate embodiments exist where antenna/sensor position may be partially dynamic (i.e., may move from one position to some number of other positions based upon equipment state [e.g., an antenna 312/sensor 310 on a door 142, etc.]) or fully dynamic (i.e., corresponding position information is determined in real-time [e.g., by alternate systems/methods, by using other fixed antennas 312/sensors 310, etc.]).

The previously described embodiments determine the position of a portable device 110 relative to defined zones 400 in and around a vehicle 500. A trilateration-, multilateration-, multiangulation-, or multiangulateration-based method may also determine the position of a portable device 110 relative to zones 400 defined in and around a vehicle 500, and thus, may be combined with, or used instead of, any previously described methods (e.g., by using the trilateration, multilateration, multiangulation, and/or multiangulateration results as an additional input into the agreement algorithm (i.e., combination method[s]) amongst each positioning method [e.g., RSSI-based, angle-based, AoA-RSSI, etc.], by using only trilateration, multilateration, multiangulation, and/or multiangulateration [requiring no combination method], etc.). Alternatively, or additionally, an AoA-RSSI system using trilateration, multilateration, multiangulation, and/or multiangulateration, may report the determined portable device 110 position relative to the vehicle 500 in its reference coordinate system (described herein). Alternatively, or additionally, an AoA-RSSI system using trilateration, multilateration, multiangulation, and/or multiangulateration may report the distance to the vehicle 500 from the determined portable device 110 position.

There exist embodiments using any combination of multiangulation, multiangulateration, multilateration, and trilateration methods, including embodiments that use previously disclosed RSSI, AoA, and combined AoA-RSSI methods to determine the position of a portable device 110. For example, an embodiment of an AoA-RSSI system that additionally uses multiangulation to determine the zone 400 in which a portable device 110 is located and/or compute its relative distance.

Similar to other embodiments, the portable device 110 communicates with a master device 120 located on the interior of the vehicle 500 that is separate from the antennas 312/sensors 310 that measure angle and RSSI/distance.

In trilateration-, multilateration-, multiangulation-, and multiangulateration-based methods, positions are expressed using the system's reference coordinate system (e.g., a 2D Cartesian [x, y] coordinate system with [0, 0] defined at the center of the vehicle 500, a 3D Cartesian [x, y, z] coordinate system with [0, 0, 0] defined at the center of the vehicle 500, a 2D polar [angle, distance] coordinate system with [0°, 0] defined at the center of the vehicle 500, a 3D polar coordinate system, etc.). The position of each trilateration, multilateration, angulation, and/or angulateration input (e.g., antenna 312/sensor 310, as described above), as well as the computed position of the portable device 110, is expressed relative to the reference coordinate system (e.g., sensor 1 is located at [−4, −4], sensor 2 is located at [4, 4], sensor 3 is located at [0, 0], and so on). Position units used within the reference coordinate system may be arbitrary and may have any desired precision (or lack of precision): the unit may be meters with floating-point values that reflect actual position relative to the center of the vehicle 500 (e.g., sensor 1 is located at [−1.1 m, 1.4 m], which may simplify implementation, if the goal is to determine and report a position in the reference coordinate system and/or distance), the unit may be undefined with integer values that reflect relative position relative to the center of the vehicle 500 (e.g., sensor 1 is located at [−4, 4], requiring a conversion to a real unit of measure, if such an operation is considered necessary), or a combination of both (comprising units that reflect actual position and undefined arbitrary values), such as a 3D Cartesian system where x and y are defined in meters, and z in terms of high, center, and low (e.g., [−1.1 m, 1.4 m, center]).

In trilateration-, multilateration-, multiangulation, and multiangulateration-based methods, where portable device 110 position is reported in terms of presence within a particular zone 400, the boundaries of each zone 400 are defined relative to the system's reference coordinate system. The system may determine zero or more zones 400 in which the portable device 110 may be located by using the determined portable device 110 position and the defined zone boundaries to report the one or more applicable zones 400. Zone boundaries may be defined by any means (e.g., bounding coordinates, center coordinate plus radius, anchor coordinates plus formulas, list of coordinates and/or coordinate ranges, etc.) to represent any shape (e.g., rectangular, circular, triangular, parallelogram, pentagon, etc.).

Figure 66:
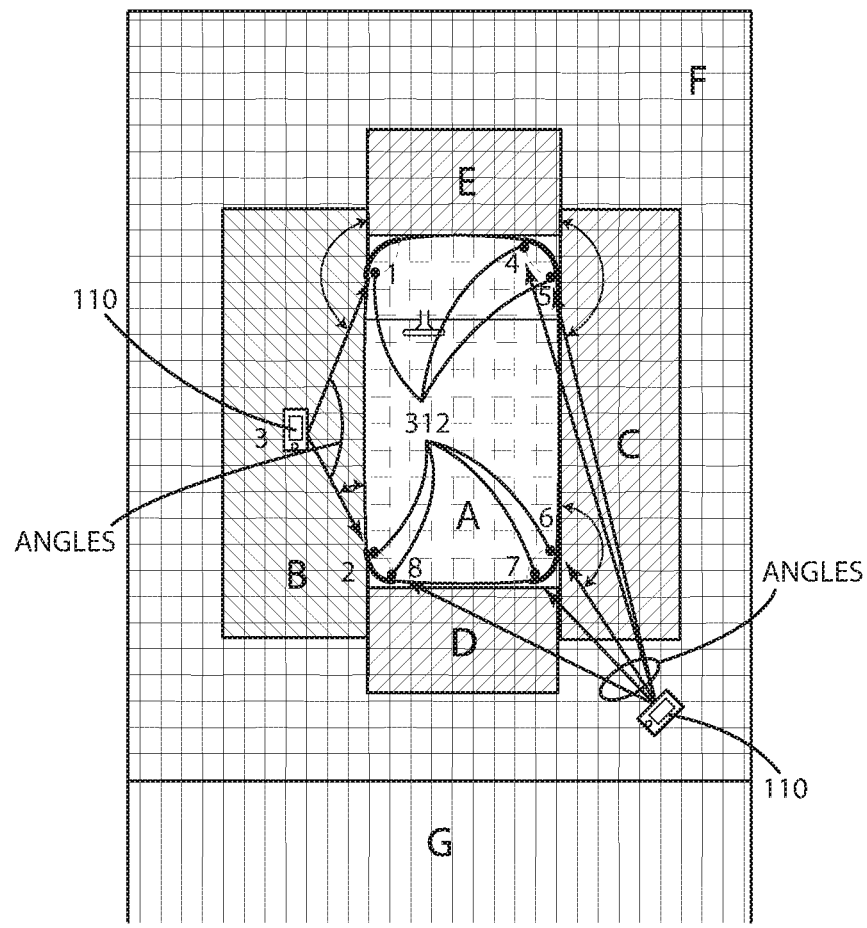
FIG. 66 depicts multiangulation and triangulation using angle of arrival and RSSI in accordance with one embodiment.
Figure 67:
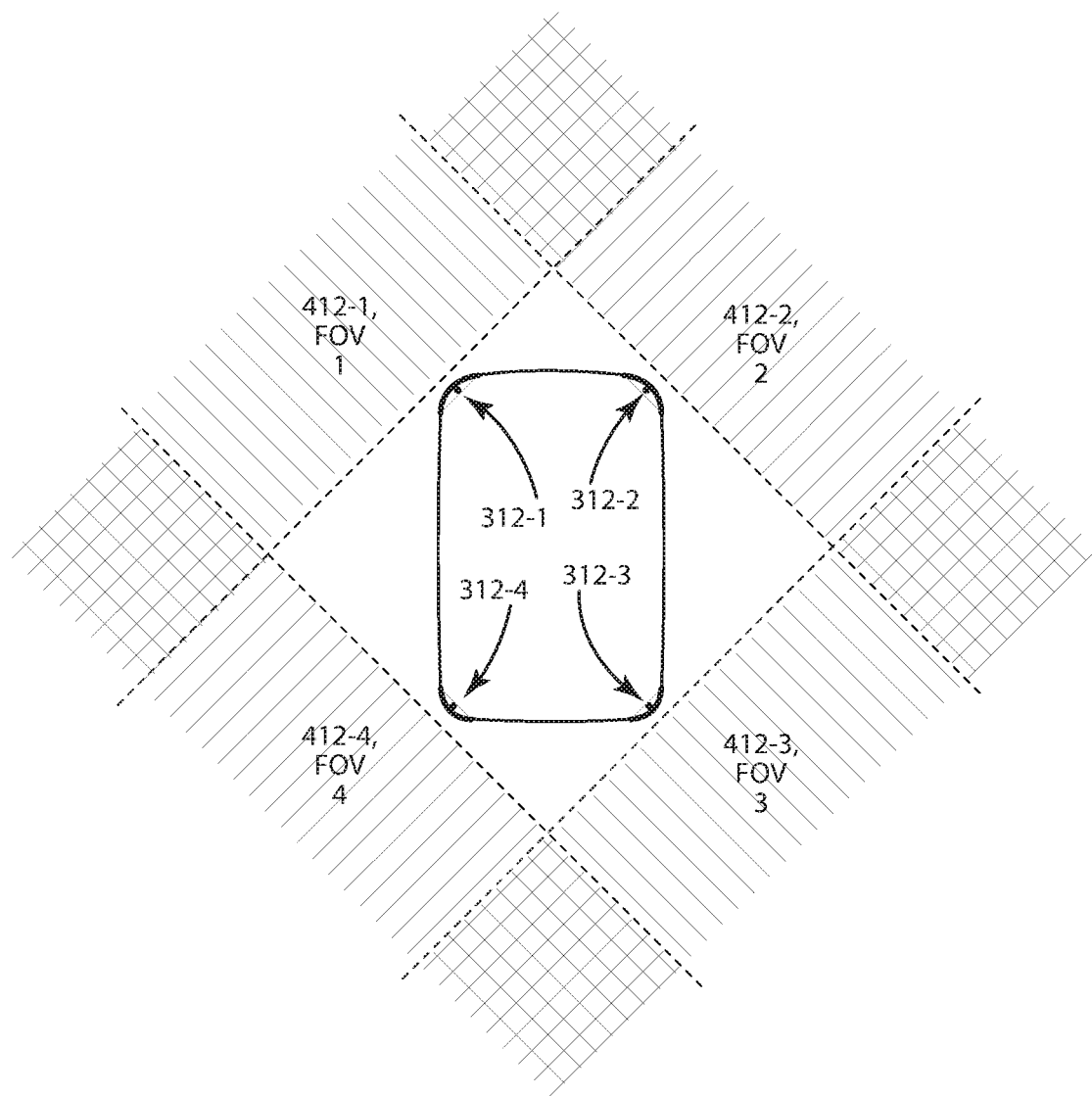
FIG. 67 shows alternate exterior antenna configurations using angle of arrival (4 antennas) in accordance with one embodiment.

An example 2D Cartesian reference coordinate system is shown in the illustrated embodiment of FIG. 66; in addition to a depiction of the reference coordinate system itself, the figure includes two example computed portable device 110 positions (determined using triangulation and multiangulation with five [5] angulation inputs) and several example rectangular zones 400.

The depicted example zones 400 are similar to those in the other disclosed systems: A) inside, B) outside near driver side, C) outside near passenger side, D) outside near tailgate/trunk, E) outside near front, F) not near the vehicle 500, but within one or more secondary thresholds, G) not near the vehicle 500, but connected, and H) not connected (not shown).

Similar to other disclosed systems, additional (or fewer) zones 400 may be defined, with varying levels of accuracy. For example, inside zones 400 may be added, another outside zone 400 may be defined outside of the near zones 400, that extends further away from the vehicle 500, zone F may not exist, or additional near zones 400 at various positions may be defined. Vertical zones 400 may also be defined, also with varying levels of accuracy. For example, low, medium, and high vertical zones 400 may be defined for near zones 400. The ability of the system 100 to accurately determine whether or not the device is located within what zone 400 may be limited by the underlying capabilities of the communications medium (e.g., BLE vs. UWB vs. LF) and accuracy of RSSI and angle measurement facilities (e.g., measurement/approximation error).

The system 100 may determine the position of a portable device 110 relative to a reference coordinate system by combining a set of zero or more portable device 110 positions computed using trilateration, multilateration, multiangulation, multiangulateration algorithms (i.e., using three or more angulation inputs), or any combination thereof. For example, the system 100 may compute a position of the portable device 110 using triangulation using just one pair of angulation inputs, as shown in the following figure using antennas 312-1 and 312-2. For example, the system 100 may produce many computed positions of the portable device 110 using triangulation across the many pairs in a set of angulation inputs, as shown in the following figure using antennas 312-4 through 312-8. For example, the system 100 may compute a position of the portable device 110 using a 5-input multiangulation algorithm, as shown in the following figure using antennas 312-4 through 312-8.

The set of trilateration, multilateration, angulation, and/or angulateration inputs used to compute a position may vary for the same reasons, and in the same ways, that the sets of antennas 312 in RSSI- and angle-based methods may vary. In one embodiment using multiangulation, the system 100 always includes all angulation inputs in the set from which to compute portable device 110 positions. In an alternate embodiment using multiangulation, for example, if the portable device 110 is determined to be in zone A using other methods, the system 100 may use only inside angulation inputs to compute portable device 110 positions. In an alternate embodiment, for example, if the portable device 110 is determined to be in zone B using other methods, the system 100 may use only driver side angulation inputs to compute portable device 110 positions.

The combination of inputs from within a set of trilateration, multilateration, angulation, and/or angulateration inputs may vary for the same reasons, and in the same ways, that the sets of differentials and thresholds in RSSI- and angle-based methods may vary. For example, angulation inputs may be absent, not satisfy a threshold (e.g., too weak), or be unsteady/inconsistent, in which case, said angulation inputs may be ignored within or removed from the angulation input set. In one embodiment using triangulation, the system 100 always computes a portable device 110 position for each unique angulation input pair in the angulation input set. In an alternate embodiment using multiangulation, for example, specific combinations of angulation inputs may be used to compute a portable device 110 position in different angulation input sets.

In an embodiment where multiple methods (trilateration, multilateration, angulation, and/or angulateration) are used to compute position, one method may be adjusted based upon the set of inputs or outputs from another method, or one method may be given priority over another method based upon the set of inputs or outputs (e.g., if certain inputs are not available/valid, trilateration may be used instead of triangulation, etc.).

The set of computed portable device 110 positions may be combined to yield a single (combined) computed portable device 110 position by computing the centroid of the set, determining a median position within the set, clustering (e.g., k-means, by threshold, etc.) positions within the set and selecting the cluster with the most positions, requiring all positions to be the same or near one another (i.e., within one or more thresholds of one another), any other method, or any combination thereof. If the input set was empty (i.e., there are no computed portable device 110 positions), or the computed positions vary too much, the system 100 may report the combined computed portable device 110 position as unknown.

In an embodiment where multiple methods (trilateration, multilateration, angulation, and/or angulateration) are used to compute position, a combined computed portable device 110 position may exist for each method. Each said combined computed portable device 110 position may be reported or used in subsequent processing, or alternately, or in addition, they may be combined, using any of the aforementioned methods to yield a single combined computed portable device 110 position that encapsulates multiple positioning methods.

In one embodiment, using the combined computed portable device 110 position, the zone 400 in which the portable device 110 is located may be selected using the defined zone boundaries (e.g., no overlapping zone boundaries). In an alternate embodiment, the portable device 110 position may be mapped to more than one zone 400 (e.g., overlapping zone boundaries), in which case, amongst the set of possible zones 400, the most probable possible zone 400 (e.g., zone 400 that is most consistent with the last known portable device 110 position, etc.) may be selected as the determined zone 400 (or, alternatively, all possible zones 400 reported).

Alternately, or in addition, a set of possible zones 400 in which the portable device 110 is located may be formed that includes of all zones 400 in which the portable device 110 may be located using the defined zone boundaries across all computed portable device 110 positions; from the resultant set of possible zones 400, the most probable possible zone 400 (e.g., zone 400 with the most duplicates in the set, zone 400 that is most consistent with the last known portable device 110 position, any other method, or any combination thereof) may be selected as the determined zone 400 (or, alternatively, all unique possible zones reported). This approach is the same whether or not overlapping zone boundaries may be present.

The system 100 may use both approaches (described above, i.e., combining-then-determining [using the combined computed portable device 110 position] vs. determining-then-combining [using the set of computed portable device 110 positions [not combined]]) to generate sets of possible zones 400 simultaneously or at different times. If both approaches are used simultaneously, requiring agreement between said zone determination approaches may provide additional protection against an incorrect zone determination (such as when the computed portable device 110 positions vary significantly). The sets of possible zones 400 generated by each approach may be combined into a single set of possible zones 400 prior to subsequent processing steps (using any combination method, some of which are described below), or they may not be combined, simply resulting in additional sets of possible zones 400 to be processed in subsequent steps.

In an embodiment where multiple methods (trilateration, multilateration, angulation, and/or angulateration) are used to compute position, a set of possible zones 400 (which may just be the determined zone 400) may exist for each method. Each said set of possible zones 400 may be reported or used in subsequent processing, or alternately, or in addition, they may be combined to yield a single combined set of possible zones 400 (which may be just the determined zone 400) that encapsulates multiple positioning methods. The sets of possible zones 400 may be combined by simply concatenating each method's set of possible zones 400 and then removing duplicate entries, by building a set of possible zones 400 that includes only zones 400 that are present in each set of possible zones 400 (or that are present in one or more other sets of possible zones 400), by building a set of possible zones 400 that only include zones 400 that are adjacent to one another, by building a set of possible zones 400 that are probable or possible given the current position of the portable device 110, or any other method, or any combination thereof.

In one embodiment, a single determined zone 400 may be reported as a result of the trilateration, multilateration, angulation, and/or angulateration process. If the combined computed portable device 110 position is unknown, or there were no computed portable device 110 positions (i.e., there are no non-empty sets of possible zones 400), the system 100 may select an appropriate zone 400 (e.g., zone G), report that it was unable to determine a zone 400, or any combination thereof. If two or more unique possible zones 400 remain after the aforementioned processing, the system 100 may select one of them to report as the determined zone 400 using any of the disclosed zone selection methods, select an appropriate zone 400 (e.g., zone G, the zone 400 that encompasses all possible zones 400, etc.), report that it was unable to determine a zone 400, or any combination thereof. In an alternate embodiment, more than one determined zone 400 may be reported, in which case, the system 100 may report all possible zones 400 or a subset of the possible zones 400 (e.g., the system 100 may perform any of the above described filtering on the set of possible zones 400 prior to reporting).

In embodiments where multiple methods (trilateration, multilateration, angulation, and/or angulateration) are used to compute position, the results of each positioning method may be reported individually (as described above). In an alternate embodiment, the results of all trilateration, multilateration, angulation, and/or angulateration methods may be combined and/or reported using any of the methods described above.

In one embodiment, the system 100 may provide, for each reported zone 400, a correctness likelihood indicator (e.g., a confidence score/metric, a likelihood score/metric, probability relative to other reported zones 400 and/or the current zone 400, etc.).

The system 100 may report the distance to the combined computed portable device 110 position from the center of the vehicle 500 (and/or one or more other reference positions, such from the skin of the driver, passenger, and/or rear cabin). In embodiments where multiple methods (trilateration, multilateration, angulation, and/or angulateration) are used to compute position, such distances may be reported for each method. In an alternate embodiment, the computed distances of all trilateration, multilateration, angulation, and/or angulateration methods may be combined using any of the above described methods (e.g., averaging, median, minimum, maximum, clustering, etc.).

Positioning results (within one method or amongst multiple methods) may be combined/filtered using any combination of disclosed methods, including, but not limited to, the subsequently disclosed combination methods, Kalman filters, particle filters, probabilistic estimation/filters, fingerprinting, and heuristics.

As described herein, the reported results of trilateration, multilateration, angulation, and/or angulateration methods may be integrated into the described RSSI, AoA, or AoA-RSSI systems.

E.3.gg TOF (Time-of-Flight) and TDOA (Time-Difference-of-Arrival)

Distance measurement may be considered a useful aspect of RSSI, AoA, and AoA-RSSI systems. Distances may be used in zone 400 determination processes, reported to users or other actors of or within the system 100, or used for other purposes in the system 100 (e.g., when to apply certain security restrictions, when to transition from one state or connection strategy to another, when to transition to/from idle, low-power, long-range, near, or other operating modes, etc.).

The accuracy and precision of distance computed from RSSI is limited by the underlying capabilities of the communications medium (e.g., BLE vs. UWB vs. LF) and accuracy of RSSI and angle measurement facilities (e.g., measurement/approximation error).

The accuracy and robustness of the system's distance measurement methods are as much contributors to system security as they are to user experience. For example, distance may be used to distinguish between near (passive entry) and far (approach) zones 400. The vehicle 500 may allow the user to passively unlock and/or enter their vehicle 500 when in a near zone 400, but not when in a far zone 400. Inaccuracies or vulnerabilities in the distance measurement approach may result in undesired user-facing behavior, such as not allowing the vehicle 500 to unlock when the user is actually within a near zone 400, or security concerns, such as allowing the vehicle 500 to unlock when the user is actually in a far zone 400. This necessitates the use of secure ranging approaches, such as distance-bounding, as described herein in this disclosure.

As described herein in this disclosure, RSSI and angle measurements may be vulnerable to reflectors and blockers; in turn, distance computed from RSSI or angles may be vulnerable to reflectors and blockers. Some communications mediums are not (or are less) vulnerable to reflections and attenuations from materials that may exist in the environments in which people and vehicles 500 operate (e.g., UWB, LF); however, BLE, for example, is vulnerable, as it is reflected and attenuated by common materials (e.g., metal, wood, water, concrete, etc.). In vulnerable communications mediums, reflectors and blockers may be placed strategically by malicious actors to increase or decrease the distance computed by the system 100 to their possible advantage.

RSSI and angle measurements are also vulnerable to relay attacks, where an actor receives and re-transmits signals from a portable device 110 using another portable device 110 (e.g., allowing the actor to gain access to the vehicle 500 without the authorized portable device 110 actually being near the vehicle 500).

The distance measurement methods using RSSI and angle measurements described within this disclosure defend against such vulnerabilities, for example by computing distance using a number of antennas 312 and then intelligently combining the results, but said methods do not entirely mitigate said vulnerabilities. For example, a person standing between the portable device 110 and the system of antennas 312 (e.g., vehicle 500) may influence the distance measurement significantly (despite our ability to still determine that the portable device 110 is near the vehicle 500).

Instead of using RSSI and angle measurements to compute distance, distance may be computed using the time-of-flight/time-of-arrival (TOF/TOA) or time-difference-of-arrival (TDOA) of signals from the portable device 110 at various antennas 312. Such approaches may not be, or may be significantly less, vulnerable to reflectors and blockers (since distance is computed based upon propagation time, which varies very little due to reflectors and blockers). Such approaches, in systems that employ adequate (to the communications medium) timing requirements, may also not be, or may be significantly less, vulnerable to relay attacks, since propagation time is precisely measured, and propagation time may be significantly faster than the time utilized for an attacker to relay the signal to/from the portable device 110. Some systems may incorporate additional hardware/radios to perform more accurate distance measurement (e.g., a combined BLE/UWB system, or a BLE/LF system, etc.). Some systems may incorporate proprietary or custom communications protocols using standard hardware/radios (e.g., a custom [possibly non-BLE] protocol on BLE hardware, etc.).

RSSI-based, angle-based, and AoA-RSSI systems may perform distance measurements using TOF/TOA and/or TDOA, in addition to, or in place of, RSSI- and/or angle-based methods. For example, a BLE-based system that uses TOF on BLE hardware, RSSI, and angle-based methods. For example, a BLE-and-UWB-based system that uses UWB and/or TOF on BLE hardware, RSSI, and angle-based methods, based upon which is available in the portable device 110. For example, a BLE-and-LF-based system that uses LF and/or TOF on BLE hardware, RSSI, and angle-based methods, based upon which is available in the portable device 110. For example, a BLE-and-UWB-and-LF-based system that uses UWB, LF, and/or TOF on BLE hardware, RSSI, and angle-based methods, based upon which is available in the portable device 110.

TOF-/TOA- and/or TDOA-based distance measurements may be used within any of the positioning methods described within this disclosure. In one embodiment, such distance measurements may be used as a substitute for RSSI (or any other value related to or derived from RSSI, e.g., by converting distance to RSSI to avoid, supplement, or replace traditional RSSI measurement [e.g., if traditional RSSI measurements are unavailable or may not be used]).

DIY/hobbyist/prototyping microlocation system.

In one embodiment, one or more components of the above described system 100 may be made available for purchase, without the said components being allocated to a particular application (other than what the purchaser decides). The embodiment may allow experimentation, education, evaluation, and prototyping using the pre-packaged system components. Users may purchase system components and assemble them in a configuration that meets their needs. The user may then integrate this configuration with other systems.

The present disclosure, according to one embodiment, provides a means for people to easily build application-specific microlocation systems. Microlocation systems may be configured to precisely determine the location of a device relative to a set of antennas 312/sensors 310 (e.g., embedded in a product [e.g., vehicle 500, door lock, ATM, etc.] or as part of a service [e.g., shopping, museum, etc.]).

Conventional location systems may use beacons and try to either determine to which beacon a device is closest using RSSI, or to attempt to trilaterate using a set of RSSIs measured from different beacons at different times in different locations using different signals (each sensor 310 having only one antenna 312). These systems are vulnerable to inconsistency introduced by their spatial and temporal differences (e.g., objects moving in the environment that attenuate or reflect signals, such as the human body or metallic objects). One or more embodiments according to the present disclosure differ, in that, for a given sensor 310, we are measuring RSSIs obtained from potentially multiple antennas 312 for the same signal at, for all intents and purposes, the same time, in the same location). When used in conjunction with the systems and methods described in U.S. Provisional Appl. No. 62/323,262 to Raymond Michael Stitt, filed Apr. 15, 2016, and entitled SYSTEM AND METHOD FOR ESTABLISHING REAL-TIME LOCATION (the disclosure of which is incorporated herein by reference in its entirety), the system 100 may obtain these measurements at the same time from all sensors 310 for a given device. The spatial and temporal correlation of antennas 312 for virtual boundary sensors and measurements in this system 100 may lessen the environmental effects that impact traditional sensors (fast-fading effects, moving objects, constructive/destructive interference, etc.) and produces more consistent data sets (allowing some effects to be isolated and/or turned into fingerprinting advantages).

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A system for establishing location information with respect to a portable device and a vehicle, the system comprising:
  a master device disposed in a fixed position relative to the vehicle, the master device capable of communicating with at least one of the portable device and one or more sensor devices;
  a plurality of antennas, each of the plurality of antennas configured to receive wireless communications and provide an antenna output corresponding to the wireless communications, wherein a frequency of the wireless communications varies over time among a plurality of different frequencies;
  wherein first location information for the portable device is determined relative to the vehicle based on a first function of one or more first ones of the antenna outputs, wherein a first output of the one or more first ones of the antenna outputs corresponds to the wireless communications, wherein the first location information is determined based on the first output corresponding to the wireless communications;
  wherein second location information for the portable device is determined relative to the vehicle based on a second function of one or more second ones of the antenna outputs, wherein a second output of the one or more second ones of the antenna outputs corresponds to the wireless communications, wherein the second location information is determined based on the second output corresponding to the same wireless communications that forms the basis for the first location information determined by the first function, wherein the first ones of the antenna outputs and the second ones of the antenna outputs are aligned in time and frequency such that the first ones of the antenna outputs and the second ones of the antenna outputs correspond to wireless communications with the frequency of the wireless communications varying over time among the plurality of different frequencies;
  wherein a location of the portable device is determined relative to the vehicle based on the first and second location information;
  wherein the first function corresponds to one of a first group of functions, wherein the second function corresponds to another of the first group of functions, wherein the first function is different from the second function; and
  wherein the first group of functions includes at least two of a smoothing function, a distance function, a signal strength function, a signal power function, a signal background function, a multilateration function, a multiangulation algorithm, a heuristic algorithm, a confidence estimation function, a fingerprinting algorithm, a differential function, a time of flight function, a time of arrival function, a time difference of arrival function, an angle of arrival function, an angle of departure function, a geometric function, a multipath mitigation function, a probability function, a combination function, an agreement function, a weight-based function, an averaging function, an exponential moving average function, a maximum function, a minimum function, and a Kalman filter function.

2. The system of claim 1 wherein the first function includes a determination of the first location information based on at least one signal strength characteristic obtained with respect to the one or more first ones of the antenna outputs.

3. The system of claim 2 wherein the first function includes at least one of multilateration, a heuristic algorithm, and a fingerprint algorithm with respect to a plurality of signal strength characteristics obtained with respect to a first plurality of the antenna outputs.

4. The system of claim 2 wherein the second function includes a determination of the second location information based on at least one angle of arrival characteristic obtained with respect to the one or more second ones of the antenna outputs.

5. The system of claim 4 wherein the second function includes at least one of multiangulation and a heuristic algorithm with respect to a plurality of angle of arrival characteristics obtained with respect to a second plurality of the antenna outputs.

6. The system of claim 2 wherein the at least one signal strength characteristic is based on a plurality of time-spaced measurements of an antenna output of the one or more first ones of the antenna outputs.

7. The system of claim 6 wherein the plurality of the time-spaced measurements correspond to at least two or more RSSI measurements with respect to wireless communications that occur on different communication frequencies.

8. The system of claim 1 wherein the first function includes a determination of the first location information based on at least one time of flight characteristic obtained with respect to the one or more first ones of the antenna outputs.

9. The system of claim 8 wherein the second function includes a determination of the second location information based on at least one signal strength characteristic obtained with respect to the one or more second ones of the antenna outputs.

10. The system of claim 1 wherein the location of the portable device is determined as a function of the first and second location information, wherein the function includes at least one of a combination algorithm, a heuristic algorithm, an agreement algorithm, and a fingerprinting algorithm.

11. The system of claim 10 wherein the agreement algorithm with respect to the first and second location information includes determining a confidence score associated with the location of the portable device relative to the vehicle.

12. The system of claim 1 wherein agreement between the first and second location information mitigates environmental effects on the wireless communications.

13. The system of claim 1 wherein the first function includes a determination of the first location information based on a plurality of time-spaced measurements corresponding to at least two or more time of flight measurements with respect to wireless communications.

14. The system of claim 1 wherein at least one sensor device of the one or more sensor devices is operably coupled to the plurality of antennas, wherein the at least one sensor device is configured to determine a characteristic associated with the wireless communications, and wherein the at least one sensor device is operable to communicate sensor information pertaining to the characteristic to the master device.

15. The system of claim 14 wherein the first function includes at least one of determining an average, a maximum, a minimum, a clustering, a median, or any other function with respect to at least two time-spaced values of the characteristic.

16. The system of claim 1 wherein the one or more sensor devices communicate the antenna output to the master device via a communication channel separate from a communication channel used for reception of the wireless communications, wherein the master device determines a characteristic associated with the wireless communications based on the antenna output.

17. A method of determining position with respect to a portable device and a vehicle, said method comprising:
receiving, in a first antenna disposed on the vehicle, wireless communications transmitted from a target device, wherein a frequency of the wireless communications varies over time among a plurality of different frequencies;
determining a first characteristic based on a first output from the first antenna with respect to the wireless communications received in the first antenna;
receiving, in a second antenna disposed on the vehicle, the wireless communications transmitted from the target device;
determining a second characteristic based on a second output from the second antenna with respect to the wireless communications received in the second antenna, wherein the first and second characteristics are based on the same wireless communications transmitted from the target device and respectively received by the first and second antennas, wherein the first output of the first antenna and the second output of the second antenna are aligned in time and frequency such that the first output and the second output correspond to the wireless communications with the frequency of the wireless communications varying over time among the plurality of different frequencies;
generating first location information for the portable device relative to the vehicle based on a first function of the first characteristic;
generating second location information for the portable device relative to the vehicle based on a second function of the second characteristic, wherein the first location information and the second location information are based on the same wireless communications respectively received by the first and second antennas;
determining the position of the portable device with respect to the vehicle based on the first and second location information;
wherein the first function corresponds to one of a first group of functions, wherein the second function corresponds to another of the first group of functions, wherein the first function is different from the second function; and
wherein the first group of functions includes at least two of a smoothing function, a distance function, a multilateration function, a multiangulation algorithm, a heuristic algorithm, a confidence estimation function, a fingerprinting algorithm, a differential function, a time of flight function, a time of arrival function, a time difference of arrival function, an angle of arrival function, an angle of departure function, a geometric function, a multipath mitigation function, a probability function, a combination function, an agreement function, a weight-based function, an averaging function, an exponential moving average function, a maximum function, a minimum function, and a Kalman filter function.

18. The method of claim 17 wherein the first characteristic is a first time of flight of wireless communications between the target device and the first antenna.

19. The method of claim 18 wherein the wireless communications are transmitted on at least one of a plurality of communication frequencies.

20. The method of claim 18 wherein the second characteristic is a second time of flight signal.

21. The method of claim 17 wherein the first characteristic and the second characteristic are aligned in time and frequency with respect to the wireless communications.

22. The method of claim 17 wherein the second characteristic is a first received signal strength.

23. The method of claim 17 wherein the target device is the portable device, and wherein the first and second antennas are disposed in a fixed position relative to the vehicle.

24. The method of claim 17 wherein:
said determining the first characteristic includes conducting a plurality of first time-spaced measurements with respect to first antenna output from the first antenna, wherein at least two of the first time-spaced measurements correspond to wireless communications that occur at different communication frequencies; and
said determining the second characteristic includes conducting a plurality of second time-spaced measurements with respect to second antenna output from the second antenna, wherein the second characteristic is aligned in time with the first characteristic.

25. The method of claim 17 comprising determining the location of the portable device as a function of the first and second location information, wherein the function includes at least one of a combination algorithm, a heuristic algorithm, an agreement algorithm, and a fingerprinting algorithm.

26. The method of claim 17 comprising:
  determining the first location information based on a first function of the first characteristic; and
  determining the second location information based on a second function of the second characteristic.

27. The method of claim 26 wherein the first function includes at least one of multilateration, a heuristic algorithm, and a fingerprint algorithm, and wherein the second function includes at least one of multiangulation and a heuristic algorithm.

28. The method of claim 26 wherein the first characteristic is at a signal strength characteristic, and the second function is an angle of arrival characteristic.

29. The system of claim 1 wherein the second function is selected based on an output of the first function.

30. The method of claim 17 comprising selecting the second function based on an output of the first function.

* * * * *